(12) United States Patent
Khalid et al.

(10) Patent No.: US 12,145,460 B1
(45) Date of Patent: Nov. 19, 2024

(54) SUPERTWISTING SLIDING MODE CONTROLLER FOR FAST EV CHARGING

(71) Applicant: KING FAHD UNIVERSITY OF PETROLEUM AND MINERALS, Dhahran (SA)

(72) Inventors: Muhammad Khalid, Dhahran (SA); Kamran Zeb, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/785,580

(22) Filed: Jul. 26, 2024

(51) Int. Cl.
*B60L 53/22* (2019.01)
*B60L 53/63* (2019.01)

(52) U.S. Cl.
CPC .............. *B60L 53/22* (2019.02); *B60L 53/63* (2019.02); *B60L 2210/30* (2013.01)

(58) Field of Classification Search
CPC .................................................... B60L 53/22
USPC ........................................................ 320/137
See application file for complete search history.

(56) References Cited

U.S. PATENT DOCUMENTS

| | | | | |
|---|---|---|---|---|
| 11,211,872 B1* | 12/2021 | Jang | ............... | H02M 1/4225 |
| 2005/0237772 A1* | 10/2005 | Batarseh | ............... | H02M 3/335 |
| | | | | 363/89 |
| 2010/0284208 A1* | 11/2010 | Nguyen | ............... | H02M 7/4807 |
| | | | | 363/160 |
| 2013/0249469 A1* | 9/2013 | Pahlevaninezhad | ...... | H02J 7/02 |
| | | | | 320/137 |
| 2020/0099311 A1* | 3/2020 | Askarianabyaneh | ......................... | |
| | | | | H02M 1/4258 |
| 2022/0010878 A1* | 1/2022 | Quintero Manríquez | ................... | |
| | | | | F16H 61/32 |
| 2022/0294375 A1* | 9/2022 | Peng | ....................... | H02P 21/22 |
| 2022/0412367 A1* | 12/2022 | Chen | ..................... | F04D 29/582 |

FOREIGN PATENT DOCUMENTS

CN 117277758 A 12/2023

OTHER PUBLICATIONS

Bagheri, Farzaneh, et al, "Sliding Mode Control of an Isolated Inverter Based on Active Clamped Flyback-Forward Converter", 2021 IEEE 30th International Symposium on Industrial Electronics (ISIE), Jun. 2021, 7 pages.

* cited by examiner

*Primary Examiner* — Jerry D Robbins
(74) *Attorney, Agent, or Firm* — Oblon, McClelland, Maier & Neustadt, L.L.P.

(57) ABSTRACT

A circuit and methods including super-twisting sliding mode controller (ST-SMC) control of an AC/DC quasi single-stage current-fed resonant converter for electric vehicle (EV) charging. The converter includes primary side switches and a secondary side bidirectional switch, achieving zero-voltage switching (ZVS) for efficient operation. The primary side includes an active clamp circuit, while the secondary side incorporates a resonant tank for smooth energy transfer. The ST-SMC generates pulse width modulation signals, ensuring ZVS at turn ON and turn OFF for primary switches, and ZVS at turn ON with low-voltage switching at turn OFF for the bidirectional switch. The circuit includes a feedback loop with an error calculation unit for precise control of grid current and output voltage, providing power factor correction and regulated output for 400V and 800V EV batteries.

20 Claims, 29 Drawing Sheets

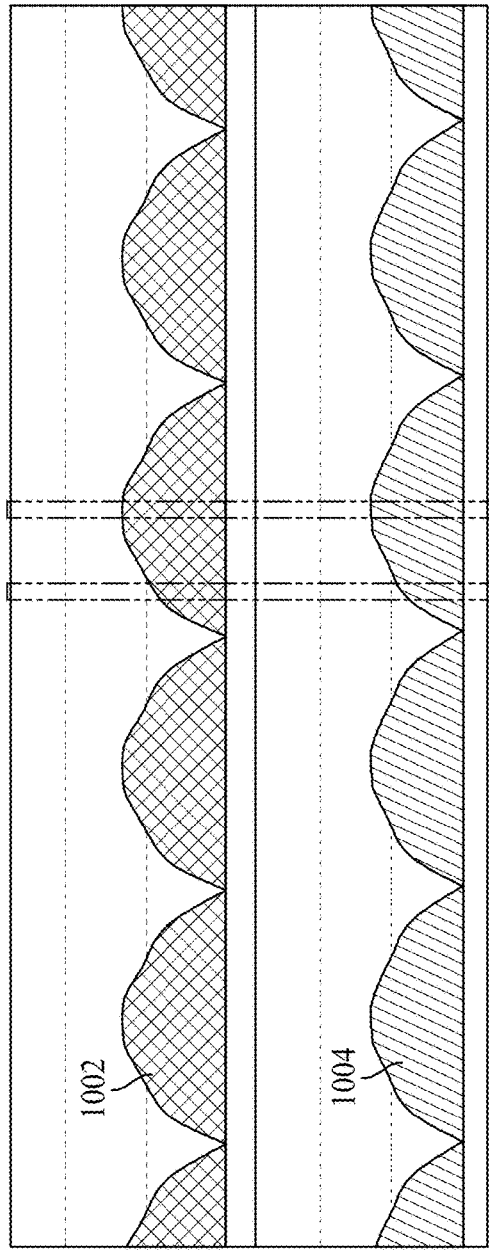
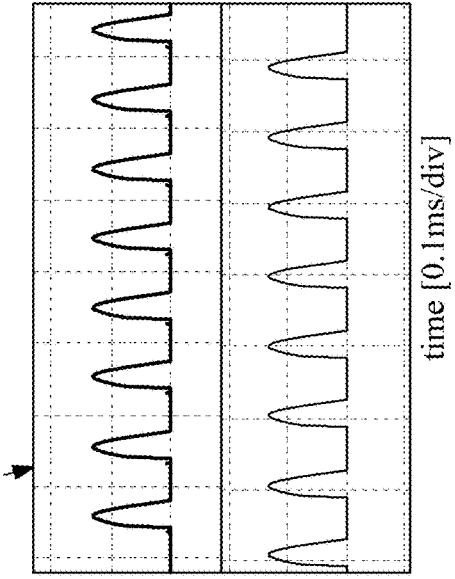
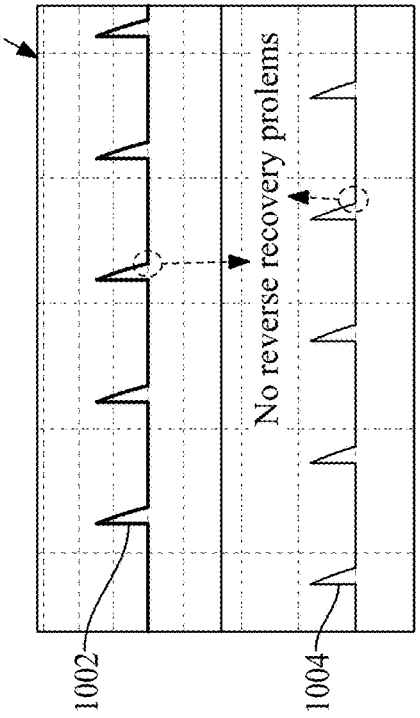
FIG. 10A
FIG. 10B

SUPERTWISTING SLIDING MODE CONTROLLER FOR FAST EV CHARGING

STATEMENT OF ACKNOWLEDGEMENT

Support provided by the King Fahd University of Petroleum and Minerals (KFUPM), Riyadh, Saudi Arabia through Project #INSE2415 is gratefully acknowledged.

BACKGROUND

Technical Field

The present disclosure is directed to methods and systems for electronic vehicle battery charging, and more specifically to sliding mode control of fast electronic vehicle battery charging.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A significant shift towards greener technologies is being realized in the transportation sector, which is intended to mitigate greenhouse gas emissions and reduce dependency on fossil fuels. Electric vehicles (EVs) are central to this transition due to their potential to significantly lower carbon emissions compared to traditional internal combustion engine vehicles which burn fossil fuels. EVs are preferred for several reasons, including their ability to use renewable energy sources, having lower operational costs, reduced noise pollution, and advancements in battery technology that improve their range and performance. Additionally, governments and regulatory bodies worldwide are incentivizing the adoption of EVs through subsidies, tax benefits, and investments in charging infrastructure.

To support the increasing adoption of EVs, battery charging systems must be designed with high efficiency to uphold input power quality (PQ) indices in accordance with the IEC 61000-3-2 standard. Power quality refers to the electrical characteristics of the power supply and the ability to deliver a stable, uninterrupted power flow with minimal distortions and deviations. High power quality is essential for the reliable operation of electrical devices, including EV chargers, as poor power quality can lead to inefficiencies, increased operational costs, and potential damage to electrical equipment.

Historically, EV batteries have predominantly been of lower voltage, such as the 400V batteries used in the Tesla Model 3 and BMW vehicles. Such lower voltage batteries have been sufficient for many EV applications, but as the demand for faster charging and higher performance increases, EV manufacturers have begun research into creating higher voltage battery systems. Recent advancements have introduced 800V batteries in new EV models from manufacturers such as Porsche, Kia, and Audi. These higher voltage batteries offer several advantages, including reduced charging times, improved power delivery and increased overall efficiency. The shift to 800V batteries aims to address the challenges of slow charging and enhance the performance and convenience of EVs, making them more attractive to consumers and further supporting the transition to a sustainable transportation sector.

Various technologies have been implemented in the domain of EV battery charging to improve the efficiency of EV battery charging.

EV chargers are typically powered by an AC source with a diode bridge rectifier (DBR), which outputs noisy current from the AC mains. To address this issue, power converters are used to ensure the power quality within the utility grid by satisfying stringent criteria for high power factor (PF) and reduced total harmonic distortion (THD). Given that EV chargers are connected to the grid for extended periods, typically ranging from 2 to 10 hours, switching losses in the converter can become significant [See: S. S. Indalkar, A. Sabnis, *An off board electric vehicle charger based on zvs interleaved ac-dc boost pfc converter*, in: 2019 8th International Conference on Power Systems (ICPS), IEEE, 2019, pp. 1-6].

Electric vehicles are equipped with onboard chargers (OBC), while off-board chargers, known as electric vehicle service equipment (EVSE), are utilized for fast DC charging. Bridgeless resonant fly-back alternating current to direct current (AC/DC) converters have been used to meet international charging standards, reducing switching losses and enhancing overall power conversion efficiency [See: S. Kim, B.-H. Kwon, M. Kim, *Highly efficient bridgeless dual—mode resonant single power-conversion ac-dc converter*, IEEE Transactions on Power Electronics 34 (11) (2019) 10700-10709, S. Kim, C. Bai, H. Seok, H. H. Choi, M. Kim, *Bridgeless triple-mode resonant ac-dc converter: Dynamic modeling and controls*, IEEE Transactions on Industrial Electronics 67 (6) (2019) 4921-4933]. However, challenges such as excessive heat generated at the input side diode bridge rectifier and large conduction losses in high power factor converters persist.

To increase the efficiency of grid power usage and overall power conversion, power electronic switches and transformers with a boost inductor and diode can be used to improve the power factor correction (PFC) [See: C. Li, Y. Zhang, Z. Cao, X. Dewei, *Single-phase single-stage isolated zcs current-fed full-bridge converter for high-power ac/dc applications*, IEEE Transactions on Power Electronics 32 (9) (2016) 6800-6812]. A half-bridge converter, functioning similarly to a traditional boost PFC converter, which shared the inductor input between two PFC switches, reduced the switching and conduction losses and minimized the size and cost of the charger was described by Bharathhidan et al. [See: M. Bharathidasan, V. Indragandhi, *Review of power factor correction (pfc) ac/dc-dc power electronic converters for electric vehicle applications*, in: IOP Conference Series: Materials Science and Engineering, Vol. 906, IOP Publishing, 2020, p. 012006].

In both 400V and 800V battery systems, converters with bridgeless rectification PFC and hybrid resonant pulse width modulation are used to increase efficiency and reduce inrush current, enhancing system reliability. These converters operate in continuous conduction mode (CCM) to achieve power factor correction, which improves efficiency and reduces conduction losses. However, due to the nonlinear characteristics of high-voltage rapid charging equipment for electric vehicles, output voltage fluctuations and power losses remain significant concerns [See: A. K. Karmaker, S. Roy, M. R. Ahmed, *Analysis of the impact of electric vehicle charging station on power quality issues*, in: 2019 International Conference On Electrical, Computer And Communication Engineering (ECCE), IEEE, 2019, pp. 1-6]. Despite advancements, issues such as voltage stress on primary switches and the need for efficient control algorithms remain.

DC microgrids with solar PV arrays for level-3 electric vehicle fast charging stations (EVFCS) have been developed to mitigate voltage sag and reduce EV charging time. Advanced control techniques, such as sliding mode control (SMC) and fuzzy logic control (FLC), regulate bidirectional power flow and maintain power factor in fast EV chargers, overcoming limitations of conventional controllers, such as the proportional-integral (PI) controller [See: A. M. Mohammed, S. N. H. Alalwan, A. Taşcikaraoğlu, J. P. Catalao, *Sliding mode-based control of an electric vehicle fast charging station in a dc microgrid, Sustainable Energy, Grids and Networks* 32 (2022) 100820]. Conventional PI controllers often face challenges with overshooting, prolonged settling times, and reduced resilience in handling uncertainties, leading to limited responsiveness to rapid changes.

Recent developments include controllers for single-phase converters, isolated bridgeless SEPIC converters, and EV chargers utilizing nonlinear control techniques to improve dynamic performance and robustness against external disturbances. For instance, a conditioned-based super-twisting sliding mode controller (ST-SMC) has been presented for plugin hybrid electric vehicles (PHEVs) within the framework of the input control unit and hybrid energy storage system [See: S. Ahmed, U. A. Afzal, L Ahmad, A. Hasan, *Conditioned-based robust nonlinear control of plug-in hybrid electric vehicle with saturated control actions, Journal of Energy Storage* 43 (2021) 103201]. These controllers perform dynamically better and exhibit convergence in finite time [A. Lassioui, H. E. Fadil, A. Rachid, Z. El-Idrissi, T. Bouanou, F. Z. Belhaj, F. Giri, *Modelling and sliding mode control of a wireless power transfer system for BEV charger, International Journal of Modelling, Identification and Control* 34 (2) (2020) 1711-86]. Despite these advancements, issues such as steady-state errors, systemic heat, and power losses due to chattering effects in sliding mode controllers persist.

To overcome the chattering issue, a unique barrier-conditioned double super-twisting sliding mode controller (BC DST-SMC) for an AC/DC dual active bridge has been used for a 400V EV charger [See: A. Zar, H. Rehman, I. Ahmad, *Neural network based optimized barrier conditioned double super-twisting sliding mode controller of electric vehicle charger with grid to vehicle and vehicle to grid modes, Journal of Energy Storage* 74 (2023) 109234]. However, the power factor and switching losses that affect the overall efficiency of the charging system and heat production are not fully addressed by the BC DST-SMC for an AC/DC dual active bridge system.

Dual active bridge topology has also been implemented for 800V EV chargers, but these systems lack effective control techniques for voltage regulation and efficient power flow [See: I. Aghabali, J. Bauman, P. J. Kollmeyer, Y. Wang, B. Bilgin, A. Emadi, 800-v *electric vehicle powertrains: Review and analysis of benefits, challenges, and future trends, IEEE Transactions on Transportation Electrification* 7 (3) (2020) 927-948]. Additionally, power electronic switches have not demonstrated zero voltage switching (ZVS) for turn ON/OFF instances. To address switching losses and ensure smooth operation of quick EV chargers, dual-active-bridge quasi-single-stage AC/DC converters have been used. However, the converters require four switches on the secondary side, which increases the cost. The ZVS region is limited because input voltage of the DAB converter for AC/DC conversion is a folded sine wave, indicating a broad voltage conversion ratio range.

Current-fed dual active bridge (DAB) converters are utilized to expand the ZVS range by employing a variable voltage conversion ratio [See: D. Sha, X. Wang, D. Chen, *High-efficiency current-fed dual active bridge dc-dc converter with ZVS achievement throughout full range of load using optimized switching patterns, IEEE Transactions on Power Electronics* 33 (2) (2017) 1347-1357, Y. Zhang, L. Ding, N. Hou, Y. Li, *A dual-current-fed dual-active-bridge dc/dc converter with high-frequency current-ripple-friendly ports, IEEE Transactions on Power Electronics* 37 (12) (2022) 20 15084-15098]. The current-fed DAB converter achieves low high-frequency current ripple and simple current regulation on both sides. The current-fed DAB converter also includes inbuilt soft-switching functions, voltage boost capability, and eliminates the need for snubber circuits to control voltage spikes. However, the current-fed DAB converters require a control algorithm to regulate the DC output voltage.

The super-twisting sliding mode controller (ST-SMC) is an advanced form of sliding mode control designed to address chattering, a common issue in conventional sliding mode controllers. Chattering occurs due to the high-frequency switching of control signals near the sliding surface. The ST-SMC reduces chattering by using higher-order derivatives of the control signals. The ST-SMC includes a super-twisting algorithm, which enhances robustness and stability of the control system. The super-twisting algorithm modifies the control input continuously based on the difference between the actual system state and the intended trajectory, ensuring fast convergence and robustness.

The super-twisting algorithm is divided into two parts: a continuous part u1 and a discontinuous part, ensuring smooth control actions. The control signal amplitude alternates between the two limits, guiding the trajectory of the system towards the origin in the phase plane. By applying the super-twisting algorithm throughout the control process, the ST-SMC ensures stability, fast convergence, and robust performance, making it suitable for managing complex, non-linear systems with high precision and minimal chattering. Therefore, ST-SMCs are utilized to achieve efficient and reliable control in power charging applications.

An EVcharger offering bidirectional power flow, both vehicle-to-grid (V2G) and grid-to-vehicle (G2V), has been developed using AC/DC with DC-DC bidirectional power converters and batteries [See: L Ahmed, M. Adnan, M. Ali, G. Kaddoum, *Supertwisting sliding mode controller for grid-to-vehicle and vehicle-to-grid battery electric vehicle charger, Journal of Energy Storage* 70 (2023) 107914]. To meet the requirements for EV chargers in G2V and V2G operations in the presence of external perturbations, a reliable nonlinear controller, ST-SMC, was used. Such converters realise switching losses at the main switches.

To minimize the switching losses while maintaining a high power factor, a quasi-single-stage AC/DC converter utilizing a dual half-bridge topology may be implemented [See: S. Zengin, M. Boztepe, *A novel current modulation method to eliminate low-frequency harmonics in single-stage dual active bridge ac-dc converter, IEEE Transactions on Industrial Electronics* 67 (2) (2019)]. However, the limited extent of the soft switching zone constrains the power conversion efficiency, especially when the grid voltage undergoes significant variations. Additionally, the inclusion of a large-sized passive filter reduces power density of the converter.

To address these issues, a quasi-single-stage current-fed resonant converter was implemented. This converter takes advantage of the grid-side input inductor, which reduces the size and cost of the grid-side passive filter inductor and provides low input current harmonics. At turn-ON and turn-OFF instances, the bottom switches on the primary side experience hard switching loss. Resonance naturally enables zero current switching (ZCS) during turn-OFF, minimizing switching loss. Nevertheless, the switching loss on the bottom switches of the primary side exceeds that of the top switches due to current flow through the input inductor [See: S.-H. Lee, M.-J. Kim, *High efficiency isolated resonant pfc converter for two-stage ac-dc converter with enhanced performance, in:* 2019 *IEEE Energy Conversion Congress and Exposition (ECCE), IEEE,* 2019, pp. 1120-1124]. Additionally, during the resonance phase, the converter enters an asymmetric condition when the grid voltage deviates from its nominal level, causing significant distortion in the grid current.

CN117277758A describes a super-spiral sliding mode control method combined with reflux power optimization, comprising the steps of analyzing the transmission power, the reflux power mathematical model, and the ZVS characteristic of a DAB converter in two modes under an expansion phase shift modulation, and establishing the step-down model of the DAB converter based on the transmission power mathematical model.

Each of the aforementioned disclosures suffers from one or more drawbacks hindering their adoption. Conventional systems and methods fail to optimize power conversion efficiency, manage heat production effectively, and provide robust control against external perturbations, limiting their effectiveness in modern EV charging applications.

Accordingly, the present disclosure seeks to provide a control system and methods that overcome these challenges, offering a high-efficiency, robust EV charging system with minimized switching losses and enhanced power factor, contributing to the advancement of EV charging technologies.

SUMMARY

In an exemplary embodiment, a circuit for charging an electric vehicle battery is described. The circuit includes an AC/DC transformer-based converter including a plurality of primary side switches and a secondary side bidirectional switch, and a super-twisting sliding mode controller operatively connected to the plurality of primary side switches and the secondary side bidirectional switch. The super-twisting sliding mode controller is configured to generate pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF.

In another exemplary embodiment, a method for charging a battery of an electric vehicle with an AC/DC transformer-based converter is described. The method includes generating, with a super-twisting sliding mode controller operatively connected to a plurality of primary side switches of a bridge rectifier and a secondary side bidirectional switch, pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF. The method further includes charging, with current generated by a resonant inductor on the secondary side of the transformer, an output capacitor, and charging the battery of the electric vehicle with a voltage of the output capacitor.

In yet another exemplary embodiment, a method for sliding mode control of switching error of an AC/DC transformer-based converter connected to a battery of an electric vehicle is described. The method includes generating, with a super-twisting sliding mode controller operatively connected to a plurality of primary side switches of a bridge rectifier and a secondary side bidirectional switch, pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF. The method further includes generating, by the super-twisting sliding mode controller which includes electrical circuitry, a memory storing program instructions including a sliding mode surface algorithm and a super twisting algorithm, and at least one processor configured to execute the program instructions, the pulse width modulation signals by executing the sliding mode surface algorithm and the super twisting algorithm.

The method further includes transmitting, by the super-twisting sliding mode controller, the pulse width modulation signals to gate terminals of the plurality of primary side switches of the bridge rectifier and to gate terminals of the secondary side bidirectional switch, and doubling, with an inductor-based current doubler having an active clamp circuit composed of a clamp capacitor, a first inductor connected between a positive terminal of the alternating voltage source and a primary coil. The first inductor and a second inductor are connected to the bridge rectifier, a current supplied to a primary coil of the transformer.

The method further includes doubling, with an active voltage doubler including two diodes, the secondary side bidirectional switch, a resonant inductor, a first resonant capacitor and a second resonant capacitor, a voltage of an output capacitor, charging, with current generated by the resonant inductor on a secondary side of the transformer, the output capacitor, and charging the battery of the electric vehicle with a voltage of the output capacitor.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10A illustrates an analysis of waveforms $i_{D1}$ and $i_{D2}$ for a 400V configuration, according to certain embodiments.

FIG. 10B is an exploded view of the waveforms depicted in FIG. 10A, according to certain embodiments.

DETAILED DESCRIPTION

Figure 1:
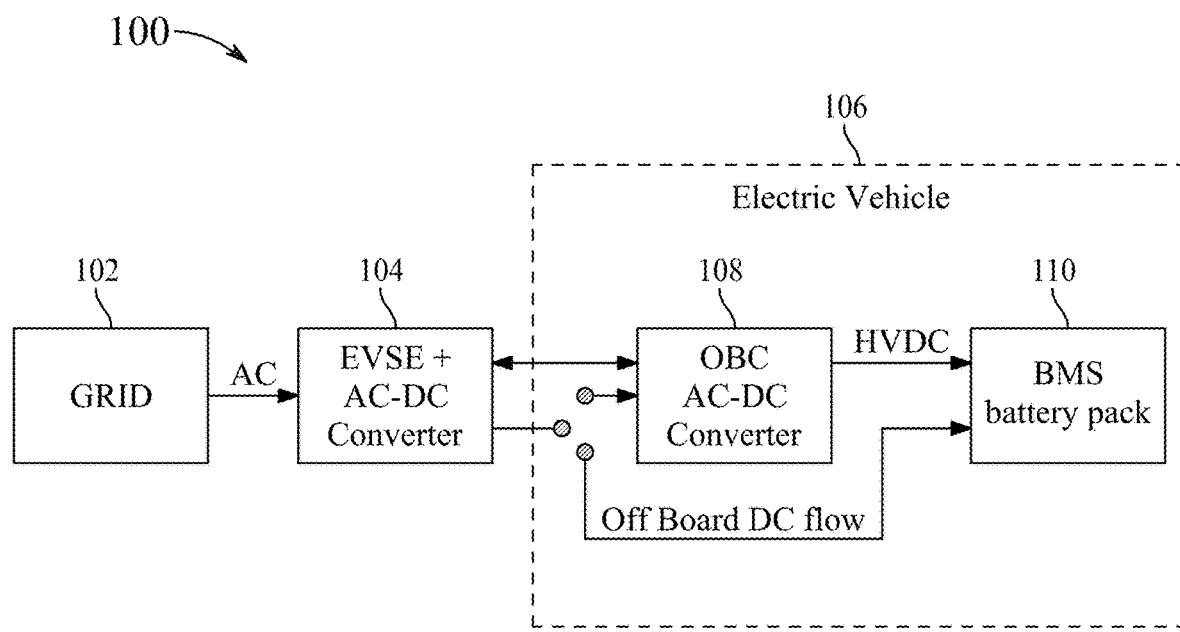
FIG. 1 is a block diagram of a charging system for charging electric vehicles (EVs), according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to an alternating current to direct current (AC/DC) quasi single-stage current-fed resonant converter for electric vehicle (EV) charging. The AC/DC quasi single-stage current-fed resonant converter includes a super-twisting sliding mode-based controller (STSMC) configured for power factor correction (PFC) and regulation of the DC output voltage for EV battery packs. The converter features high-frequency operation, reduced input current ripples, minimized switching losses, and enhanced efficiency, making it an ideal choice for the EV charging infrastructure.

The reduction in input current ripples is achieved by maintaining a fixed duty ratio of 50% at primary side switches, regardless of variations in grid voltage and load. The PFC operation and output voltage regulation are accomplished by controlling the secondary side bidirectional switch. The primary side switches turn ON with zero-voltage switching (ZVS), while the secondary side bidirectional switches exhibit nearly ZVS behaviour at turn OFF, effectively reducing switching losses and improving efficiency.

FIG. 1 illustrates a charging system 100 for charging EVs. The charging system 100 is typically implemented at private residences or various public places. The charging system 100 is configured for managing power transmission from a power grid 102 to an electric vehicle battery pack. The charging system 100 supports both onboard and off-board charging, ensuring efficient power conversion and regulation throughout the charging process.

The charging system 100 includes, but may not be limited to, the power grid 102, an electric vehicle service equipment (EVSE) and a grid connected AC/DC converter 104, an onboard charger (OBC) AC/DC converter 108, and a battery management system (BMS) and battery pack 110. The onboard charger (OBC) AC/DC converter 108 is alternatively referred to as the OBC 108. The BMS and battery pack 110 is alternatively referred to as the battery pack 110. The OBC 108 and the battery pack 110 are implemented within the EV 106.

The power grid 102, alternatively referred to as the grid 102, serves as a primary AC power source for the charging system 100. The grid 102 supplies AC electricity to the EVSE and the AC/DC converter 104.

The AC/DC converter 104, having an electric vehicle service equipment (EVSV) component and an AC/DC converter component, is a part of the off-board charger utilized for fast DC charging. The AC/DC converter component converts the AC power from the grid 102 into DC power. The EVSE component is implemented for providing the high-power levels required for rapid charging of the battery pack 110.

The EV 106 houses the OBC 108 and the battery pack 110. The EV 106 is equipped with connectors and interfaces to receive power from both onboard and off-board chargers.

The OBC 108 is an onboard charger within the EV 106 that converts AC power to DC power. The OBC 108 is implemented for managing the power flow when the EV 106 is charged from standard AC outlets. The OBC 108 ensures that the DC power is regulated for charging the battery pack 110.

The battery pack 110 is a combination of the battery management system (BMS) component and the battery component. The BMS manages the battery component, such as by monitoring its state, calculating secondary data, reporting that data, protecting the battery, controlling its environment, and balancing the battery pack component. The battery pack component is a set of any number of preferably identical batteries or individual battery cells. They may be configured in a series, parallel, or a mixture of both to deliver the required voltage, capacity, or power density.

The BMS regulates the charging and discharging of the battery pack component to ensure optimal performance and longevity. The battery pack 110 is connected to both the OBC 108 for onboard charging and the AC/DC converter 104 for off-board charging, promoting effective power management. The battery pack 110 stores the converted DC power for use by electric motor and other systems of the vehicle.

In the charging system 100, the AC/DC converter 104 receives AC power from the grid 102 and converts it to DC power, which is directly supplied to the battery pack 110 for fast charging. Alternatively, the OBC 108 converts AC power from either the grid 102 or the AC/DC converter 104 to DC power, which is then regulated and supplied to the battery pack 110. Such dual charging capability allows the EV 106 to be charged efficiently whether at home using a standard outlet or at a dedicated fast-charging station.

Figure 2A:
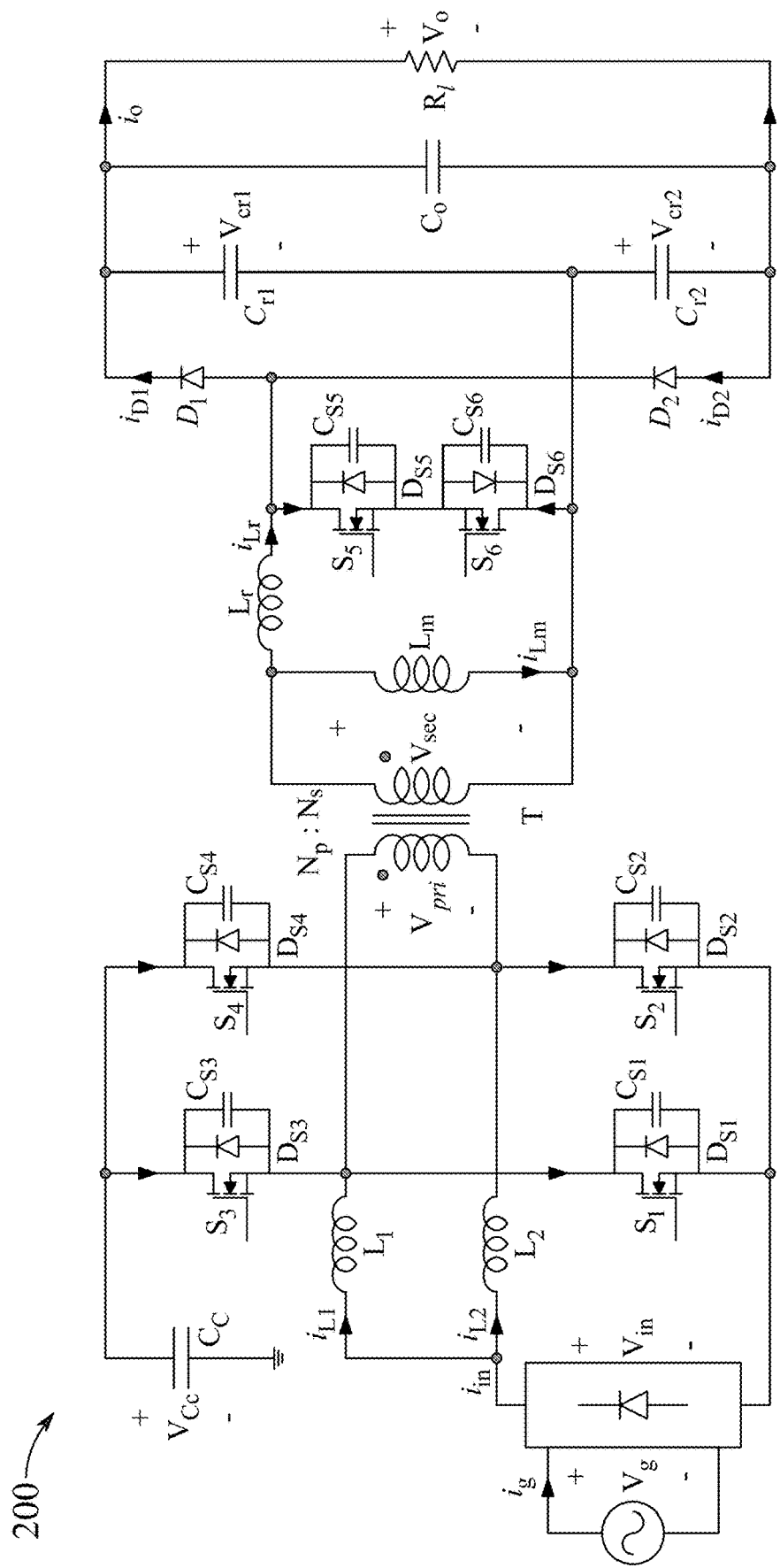
FIG. 2A is a schematic diagram of an AC/DC transformer-based converter for EV charging, according to certain embodiments.

FIG. 2A illustrates a schematic diagram of an AC/DC transformer-based converter 200 for EV charging. The AC/DC transformer-based converter 200 is a single-stage current-fed resonant converter for EV charging. The single-stage current-fed resonant converter, alternatively referred to as the converter 200, is configured to support both 400V and 800V EV system architectures, providing efficient power conversion, fast charging, and improved efficiency. The converter 200 is capable of operating with an ST-SMC based non-linear control, ensuring minimal switching losses and near-unity PFC.

The converter 200 is a power converter that combines the benefits of single-stage conversion and resonant power transfer. The converter 200 is characterized by its ability to operate at high frequencies, which reduces the size and weight of passive components, such as inductors and capacitors. Due to the current-fed topology, the converter 200 maintains continuous current flow, which is beneficial for applications requiring consistent power delivery, such as EV charging. The resonant aspect of the converter 200 allows for zero voltage switching (ZVS) and zero current switching (ZCS). The ZVS is a technique where the power switch transitions (turns ON or OFF) when the voltage across the switch is zero. The ZCS is a technique where the power switch transitions (turns ON or OFF) when the current through the switch is zero. ZVS and ZCS minimize the switching losses and reduce the stress on the switching devices, such as metal-oxide-semiconductor field-effect transistors (MOSFETs) or insulated-gate bipolar transistors (IGBTs).

The ST-SMC based non-linear control employs a non-linear control strategy which is particularly effective for handling the complex dynamics and non-linearities present in power electronic systems. The ST-SMC reduces chattering, a common issue in traditional sliding mode controllers, by providing smoother and more robust control actions. The ST-SMC enhances performance in terms of efficiency, stability, and response time, particularly in high-frequency operations typical of power converters.

The converter 200, as depicted in FIG. 2A includes a plurality of primary side switches and a secondary side bidirectional switch. The primary side includes an alternating grid voltage source $V_g$, which is a power source that provides alternating current power for the converter 200 from the grid 102. The Vg source is connected across an input diode configured for rectifying the AC input to direct current (DC) voltage. From the input diode, an alternating voltage source $V_{in}$ is provided for the converter 200 on the primary side to supply rectified input voltage.

The primary side of the AC/DC transformer-based converter 200 includes an active clamp circuit comprising a clamp capacitor $C_c$ and a bridge rectifier ($S_1$ to $S_4$ arranged in an H-bridge configuration) connected to the clamp capacitor. The bridge rectifier includes the plurality of primary side switches. The clamp capacitor $C_c$ is configured for reducing voltage spikes across the switches during operation. The active clamp circuit is a circuit configuration used to manage voltage transients and improve the efficiency of switching devices. The active clamp circuit typically consists of the clamp capacitor, a clamp switch, and other components, such as diodes and inductors, that work together to clamp or limit the voltage spikes that occur during the switching transitions of power transistors.

The primary side further comprises an inductor-based current doubler including a first inductor $L_1$ in parallel with a second inductor $L_2$, where a first end of the first inductor $L_1$ and a first end of the second inductor $L_2$ are connected to a positive terminal of the alternating voltage source. The primary coil Np is connected to the bridge rectifier and the inductors. A positive terminal of the primary coil Np is connected to a second end of the first inductor L1 and a negative terminal of the primary coil Np is connected to a second end of the second inductor $L_2$. The input current $i_g$ flows through inductors $L_1$ and $L_2$, which are utilized to store and transfer energy. The inductors $L_1$ and $L_2$ are integral to the active clamp circuit.

The primary side of the converter 200 features four N-channel MOSFET switches. A first primary side switch $S_1$ is connected at its drain terminal to the second end of the first inductor $L_1$ and is connected at its source terminal to a negative terminal of the alternating voltage source $V_{in}$. A second primary side switch $S_2$ is connected at its drain terminal to the second end of the second inductor $L_2$ and is connected at its source terminal to a negative terminal of the alternating voltage source. A third primary side switch $S_3$ is connected at its drain terminal to a positive terminal of the clamp capacitor $C_c$ and is connected at its source terminal to the second end of the first inductor $L_1$. A fourth primary side switch $S_4$ is connected at its drain terminal to the positive terminal of the clamp capacitor $C_c$ and is connected at its source terminal to the second end of the second inductor $L_2$.

Each primary side switch includes an N-channel metal oxide silicon field effect (MOSFET) transistor ($S_1$, $S_2$, $S_3$, $S_4$), an antiparallel diode $D_{Si}$ and a switch capacitor $C_{Si}$ in parallel with the MOSFET and the antiparallel diode, having a drain terminal, a source terminal, and a gate terminal, where i=1, 2, 3, 4.

The primary side switches of the bridge rectifier include four switches, a first primary side switch $S_1$, a second primary side switch $S_2$, a third primary switch $S_3$, and a fourth primary switch $S_4$. The first primary side switch $S_1$, having an antiparallel diode $D_{S1}$ and a capacitor $C_{S1}$, is connected at its drain terminal to the second end of the first inductor L1 and is connected at its source terminal to a negative terminal of the alternating voltage source. The second primary side switch S2, having an antiparallel diode $D_{S2}$ and a capacitor $C_{S2}$, is connected at its drain terminal to the second end of the second inductor $L_2$ and is connected at its source terminal to a negative terminal of the alternating voltage source. The third primary side switch $S_3$ is connected at its drain terminal to a positive terminal of the clamp capacitor $C_c$ and is connected at its source terminal to the second end of the first inductor $L_1$. The fourth primary side switch $S_4$ is connected at its drain terminal to the positive terminal of the clamp capacitor $C_c$ and is connected at its source terminal to the second end of the second inductor $L_2$.

The AC/DC transformer-based converter 200 further comprises a secondary side coil and a transformer T operatively connected to the primary side coil and the secondary side coil, and an active voltage doubler circuit. The active voltage doubler circuit comprises two output diodes ($D_1$, $D_2$), a resonant inductor $L_r$, and two resonant capacitors ($C_{r1}$, $C_{r2}$). The resonant inductor $L_r$ as part of the resonant tank, implemented for achieving ZVS and ZCS. Current flowing through $L_r$ is $i_{Lr}$. A magnetizing inductance Lm of the transformer also contributes to the resonant operation. The current flowing through $L_m$ is $i_{Lm}$.

The secondary side includes bidirectional switches, a first secondary side switch $S_5$ and a second secondary side switch $S_6$, each having a drain terminal, a source terminal, and a gate terminal, wherein the source terminal of the second secondary side switch is connected to the source terminal of the first secondary side switch $S_5$. Each of the secondary side switches includes an N-channel MOSFET transistor, an antiparallel diode $D_{Si}$ and a switch capacitor $C_{Si}$ in parallel with the MOSFET and the antiparallel diode, where i represents the number of the switch ($S_5$ or $S_6$). The switches, $S_5$ and $S_6$, are controlled to achieve ZVS at turn-off instants, thereby minimizing switching losses.

The secondary side of the converter 200 further includes a secondary coil Ns, having a first end of the resonant inductor $L_r$ connected to a positive terminal of the secondary coil Ns. The drain terminal of the first secondary side switch $S_5$ is connected to a second end of the resonant inductor $L_r$, and the drain terminal of the second secondary side switch S6 is connected to a negative terminal of the secondary coil Ns. The secondary side also includes a first output diode $D_1$ of the two diodes having an anode connected to the second end of the resonant inductor $L_r$ and to the drain terminal of the first secondary side switch $S_5$ of the bidirectional switch, and a second output diode $D_2$ of the two diodes having a cathode connected to the second end of the resonant inductor $L_r$ and to the drain terminal of the first secondary side switch $S_5$ of the bidirectional switch. Furthermore, the secondary side includes a first resonant capacitor $C_{r1}$ of the two resonant capacitors having a positive terminal connected to a cathode of the first output diode $D_1$ and a negative terminal connected to the negative terminal of the secondary side coil. Furthermore, the secondary side includes a second resonant capacitor $C_{r2}$ of the two resonant capacitors having a positive terminal connected to the negative terminal of the secondary side coil and to a negative terminal of the first resonant capacitor Cri. The second resonant capacitor $C_{r2}$ has a negative terminal connected to an anode of the second output diode $D_2$. The resonant capacitors $C_{r1}$ and $C_{r2}$ form part of the resonant tank circuit with $L_r$, for smooth transfer of energy and achieving resonance. Voltage across $C_{r1}$ and $C_{r2}$ is represented as $V_{er1}$ and $V_{er2}$, respectively.

The first and second output diodes, $D_1$ and $D_2$, rectify the AC output from the secondary side of the transformer to DC, providing the necessary output current $i_o$.

An output capacitor $C_o$ has a first terminal connected to the positive terminal of the first resonant capacitor $C_{r1}$ and a second terminal connected to the negative terminal of the second resonant capacitor $C_{r2}$. The output capacitor $C_o$ smoothens the rectified DC voltage. The load resistor $R_1$ represents the load connected to the output of the converter 200, drawing the required current $i_o$. A voltage across the output capacitor $C_o$ and a current generated by the bidirectional switch are configured to charge the battery of the electric vehicle.

In one aspect, the super-twisting sliding mode controller (ST-SMT) is operatively connected to the converter 200. The ST-SMT is configured to transmit the pulse width modulation signals to the gate terminals of the plurality of primary side switches ($S_1$, $S_2$, $S_3$, and $S_4$) of the bridge rectifier, to the gate terminal of the first secondary side switch $S_5$, and to the gate terminal of the second secondary side switch $S_6$ of the secondary side bidirectional switch. The pulse width modulation signals are configured to operate the converter 200 in a first mode, a second mode, a third mode, and a fourth mode, as described in FIG. 3A-FIG. 3D. The pulse width modulation signals of the first mode are configured to turn ON the second secondary side switch and then turn ON the first primary side switch $S_1$, the fourth primary side switch $S_4$, and the first secondary side switch $S_5$ with zero voltage switching error, transfer a voltage stored on the clamp capacitor $C_c$ through the primary coil Np to the secondary coil Ns, charge the switch capacitors of the first primary side switch $S_1$, the fourth primary side switch $S_4$, the first secondary side switch $S_5$, and the second primary side switch $S_2$, and charge the battery.

In operation, the primary side switches $S_1$ to $S_4$ work with a fixed duty ratio to minimize input current ripples and maintain continuous current flow. The secondary side switches $S_5$ and $S_6$ are controlled to achieve ZVS and regulate the output voltage $V_o$, ensuring efficient power conversion and high performance of the EV charging system.

The converter 200 thus achieves ZVS for both primary and secondary side switches, reducing switching losses and improving efficiency. The active clamp circuit and the active voltage doubler circuit with bidirectional switches enable effective PFC operation and voltage regulation for both 400V and 800V EV battery packs.

Figure 2B:
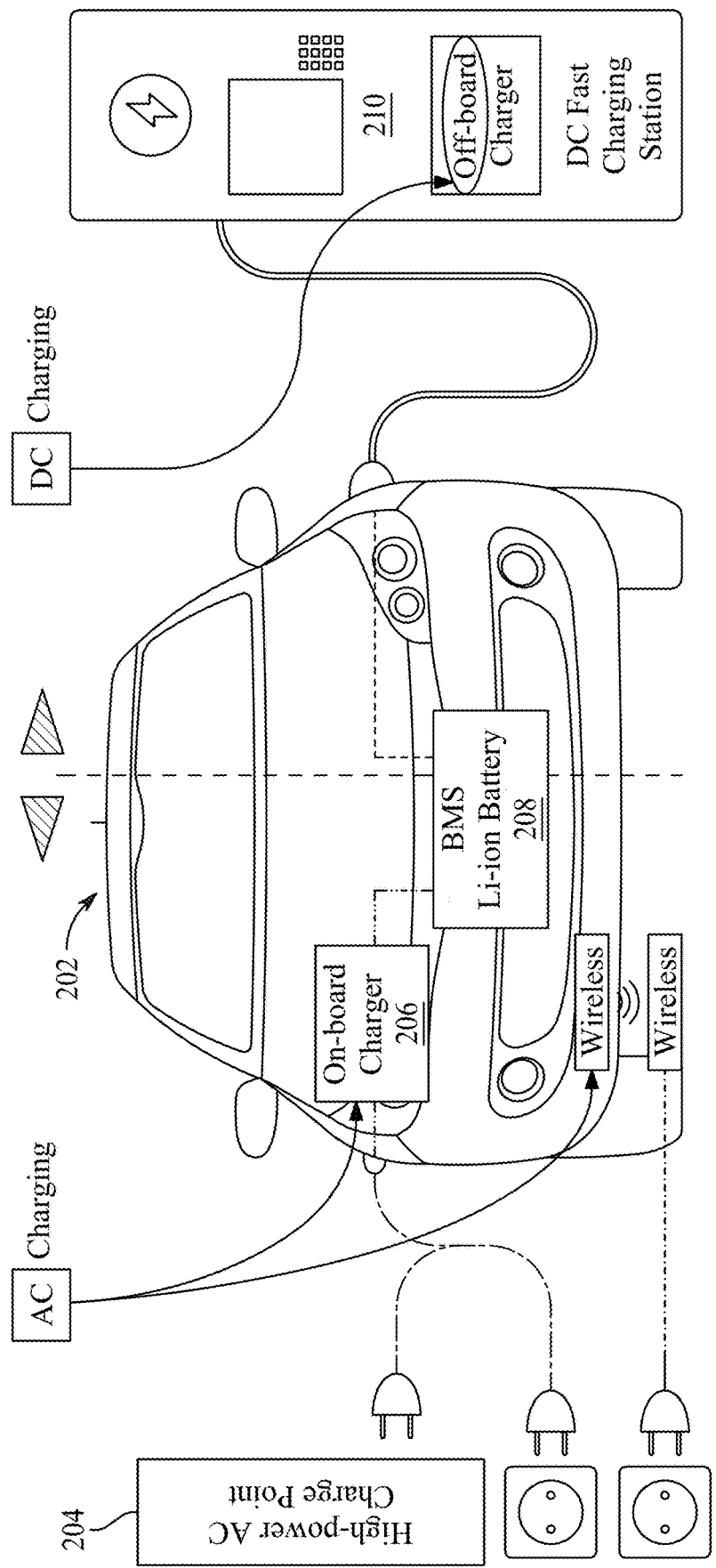
FIG. 2B illustrates a schematic diagram of a charging flow in an EV, according to certain embodiments.

FIG. 2B illustrates a block diagram of the charging flow in an electric vehicle (EV) 202. The EV 202 supports both AC and DC charging modes, enhancing compatibility with various charging infrastructures and improving overall charging efficiency.

As depicted in FIG. 2B, the EV 202 includes a high-power AC socket 204, providing AC power to an on-board charger 206. The on-board charger 206 converts AC power from the high-power AC socket 204 to DC power, which is then managed by a battery management system (BMS) for charging a Li-ion battery pack 208. Additionally, the EV 202 includes a wireless charging interface, offering wireless charging options for added convenience.

For DC charging, the off-board charger 210 supplies high-power DC directly to the EV 202, enabling fast charging through the DC fast charging station. The BMS is implemented for managing the Li-ion battery pack 208 within the EV 202, regulating the charging and discharging processes to ensure optimal performance and longevity. The BMS interfaces with both the on-board charger 206 and the off-board charger 210, allowing seamless power management.

The evolution in technology is shifting from 400V to 800V EV architectures for faster charging flow and improved efficiency due to decreased current for the same power flow. This shift reduces vehicle losses because of a decrease in FR losses, allowing for faster charging within defined battery current limitations and reduced vehicle losses. The ST-SMC based non-linear control of the single-stage current-fed resonant converter 200 ensures efficient power conversion, reduced switching losses, and improved overall performance for both 400V and 800V EV architectures.

The AC/DC converter 200 with its on-board and off-board charging flow in EV 202 provides good output voltage regulation and 2.8% THD for input current with fewer components, thus reducing the cost. The current doubler with an active clamp circuit and an active voltage doubler circuit with a bidirectional switch on both primary and secondary sides enable effective ZVS operation and voltage regulation. The AC/DC converter 200 supports efficient PFC operation, voltage regulation, and ZVS operation for both 400V and 800V EV battery packs, ensuring a robust and efficient solution for modern EV charging infrastructure.

FIG. 3A-FIG. 3D illustrate a schematic diagram of an AC/DC transformer-based converter 300 operating in mode 1, mode 2, mode 3, and mode 4, respectively. The schematic is described earlier in conjunction with the FIG. 2A description. The converter 300, as depicted in FIG. 3A-FIG. 3D includes a transformer, having a primary side and a secondary side. A diode rectifier and a current doubler with an active clamp circuit are on the primary side of an isolated transformer T. The secondary side includes an active voltage doubler circuit with a resonant tank, a bidirectional switch, and two diodes.

The primary side further includes an input source $V_{in}$, which provides the input voltage to the converter 300. The input current $i_{in}$ flows through inductors $L_1$ and $L_2$, which store energy and serve in current regulation. The primary side also includes four switches $S_1$, $S_2$, $S_3$, and $S_4$, paired with respective unidirectional diodes, $D_{S1}$, $D_{S2}$, $D_{S3}$, and $D_{S4}$, and junction capacitors $C_{s1}$, $C_{S2}$, $C_{S3}$, and $C_{S4}$.

A clamp capacitor $C_c$ is implemented to smooth the input voltage and contributes to the active clamp circuit.

The transformer T steps up or steps down the voltage as required, with primary voltage $V_{pri}$ and secondary voltage $V_{sec}$. On the secondary side, the converter 300 includes a resonant inductor $L_r$, which stores energy and serves in current regulation. Bidirectional switches $S_5$ and $S_6$ control current flow on the secondary side, maintaining efficient operation. Diodes $D_1$ and $D_2$ maintain unidirectional current flow. Resonant capacitors $C_{r1}$ and $C_{r2}$ smooth the rectified output voltage. The output inductor $L_o$ stores energy and smooths the output current, while the output capacitor $C_o$ maintains stable output voltage. The load $R_L$ represents the load connected to the converter 300, typically the EV battery pack.

On the secondary side, the circuit includes a resonant inductor $L_r$, two bidirectional switches, $S_5$ and $S_6$ including respective diodes ($D_{S5}$, $D_{S6}$) and junction capacitors ($C_{S5}$, $C_{S6}$). The resonant capacitors $C_{r1}$ and $C_{r2}$ form part of the resonant tank circuit with $L_r$.

The converter 300 operates using a complementary pulse width modulation (PWM) signal to control the alternative switches $S_1$ and $S_4$, and $S_2$ and $S_3$, with a duty ratio DpTs=0.5 Ts at the primary side, maintaining appropriate dead-time (TD). The complementary PWM includes involves generating two PWM signals that are complementary to each other, meaning when one signal is high, the other is low, and vice versa. On the secondary side, the PWM signal is applied with a duty ratio of Ds+0.5 Ts and a 180° phase shift, regulating the output voltage and keeping the grid current in phase with the desired current.

To analyze the operation of the converter 300 of the present disclosure, certain assumptions are made:

One assumption is that switch $S_i$ (i=1, . . . , 6) is represented mathematically by a body diode $D_s$i that enables to flow current in unidirectional when the MOSFET is in its off-state, and a junction capacitor $C_s$i as higher capacitance can lead to slower switching.

Another assumption is, that to obtain a constant voltage $V_{Cc}$ across the clamp capacitor, the clamp capacitor capacitance $C_c$ value needs to be sufficiently large.

Another assumption is that the capacitance of the output capacitor $C_o$ is sufficient to avoid voltage fluctuations in the output voltage $V_o$.

Another assumption is that the magnetizing inductance $L_m$ and its leakage inductance $L_{lk}$ are modeled with transformer T. Leakage inductance and resonant inductance $L_r$ are considered to be connected in series.

Another assumption is that the two resonant capacitors i.e; $C_{r1}$ and $C_{r2}$ have the same capacitance; thus, $C_{r1}=C_{r2}=C_r$.

Another assumption is that $L_1=L_2=L$ because the input inductors $L_1$ and $L_2$ have the same characteristic inductance.

Figure 3A:
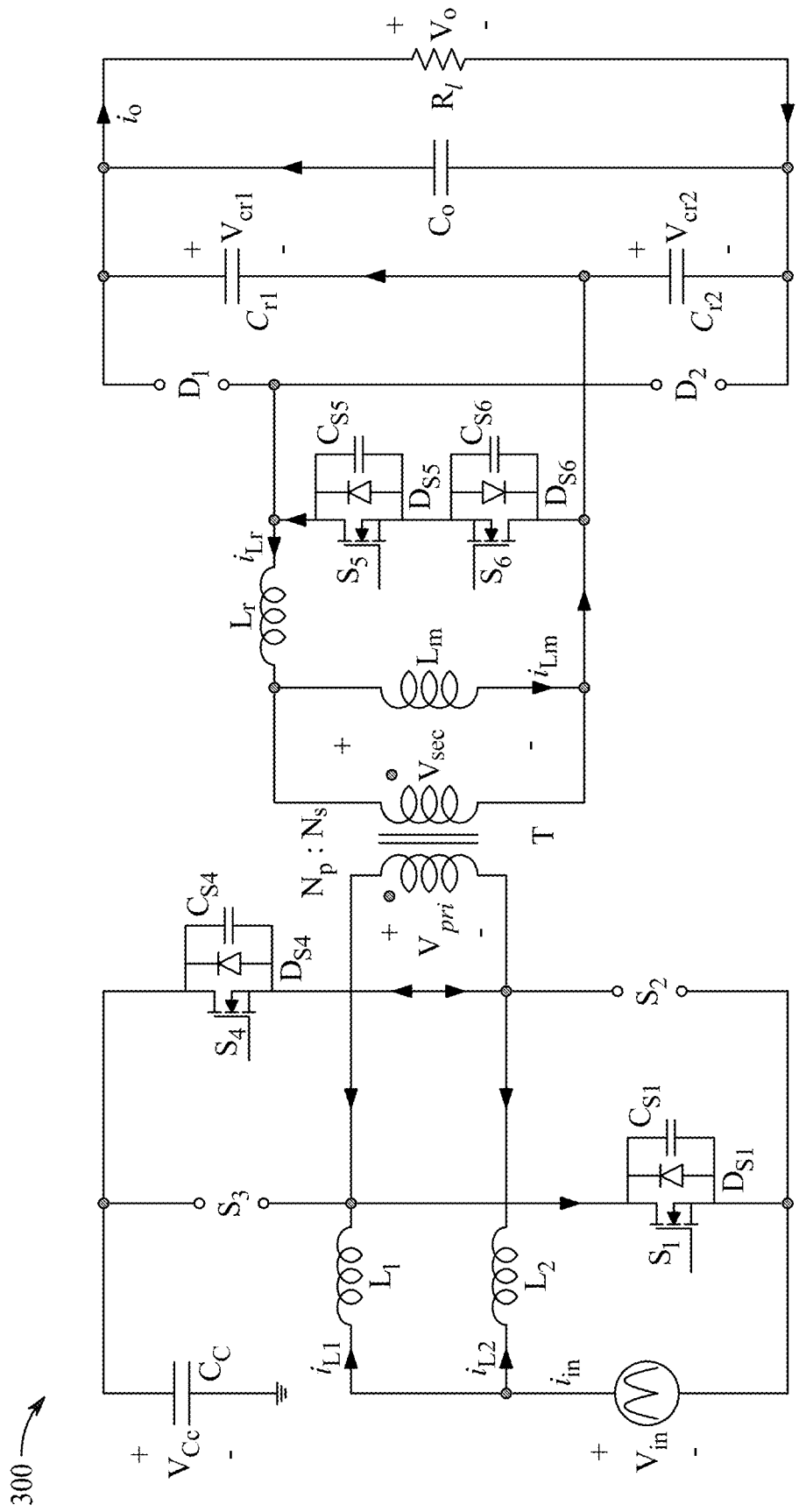
FIG. 3A illustrates an operating mode 1 of the AC/DC transformer-based converter, according to certain embodiments.

FIG. 3A depicts an operating mode 1 of the converter 300. At $t_0$, primary switches $S_1$, $S_4$ along with secondary switch $S_5$ turn ON with ZVS. Before $S_1$, $S_4$, and $S_5$ are turned ON, switch $S_6$ is already ON. $V_{Cc}$ is applied to the primary side of the transformer T, where $V_{pri}=V_{Cc}$, and $V_{Cc}$ is transferred to the secondary side of transformer T. During the voltage transfer, $V_{Cc}$ is multiplied by 'n' times resulting in $nV_{Cc}$ at the secondary side of the transformer T, where $V_{sec}=nV_{Cc}$. On the secondary side, $nV_{Cc}$ is applied to $L_r$, causing a linear increase in the current in the negative direction, where n is the number of turns on the transformer T.

Therefore, $$\frac{di_{L_r}}{dt} = \frac{-nV_{C_c}}{L_r} \quad (1)$$

$$\frac{i_{L_r}(t) - i_{L_r}(t_o)}{t - t_o} = \frac{-nV_{C_c}}{L_r}$$

At initial time $t_o$, $i_{L_r}(t_0)=0$ solving (1) gives, $$i_{L_r}(t) = \frac{-nV_{C_c}}{L_r}(t - t_o) \quad (2)$$

The average value of the capacitor voltage $V_{cr1}$ at this instant is, $$v_{c_{r1}} = \frac{V_o}{2} \quad (3)$$

$$v_{c_{r1}}(t_o) = \frac{V_o}{2} + \Delta V_{cr}$$

Figure 5:
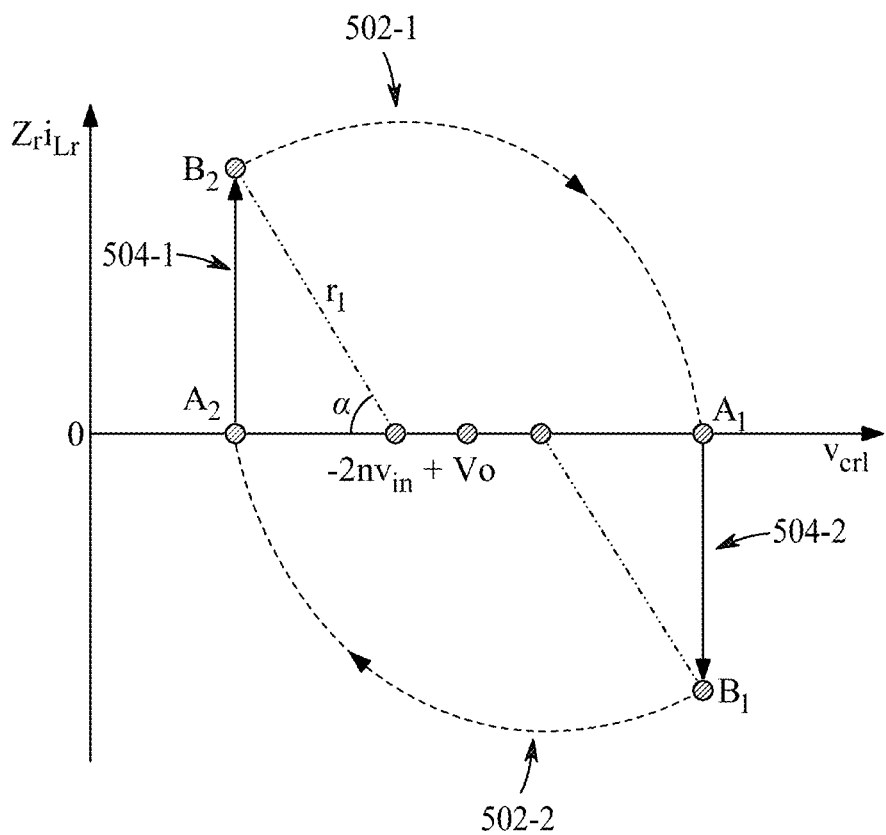
FIG. 5 illustrates an operation trajectory of the AC/DC transformer-based converter during the operating modes 1, 2, 3, and 4 thereof, according to certain embodiments.

Here, $\Delta V_{Cr}$ represents the ripple in voltage across the resonant capacitor on the secondary side. All the above operations follow the plane trajectory from $A_1$ to $B_1$ as shown in FIG. 5.

Figure 3B:
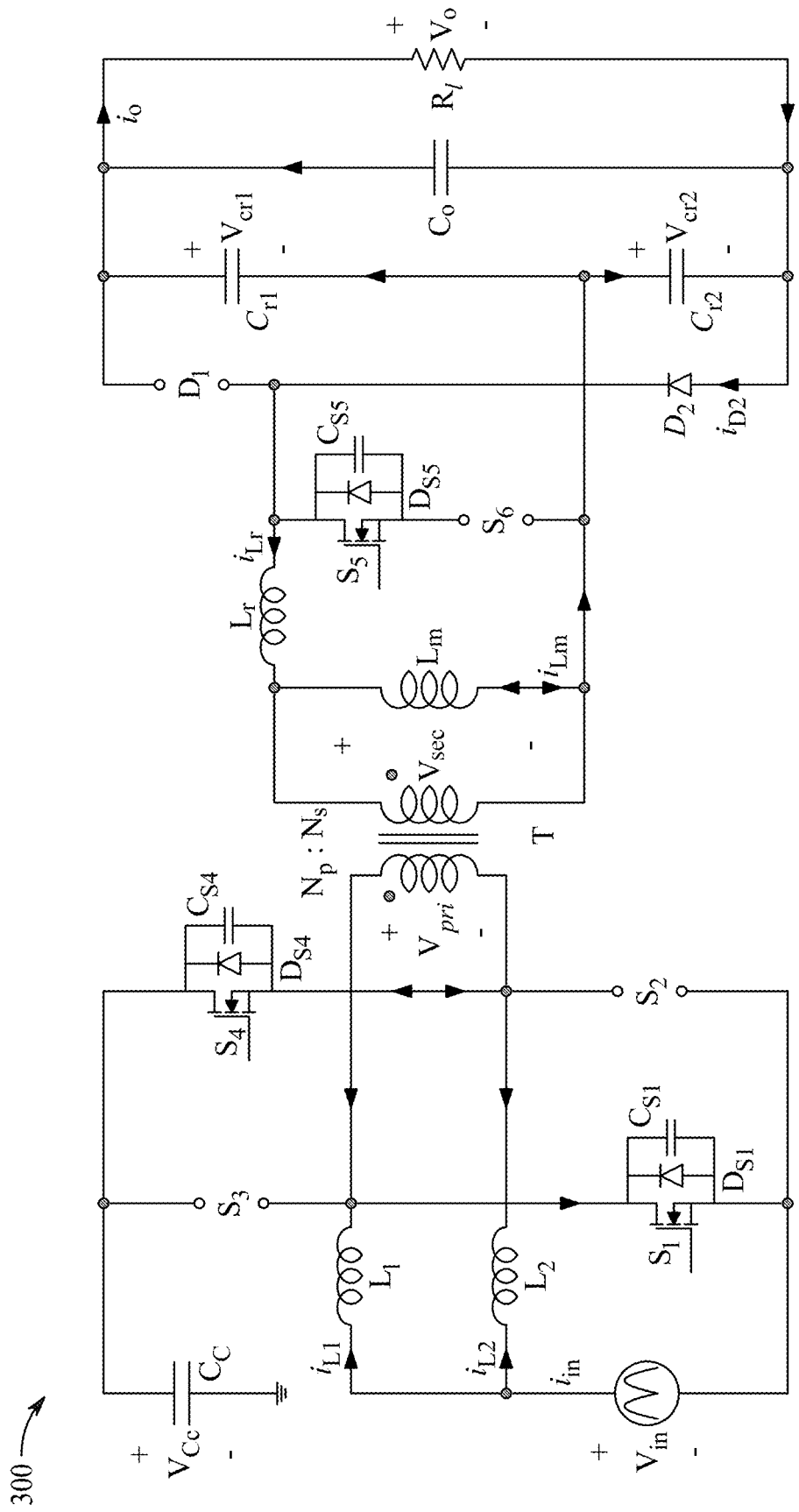
FIG. 3B illustrates an operating mode 2 of the AC/DC transformer-based converter, according to certain embodiments.

FIG. 3B depicts an operating mode 2 of the converter 300. At t1, switch $S_6$ is turned OFF with low voltage. The secondary voltage $V_{sec}=-nV_{Cc}$ is applied to the LC resonant tank. As a result, the current $i_{Lr}$ starts to flow sinusoidally. The mathematical expressions for this mode are derived from the resonance conditions and initial conditions set at t1. These mathematical expressions are:

$$L_r \frac{di_{L_r}(t)}{dt} = -nV_{C_c} + v_{c_{r2}}(t) \quad (4)$$

Solving (4) gives:

$$L_r \frac{di_{L_r}(t)}{dt} = -nV_{C_c} + v_{c_{r1}}(t) + V_o, \quad (5)$$

Performing nodal analysis for mode 2 gives:

$$i_{L_r}(t) = C_{r1} \frac{dv_{c_{r1}}(t)}{dt} - C_{r2} \frac{dv_{c_2}(t)}{dt} \quad (6)$$

$V_o = v_{cr1}(t) + v_{cr2}(t)$, solving (6) gives:

$$i_{L_r}(t) = C_{r1} \frac{dv_{c_{r1}}(t)}{dt} - C_{r2} \frac{d(V_o - v_{c_{r1}}(t))}{dt}$$

As $D_1$ is short circuited at this instant, $i_{Lr}(t)$ is given by:

$$i_{L_r}(t) = C_{r1} \frac{dv_{c_{11}(t)}}{dt} + C_{r1} \frac{dv_{c_{r1}}(t)}{dt} \quad (7)$$

$$i_{L_r}(t) = 2C_{r1} \frac{dv_{c_{r1}(t)}}{dt}$$

Applying initial conditions, we have $$v_{c_{r1}(t_1)} = -nV_{C_c} + V_o + r_1 \cos \alpha$$

$$i_{L_r}(t_1) = -\frac{r_1}{Z_r} \sin \alpha$$

where, $$r_1 = \frac{2nV_{in} + V_o}{2},$$

$$r_1 = -nV_{C_c} + \frac{V_o}{2}$$

and, $$\alpha = \sin^{-1}\left(\frac{-nV_{C_c}Z_r}{L_r r_1}(t_1 - t_0)\right)$$

Adding ripples $\Delta V_6$ in $r_1$ results in:

$$r_1 = -nV_{Cc} + \frac{V_o}{2} + \Delta V_{cr}$$

$r_1$ is the circular path radius centering at $(-nV_{Sc}+V_o, 0)$, as shown in FIG. 5. Solving (5) and (7) for $i_{Lr}$ and $v_{cr1}$ by using above initial conditions, gives:

$$v_{C_{r1}}(t_1) = -nV_{C_c} + V_o + r_1 \cos[\alpha + \omega_r(t-t_1)] \quad (8)$$

$$i_{L_r}(t_1) = -\frac{r_1}{Z_r} \sin[\alpha + \omega_r(t - t_1)] \quad (9)$$

Angular frequency $\omega_r$ and characteristics impedance $Z_r$ will be, $$\omega_r = \frac{1}{\sqrt{L_r(C_{r1} + C_{r2})}}, Z_r = \sqrt{\frac{L_r}{(C_{r1} + C_{r2})}} \quad (10)$$

Mode 2 operation follows from $B_1$ to $A_2$ in operation trajectory is shown in FIG. 5.

Figure 3C:
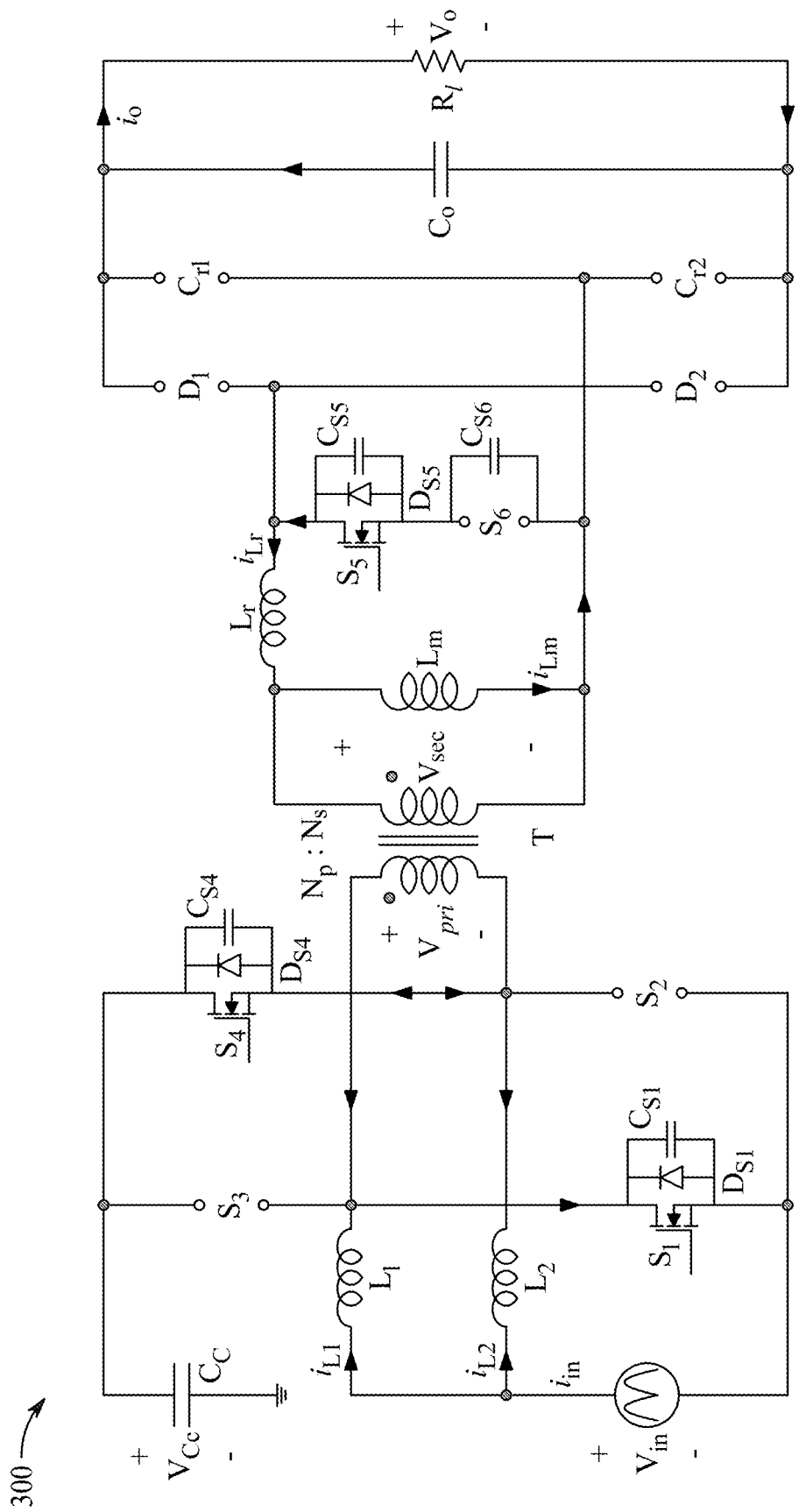
FIG. 3C illustrates an operating mode 3 of the AC/DC transformer-based converter, according to certain embodiments.

FIG. 3C depicts an operating mode 3 $[t_2, t_3]$ of the converter 300. At t2, the resonance formed by $C_{r1}$, $C_{r2}$, and $L_r$ comes to an end. The voltage $V_{cr1}$ discharges to its lowest value, and the current $i_{Lr}$ becomes zero, $i_{Lr}=0$. The diode $D_1$ has no effect due to the reverse recovery problem. In this mode, the active clamp circuit inductors $L_1$ and $L_2$ follow positive and negative slopes, respectively, giving:

$$i_{L_1}(t) = \frac{V_{in}}{L_1} \qquad (11)$$

$$i_{L_2}(t) = \frac{V_{in} - V_{C_c}}{L_2} \qquad (12)$$

Figure 3D:
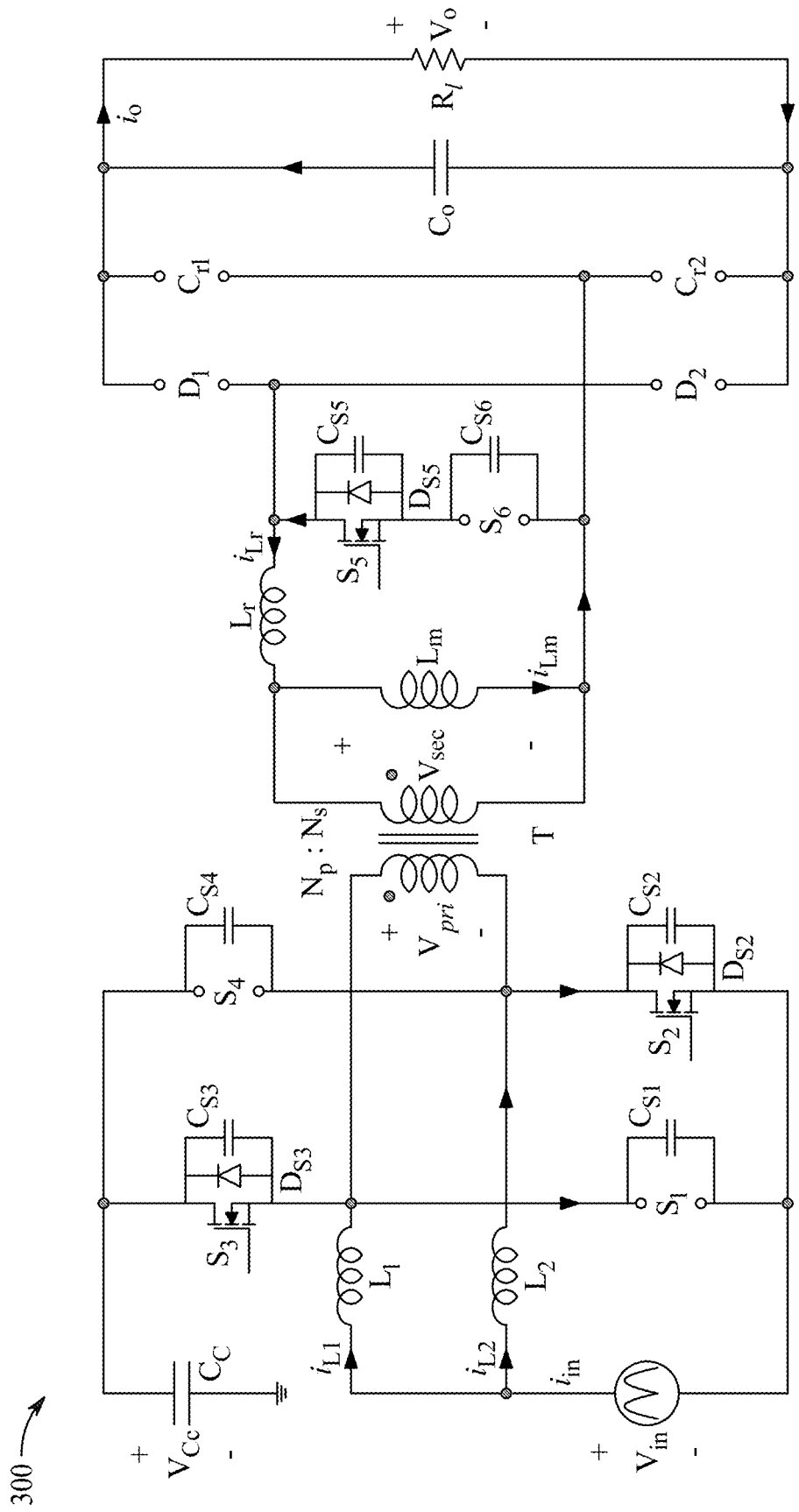
FIG. 3D illustrates an operating mode 4 of the AC/DC transformer-based converter, according to certain embodiments.

FIG. 3D depicts an operating mode 4 [t3, t4] of the converter 300. The trajectory of the operating mode 4 remains the same as in the operating mode 3. Current from diodes $D_{S2}$ and $D_{S3}$ discharges capacitors $C_{S2}$ and $C_{S3}$. The switching state changes from ON to OFF for switches $S_1$ and $S_4$ at t3. Switches $S_2$ and $S_3$ exhibit ZVS during turn ON.

As $v_{in}=|v_g|$, trajectory of the operating mode 4 stays at $A_2$ for this mode, is shown in FIG. 5.

Figure 4:
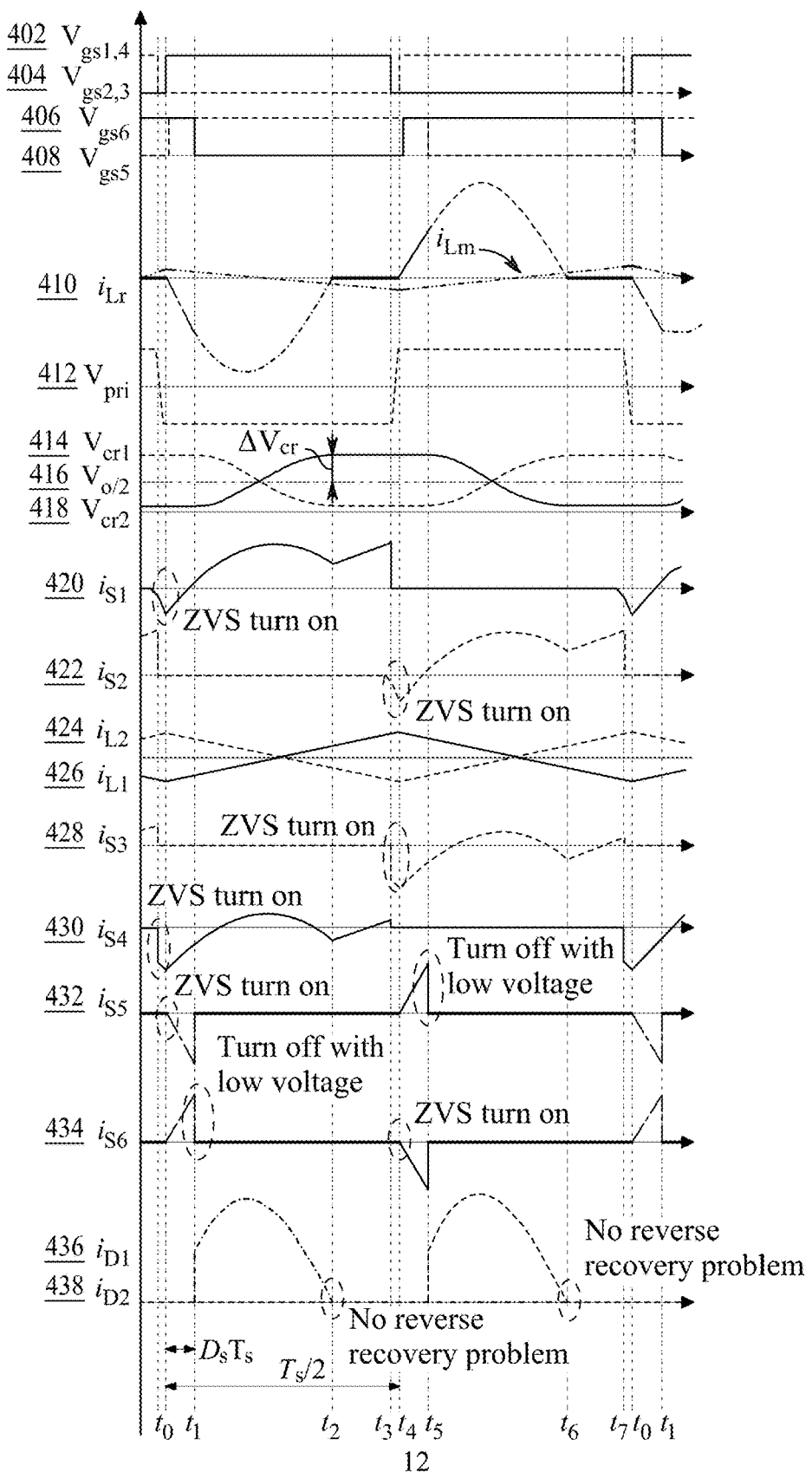
FIG. 4 illustrates a waveform analysis associated with the AC/DC transformer-based converter, according to certain embodiments.

FIG. 4 illustrates a theoretical analysis of the waveforms associated with the AC/DC transformer-based converter, depicting the operational characteristics during different modes of operation. The waveforms shown in FIG. 4 depict the voltage and current transitions across various components of the converter. The X axis depicts time and The Y axis depicts voltage and current transitions of various components of the converter.

Waveform 402 represents $V_{gs1,4}$ denoting the gate-source voltage for switches $S_1$ and $S_4$. Waveform 404 represents $V_{gs2,3}$ denoting the gate-source voltage for switches $S_2$ and $S_3$. Waveform 406 represents $V_{gs6}$ denoting the gate-source voltage for switch $S_6$. Waveform 408 represents $V_{gs5}$ denoting the gate-source voltage for switch $S_5$.

Waveform 410 represents the current $i_{Lr}$ through the resonant inductor $L_r$. Waveform 412 represents the magnetizing current $i_{Lm}$ through the transformer T. Waveforms 426 and 424 represent the currents through the primary inductors $L_1$ and $i_{L1}$, and $L_2$ and $i_{L2}$, respectively.

Waveform 420 represents the current $i_{S1}$ flowing through the switch $S_1$.

Waveform 422 represents the current $i_{S2}$ flowing through the switch $S_2$.

Waveform 428 represents the current $i_{S3}$ flowing through the switch $S_3$.

Waveform 430 represents the currents $i_{s4}$ flowing through the switch $S_4$.

Waveform 432 represents the current $i_{S5}$ flowing through the switch $S_5$.

Waveform 434 represents the current $i_{S6}$ flowing through the switch $S_6$.

Waveforms 436 and 438 represent the currents ($i_{D1}$ and $i_{D2}$) flowing through the diodes $D_1$ and $D_2$, respectively.

Waveform 412 represents the primary voltage $V_{pri}$ of the transformer T.

Waveforms 414 and 418 represent the voltages ($V_{cr1}$ and $V_{cr2}$) across the resonant capacitors $C_{r1}$ and $C_{r2}$, respectively.

Waveform 416 represents $V_o/2$ which is half of the output voltage $V_o$.

In steady state analysis, for the first half of the switching cycle, $S_i$(i=1, 4) and $S_i$(i=2, 3) showed alternative switching over the time period.

In voltage conversion ratio, volt-second balance law is applied over the switching period gives, $L_1=L_2$, $$V_{in}D_pT_s+(V_{in}-V_{Cc})(D_p')T_s=0 \qquad (13)$$

Setting $D_p=0.5$, in (13), expressions relating the input voltage $V_{in}$ to the voltage $V_{Cc}$ of the clamp capacitor as shown:

$$V_{in}-0.5V_{Cc}=0,$$

$$V_{Cc}=2V_{in} \qquad (14)$$

Ripples of the voltage across resonant capacitor and the calculation of $\Delta V_{cr}$ is necessary initially to obtain the gain of the converter. During interval $[t_1-t_2]$, half of the average current that flows from resonant inductor $i_{Lr}$ is delivered to the output load, as the voltage doubler circuit on the secondary side of transformer T shows symmetrical operation. Average output current $I_o$ is, $$I_o = \frac{2}{T_s}\int_{t_1}^{t_2}\left|-\frac{r_1}{2Z_r}\sin[\alpha+\omega_r(\tau-t_1)]\right|d\tau = \frac{1}{T_sZ_r\omega_r}[r_1(1+\cos\alpha)] = \frac{2\Delta V_{cr}}{T_sZ_r\omega_r'} \qquad (15)$$

Substituting $C_r=1/Z_r\omega_r$ in (15) yields, $$I_o = \frac{2C_r\Delta V_{C_r}}{T_s}. \qquad (16)$$

As $$I_o = \frac{2P_o\sin^2\omega_g t}{V_0},$$

substituting into eq. (16) yields $\Delta V_{cr}$, $$\Delta V_{C_r} = \frac{P_oT_s\sin^2(\omega_g t)}{V_oC_r} \qquad (17)$$

where the rated output power is denoted by $P_o$. At $t_1-t_2=D_nT_s$ to (2) and (3), $i_{Lr}(t)$ and $v_{cr}(t)$ at $t_1$ may be calculated by using the nominal duty ratio $D_n$, as shown in FIG. 6, to give:

$$i_{Lr}(t_1) = \frac{-2nv_{in}}{L_r}D_nT_s \qquad (18)$$

$$v_{cr1}(t_1) = \frac{V_o}{2} + \Delta V_{cr} \qquad (19)$$

FIG. 5 illustrates the operation trajectory of the converter during its various operating modes. The trajectory represents the dynamic behaviour of the resonant current $Z_ri_{Lr}$ and the resonant capacitor voltage $v_{cr1}$ in the converter. The operation trajectory is plotted on a phase plane defined by the resonant current and the resonant capacitor voltage, providing a visual representation of the transitions between different operating points during operation of the converter.

As depicted in FIG. 5, the trajectory follows a circular path around points A1, B1, A2, and B2. The circular path is centred around the point (−2nvin+$V_o$, 0). Points A1 and A2 represent the positions where the resonant current ZriLr is zero, and the resonant capacitor voltage vcr1 reaches its extreme values.

Points B1 and B2 represent the positions where the resonant capacitor voltage vcr1 is zero, and the resonant current ZriLr reaches its peak values.

A circular segment 502-1 connects points B2 and A1, and a circular segment 502-2 connects points B1 and A2. The segments (502-1, 502-2) indicate the trajectory of the resonant current and voltage during an operation of the converter. The radius r1 of the segments (502-1, 502-2) is determined by the resonant tank parameters and the initial conditions.

A vertical segment 504-1 connects A2 to B2, and a vertical segment 504-2 connects A1 to B1. The vertical segments (504-1, 504-2) represent the transitions between different operating modes, where the resonant capacitor voltage changes rapidly while the resonant current remains constant.

The angle α at the center of the circular path represents the phase angle between the resonant current and the resonant capacitor voltage. The phase angle α is a parameter used in determining the ZVS conditions and the efficiency of the converter.

The radius $r_1$ centered at $(-nv_{in}+V_o, 0)$ is calculated by substituting Equations (18) and (19) into Equation (20). The nominal duty cycle $D_n$ is calculated by:

$$D_n = \frac{1}{nV_{rms}}\sqrt{\frac{L_r P_o}{T_s}\left(1 - \frac{1}{M}\right)} \quad (20)$$

where $V_{rms}$ represents the root mean square value of the grid voltage, and $V_o\_M = 4nv_{in}$, where $V_o M$ is voltage gain of the converter.

Figure 6A:
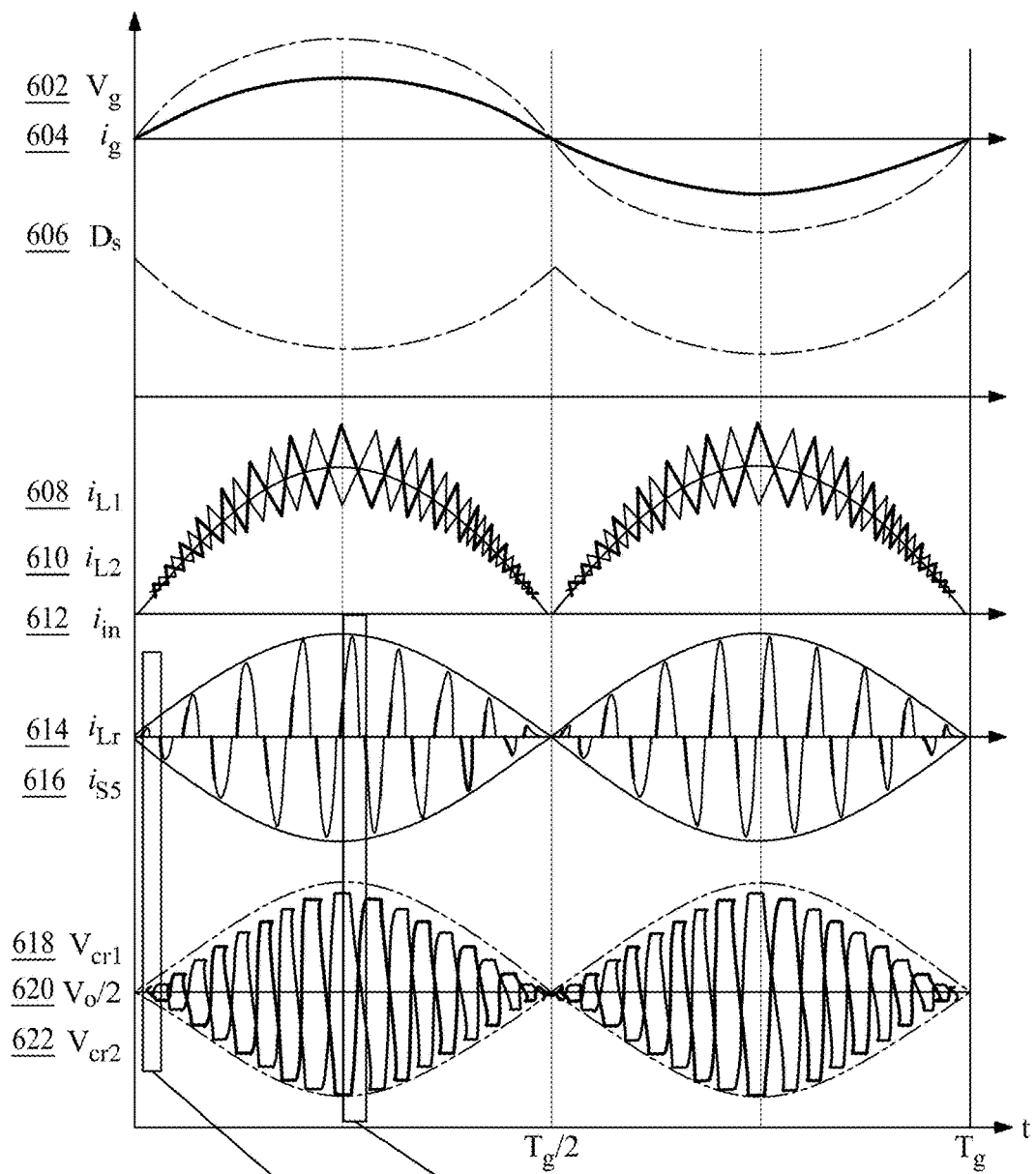
FIG. 6A illustrates a waveform analysis of AC/DC transformer-based converter during a grid cycle, according to certain embodiments.

FIG. 6A illustrates the AC/DC converter waveforms during a grid cycle. These waveforms depict the dynamic behavior of various currents and voltages within the converter over the grid cycle. The grid cycle time shift $T_g$ represents the periodic variations in grid voltage and current, affecting an operation of the converter. As depicted in FIG. 6A, the following waveforms are categorized as grid voltage and current, inductor currents, resonant inductor current and switch current, and voltage waveforms.

Waveform 602 represents the grid voltage ($V_g$) waveform.

Waveform 604 represents the grid current ($i_g$) waveform.

Waveform 606 represents the duty cycle ($D_s$) modulation of the secondary side converter switches.

Waveform 608 and waveform 610 represent the currents, $i_{L1}$ and $i_{L2}$, through the primary inductors $L_1$ and $L_2$, respectively.

Waveform 612 is the input current ($i_{in}$) waveform, which is the sum of the inductor currents.

Waveform 614 represents the current ($i_{Lr}$) through the resonant inductor $L_r$.

Waveform 616 represents the current ($i_{S5}$) through switch $S_5$.

Waveform 618 represents the voltage ($V_{cr1}$) across the resonant capacitor $C_{r1}$.

Waveform 620 represents half of the output voltage ($V_o/2$).

Waveform 622 represents the voltage ($V_{cr2}$) across the resonant capacitor $C_{r2}$.

Figure 6B:
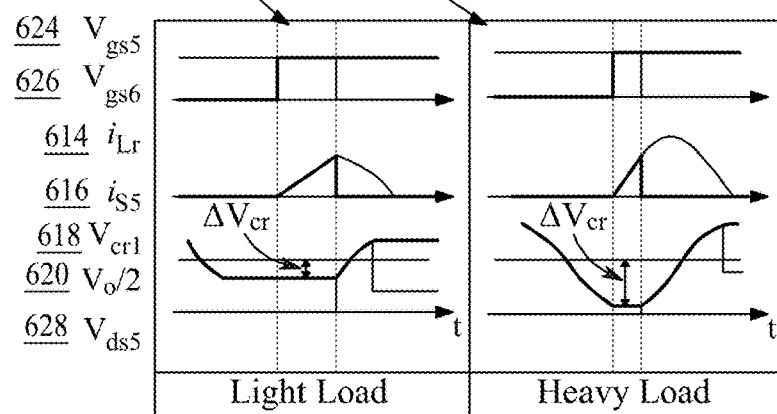
FIG. 6B is an exploded form of the waveform analysis, as illustrated in FIG. 6A, according to certain embodiments.

FIG. 6B is an exploded form of the waveform analysis also depicting the gate voltages of switches S5 and S6, as well as the currents through the resonant inductor Lr and the current through switch 5, and the drain voltage of switch 5, for two operating conditions, a light load condition and a heavy load condition.

During light load conditions, the gate-source voltages $V_{gs5}$ are depicted by waveform 624 and $V_{gs6}$ as depicted by waveform 626 for switches $S_5$ and $S_6$ are represented. The resonant inductor current $i_{Lr}$, as depicted by waveform 614 and the current through switch $i_{S5}$, as depicted by waveform 616, exhibit lower amplitude oscillations. The resonant capacitor voltage $V_{cr1}$, as depicted by waveform 618, displays smaller ripple $\Delta V_{cr}$ due to the reduced load demand. Half voltage output is depicted by waveform 620. The voltage at the drain of switch $S_5$($V_{ds5}$) is depicted by waveform 628.

Under heavy load conditions, the gate-source voltages $V_{gs5}$ as depicted by waveform 624 and $V_{gs6}$ as depicted by waveform 626 for switches $S_5$ and $S_6$ represent higher frequency switching. The resonant inductor current $i_{Lr}$, as depicted by waveform 614, and the current through switch $i_{S5}$, as depicted by waveform 616, exhibit increased amplitude oscillations. The resonant capacitor voltage $V_{cr1}$, as depicted by waveform 618, displays larger ripple $\Delta V_{cr}$ due to the higher load demand. Half voltage output is depicted by waveform 620 that remains constant. The voltage across switch $S_5$, $V_{ds5}$, is depicted by waveform 628.

Figure 7:
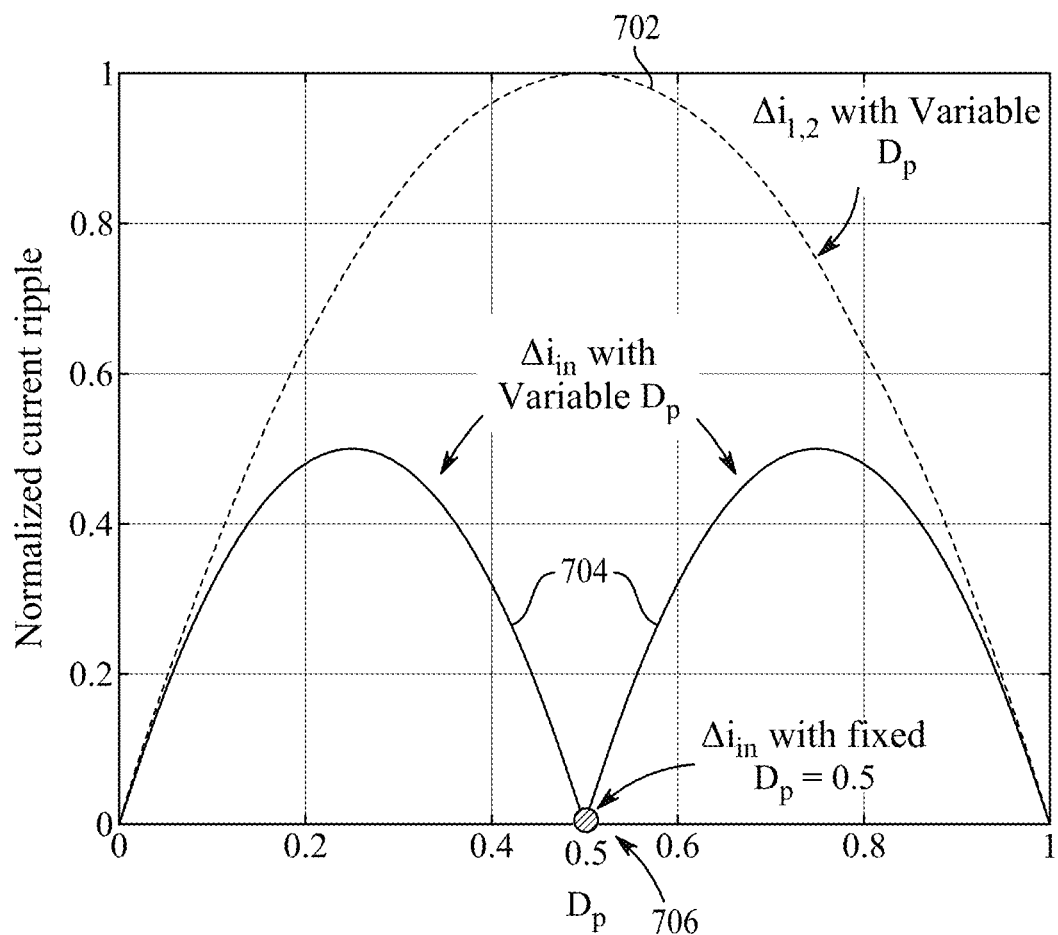
FIG. 7 illustrates a normalized form of current ripples in an input current of the AC/DC transformer-based converter, according to certain embodiments.

FIG. 7 illustrates the normalized form of current ripples in the input current of the converter. The graph depicts the behavior of current ripples during a duty cycle of the primary side of the converter $D_p$, representing performance of the converter in minimizing input current ripple.

Using the expression for current ripples, $$\Delta i_L = 2L(\Delta v_c T_s)$$

As $L_1 = L_2$, input inductor current ripples at switching frequency $f_s$ are:

$$\Delta i_{L1} = \Delta i_{L2} = \frac{v_{in} D_p}{L f_s}(1 - D_p) \quad (21)$$

As illustrated in FIG. 7, curve 702 represents the current ripple of each inductor $\Delta i_{L1,L2}$ with a variable duty cycle $D_p$. Curve 704 represents the normalized input current ripple $\Delta i_{in}$ with a variable duty cycle $D_p$. Dot 706 marks the point where the input current ripple is minimized at $D_p=0.5$.

The graph demonstrates that the input current ripple $\Delta i_{in}$ reaches its minimum value when the duty ratio $D_p$ is fixed at 0.5. This indicates that the converter operates most efficiently with minimal current ripple at $D_p=0.5$, ensuring stable and smooth power conversion.

The effect of changes in the value of $D_p$ on ripples of normalized $\Delta i_{in}$ is as follows:

If $D_p=0.5$, then $$\Delta i_{in} = \frac{v_{in} D_p}{L f_s} - \frac{v_{in} D_p^2}{L f_s} - \frac{v_{in} D_p^2}{L f_s} \quad (22)$$

$$\Delta i_{in} = \frac{v_{in} D_p}{L f_s} - 2\frac{v_{in} D_p^2}{L f_s}$$

If $D_p > 0.5$, then $$\Delta i_{in} = \frac{v_{in} D_p^2}{L f_s} - \frac{v_{in} D_p}{L f_s} + \frac{v_{in} D_p^2}{L f_s} \quad (23)$$

$$\Delta i_{in} = 2\frac{v_{in} D_p^2}{L f_s} - \frac{v_{in} D_p}{L f_s}$$

Hence, $$\Delta i_{in} = \begin{cases} \frac{v_{in} D_p}{L f_s}(1 - 2D_p), & \text{if } D_p \leq 0.5 \\ \frac{v_{in} D_p}{L f_s}(2D_p - 1), & \text{if } D_p > 0.5 \end{cases} \quad (24)$$

The current ripples in each inductor range from 0 to 1 according to changes in $D_p$. Due to their 180° phase differences, $i_{L_1}$ and $i_{L_2}$ result in very much lower ripple current. When $D_p=0.5$, ripple-free current appears because of the cancellation of $i_{L1}$ and $i_{L2}$, such as $\Delta i=0$. The principal switches ($S_1$, $S_2$, $S_3$, $S_4$) are operated at 50% duty ratio in the converter, which naturally results in a current that is ripple-free. The duty cycle of bidirectional switches is accordingly adjusted to obtain the desired input current and output voltage.

The normalized current ripple analysis thus serves in optimizing the converter design for minimal ripple and enhanced performance. By adjusting the duty cycle Dp, the converter operates with optimal efficiency, reducing electromagnetic interference (EMI) and improving overall power quality, which are essential for reliable and efficient EV charging systems.

Figure 8A:
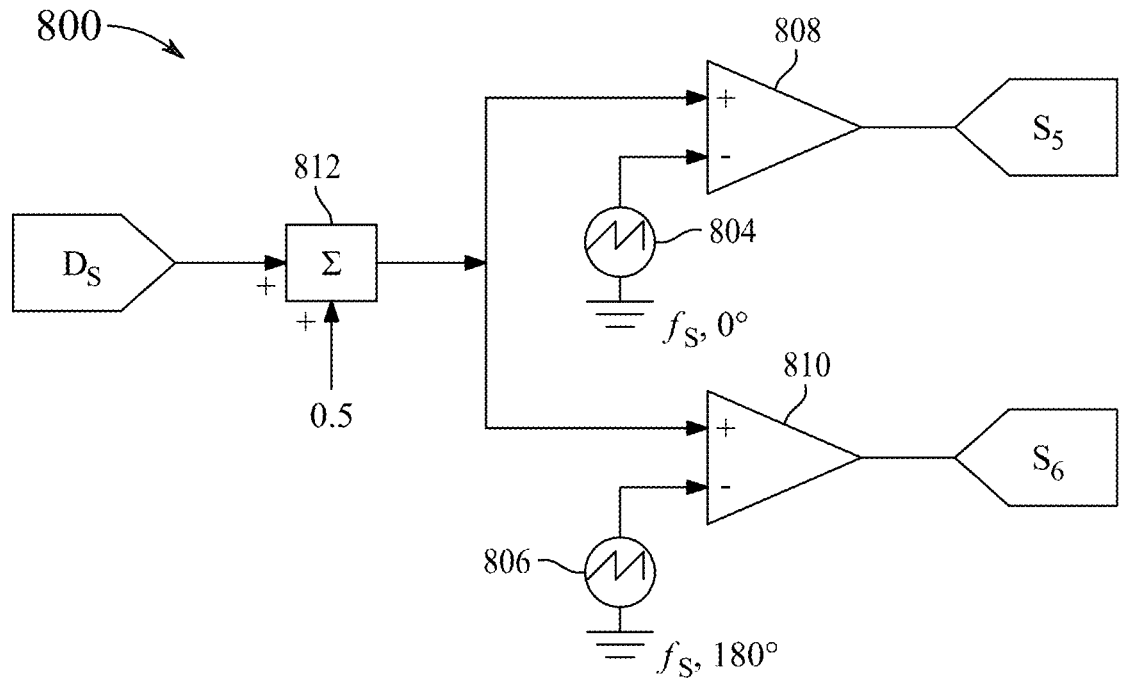
FIG. 8A illustrates a pulse width modulation (PWM) signal generator for a secondary side bidirectional switch in an AC/DC controller implemented for the AC/DC transformer-based converter, according to certain embodiments.

FIG. 8A illustrates a PWM signal generator which generates the gate drive signals for the secondary switches in the AC/DC controller implemented for the converter. The AC/DC controller is configured to manage the bidirectional switches $S_5$ and $S_6$, on the secondary side of the converter, to facilitate efficient switching operations, minimizing switching losses and improving heat distribution.

The bidirectional switches $S_5$ and $S_6$ are controlled to turn-off with a voltage nearly equal to zero during high immediate power conditions and with a voltage nearing half of the output voltage during low immediate power conditions. Such control strategy reduces the stress on the principal switches, thereby minimizing switching losses and improving heat distribution.

A signal generator 804 produces a signal at frequency $fs$ with a phase shift of 0°. The signal is fed to the non-inverting input of the op-amp 808, generating a PWM signal for switch $S_5$.

A signal generator 806 produces a signal at frequency $fs$ with a phase shift of 180°. The signal is fed to the non-inverting input of the op-amp 810, generating a PWM signal for switch $S_6$.

The sum 812 of the duty cycle $D_s$ and a fixed ratio of 0.5 is fed into the inverting inputs of the respective op-amps, ensuring precise control of the bidirectional switches.

Figure 8B:
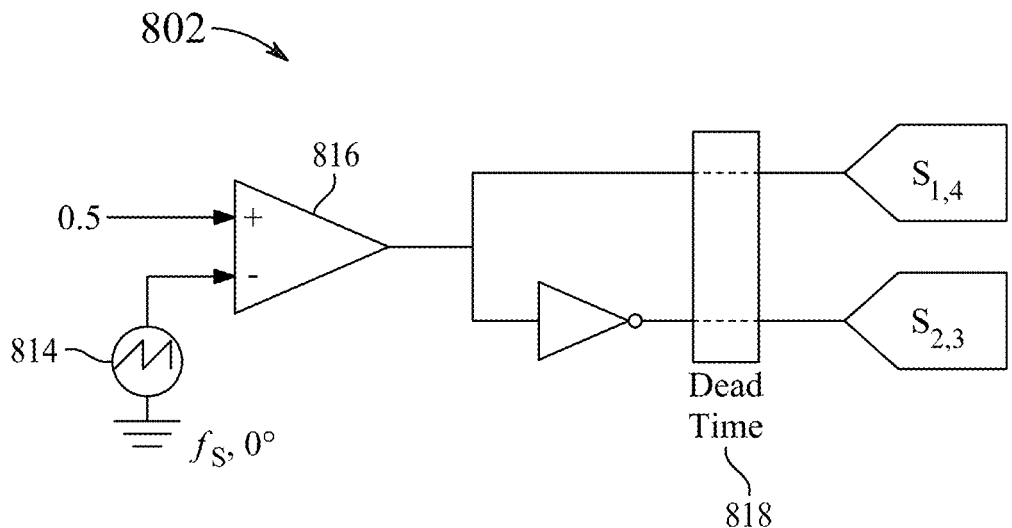
FIG. 8B illustrates the PWM signal generator for a plurality of primary side switches in the AC/DC controller implemented for the AC/DC transformer-based converter, according to certain embodiments.

FIG. 8B illustrates a PWM signal generator for the primary switches in the AC/DC controller implemented for the converter.

A signal generator 814 produces a signal at frequency $fs$ with a phase shift of 0°. The signal is fed to the non-inverting input of the op-amp 816, generating a PWM signal for switches $S_1$, $S_2$, $S_3$, and $S_4$.

A fixed duty ratio 0.5 is applied to the inverting input of the op-amp, ensuring the generation of a PWM signal with a 50% duty cycle for the primary switches.

The output of the op-amp 816 is fed through a dead time generator 818 to ensure appropriate dead time between the switching of ($S_1$, $S_4$) and ($S_2$, $S_3$), preventing simultaneous conduction and reducing switching losses.

The signal generators (804, 806, and 814) in FIGS. 8A and 8B are configured to control the primary and secondary switches effectively, ensuring efficient operation of the converter. By managing the switching sequences and timings, the controller minimizes switching losses and distributes heat more evenly, enhancing the overall performance and reliability of the converter.

Figure 9:
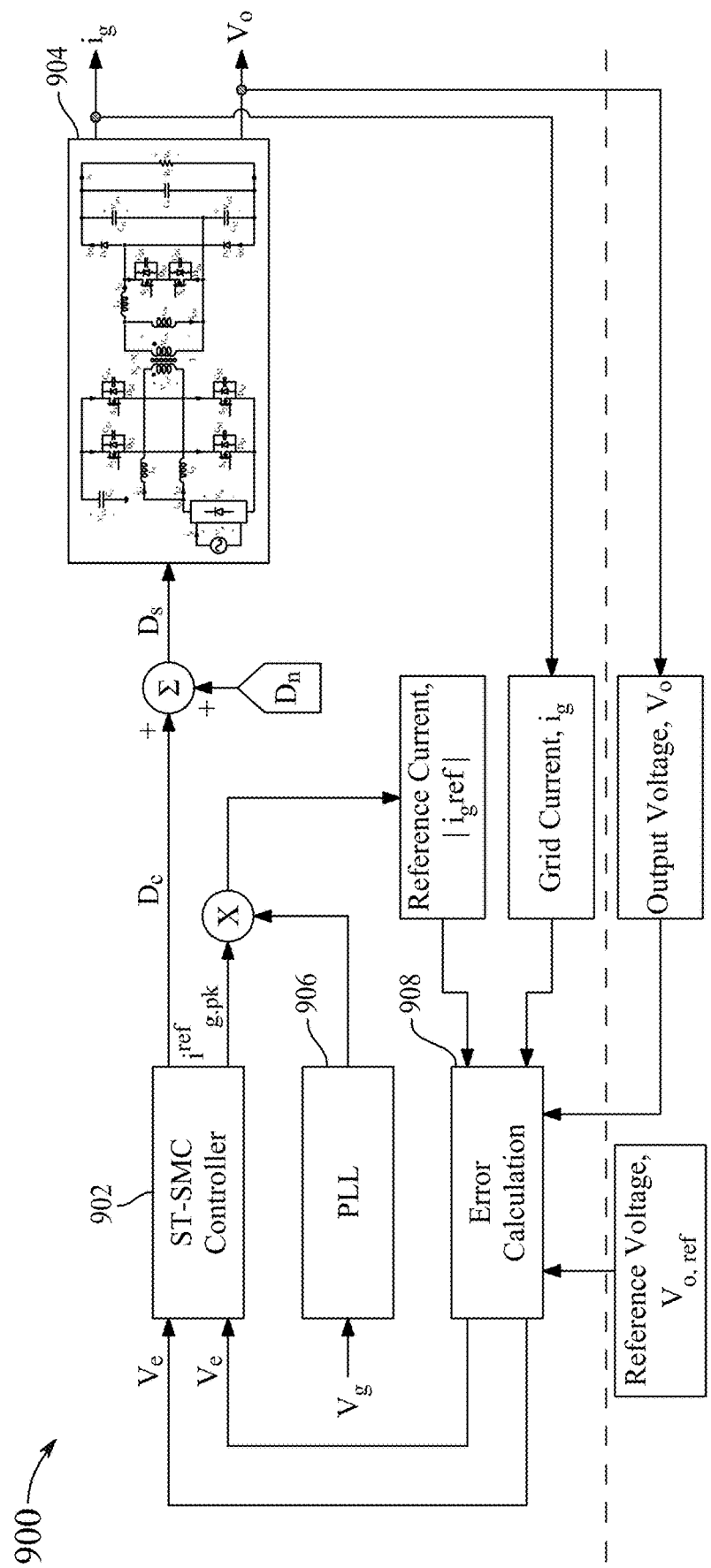
FIG. 9 illustrates a block diagram of a converter system for charging an EV battery, according to certain embodiments.

FIG. 9 illustrates a block diagram of a converter system 900 for charging an EV battery. The converter system 900 is configured to regulate the output voltage $V_o$ using an outer loop control while controlling the grid current $i_g$ with an inner loop control.

As depicted in FIG. 9, the converter system 900 includes a super twisting sliding mode controller (ST-SMC) 902, the AC/DC transformer-based converter 904, a phase-locked loop (PLL) 906, and an error calculation unit 908. In one aspect, a feedback loop is connected between the alternating voltage source and the output voltage of the AC/DC transformer-based converter 904 and the ST-SMC 902. The error calculation unit 908 is located in the feedback loop and is configured to receive a grid current of the alternating voltage source and a grid reference current generated by the super-twisting sliding mode controller, the output voltage, and a reference.

The outer loop is configured for regulating the output voltage $V_o$ to match the reference voltage $V_{o,ref}$. The reference voltage $V_{o,ref}$ is compared with the actual output voltage $V_o$, and the error $V_e$ is calculated by the error calculation unit 908. This error $V_e$ is then used to determine the desired peak current $I^{ref}_{g,pk}$. The peak current $I^{ref}_{g,pk}$ is multiplied by the absolute value of $|sin(w_g t)|$ to generate the reference current $i_{g,ref}$.

The inner loop control focuses on maintaining the grid current $i_g$ in phase with the grid voltage $V_g$ to achieve near unity power factor. The reference current $i^{g,ref}$ is compared with the actual grid current $i_g$, and the difference between these currents generates the error signal $i_e$. This error signal $i_e$ is fed into the ST-SMC 902, which processes the error to generate the desired duty cycle components.

The ST-SMC 902 receives the error signal $i_e$ and computes the necessary duty cycle $D_c$ to adjust switching process of the converter. The nominal duty cycle $D_n$, calculated using a predefined expression, Equation 20. The entire duty cycle for bidirectional switches is determined as:

$$D_s = D_c + D_n$$

where $D_n$ is the nominal duty-ratio, which is determined from equation (20), and $D_c$ is the output of the ST-SMC 902. The ST-SMC 902 keeps the grid current $i_g$ and the grid voltage $V_g$ are in phase, optimizing power factor and reducing THD. The ST-SMC 902 keeps the output voltage $V_o$ at the intended output voltage $V_{o,ref}$.

The PLL 906 synchronizes with the grid voltage $V_g$ and generates a reference signal $|sin(w_g t)|$ used in the outer loop for calculating the reference current $i_{g,ref}$. The error calculation unit 908 computes the voltage error $V_e$ by comparing the reference voltage $V_{o,ref}$ with the actual output voltage $V_o$ and calculates the current error $i_e$ by comparing the reference current $i_{g,ref}$ with the actual grid current $i_g$.

The AC/DC transformer-based converter 904 receives the duty cycle $D_s$ of secondary side and adjusts the switching of the converter to regulate the output voltage $V_o$ and control the grid current $i_g$. The AC/DC transformer-based converter 904 thus renders efficient power conversion, maintaining the desired output voltage $V_o$ and synchronizing the grid current $i_g$ with the grid voltage $V_g$.

The converter system 900, by synchronizing the grid current $i_g$ with the grid voltage $V_g$, achieves the near unity power factor, ensuring efficient power usage. The ST-SMC 902 accurately tracks the required current $I_{st-smc}$ to its reference value $i_{g,ref}$. The converter system 900 minimizes THD for both input current and voltage, enhancing overall power quality. The converter system 900 is designed to support a 1.2 kW battery charger for DC fast charging in grid-to-vehicle (G2V) mode, ensuring safe and efficient battery charging.

PI controllers, as used traditionally, struggle to effectively manage complex dynamics, whereas the ST-SMC 902 is effective at handling nonlinear systems. In sliding mode controllers, a phenomenon known as chattering occurs when control signals rapidly transition between values near the sliding surface. The ST-SMC 902 is designed to reduce the chattering, making it a smoother and more effective control approach compared to the traditional PI controllers. The ST-SMC 902 demonstrates greater robustness in compensating for external perturbations and disturbances, providing a faster transient response than the traditional PI controllers.

The converter system 900 of the present disclosure is configured to achieve the aforementioned objectives, including power factor correction, and tracing the desired grid current with less THD. Additionally, the ST-SMC 902 regulates the DC output voltage for both 400V and 800V EV batteries. These objectives have been accomplished using an AC/DC single-stage current-fed resonant converter with bidirectional switches. The converter system 900 has been configured for the fast charging of EVs according to different operating modes.

To obtain the sliding surface, first an error x is specified, which is the difference between the required value $x_d$ of the grid current and the actual value x. As a result, $$\tilde{x} = X - X_d \tag{25}$$

The tracking error vector is given by, $$\tilde{x} = x - X_d = [\tilde{x}, [d\tilde{x}/dt], \ldots, \tilde{x}^{(n-1)}]^T \tag{26}$$

A sliding surface S(t) is defined as time-varying in the statespace $\mathbb{R}^n$ with the scalar $\mathbb{R}$ equation S(x; t)=0, expressed as:

$$S(x, t) = \left(\frac{d}{dt} + \lambda\right)^{n-1} \tilde{x} \tag{27}$$

Where $\lambda$ is a large positive constant. For $2^{nd}$ order systems, Equation (27) takes the form, $$S = \tilde{x} + \lambda \frac{d\tilde{x}}{dt} \tag{28}$$

control input (u): As $\dot{S} \to 0$, $$u = -k\,\mathrm{sgn}(S)|S|^n + w + F^*$$

$$\dot{w} = -w\,\mathrm{sgn}(S) \text{ where } w = 1.1k \tag{29}$$

and, $$F^* = -k\tilde{x} \tag{30}$$

now, control input (u)=reaching law+supertwisting term. Therefore, Equation (30) is expressed as:

$$u = -k\,\mathrm{sgn}(S)|S|^{n-1} - 1.1\int k\,\mathrm{sgn}(S) - k \tag{31}$$

Control is discontinuous across the manifold S=0, in u=λsgn(S), but it has the chattering phenomenon applied. To solve the chattering problem, the sliding mode control is implemented. For this continuous smooth approximation, i.e., SAT: u=Usat(S, e)
TANH: u=Utanh(S)

However, such implementation is applicable only in special cases in the absence of severe uncertainties, where control actions opposing them can be nullified within the sliding mode. It also may result in a loss of robustness.

Therefore, second order sliding mode control (2-SMC), Eq. (31), is used to avoid the aforementioned limitations present in sliding mode control implementation.

Further, switch loss analysis is performed for the converter of the present disclosure. The switches show ZVS for turn ON while the diodes show zero current phenomena for turn ON/OFF. Consequently, switching losses are only computed at turn OFF. Total switching losses are given as:

$$P_{s/w-total} = \sum_{k=1}^{n} P_{s/w}, s'k' = \tag{32}$$

$$\sum_{k=1}^{n} P_{off}, s'k' = V_{dsoff,S'k'} \cdot i_{s-off,S'k'} \cdot \frac{t_{off,S'k'}}{2T_s}$$

Where $P_{s/w}$,s'k' is the representation of switching loss of k-th switch, s/w(k=1, ... 6). At turn-off instant, $v_{dsoff}$,S'k' is the voltage across the kth switch while $i_{s-off}$,s'k' is the current at turn-off instant. Similarly, $t_{off}$,s'k' shows turning OFF time at kl switch.

At $S_1$ and $S_2$, switching losses are same in the converter of the present disclosure. Thus, $$P_{s/w-S_1} = P_{s/w-S_2} = P_{off-S_1} \tag{33}$$

with, $$P_{off-S_1} = 2v_{in}\left(-\frac{v_{in}}{L_1} + \frac{n^2 V_{Cc}}{L_m}\right) \cdot \frac{t_{off,S_1}}{T_s} \tag{34}$$

similarly for $S_3$ and $S_4$ the switching losses are given as:

$$P_{s/w-S_3} = P_{s/w-s_4} = P_{off-S_3} \tag{35}$$

$$P_{off-S3} = 2v_{in}\left(-\frac{v_{in}}{L_1} + \frac{n^2 V_{Cc}}{L_m}\right) \cdot \frac{t_{off,S_3}}{T_s} \tag{36}$$

For $S_5$ and $S_6$, the switching losses are:

$$P_{s/w-S_5} = P_{s/w-S_6} = P_{off-s5} \tag{37}$$

$$P_{off-S_5} = \left(\frac{v_o}{2} - \Delta V_{er}\right) \cdot \frac{r_1}{2Z_r} \sin(w_r D_s T_s) \cdot \frac{t_{off,s5}}{T_s} \tag{38}$$

In another aspect of the present disclosure, conduction losses are calculated for the converter.

$$P_{cond-total} = \sum_{j=1}^{n} P_{conul,s'j'} + \sum_{i=1}^{n} +P_{cond,D'i'} + P_{cond,D_{rect}} = \tag{39}$$

$$I_{S'j'}^2 R_{ds'j'} + V_{D'i'} I_{D'i'} + V_{D_{rect}} I_{D_{rect}}$$

In Equation (39), $P_{cond}$,S'j' is the loss of the $j_{th}$ switch j= (1, ..., 6) during conduction, $p_{cond,D}$'i' is the conduction loss of i-th diode m=(1,2), and $P_{cond,D}$'i' shows the loss of the rectifier diode during conduction. $I_D$'i' is the root mean square (RMS) value of the current flowing through $I_s$'i', and $R_{ds-on}i$ is the on state resistance of S'i'; while $V_D{}'i'$ and $I_D{}'j'$ are the forward voltage and average current flowing through $D_{rect}$, respectively.

FIG. 10A to FIG. 22 of the present disclosure illustrate analysis of the converter performed within 400V and 800V EVs charging systems. Most EVs currently operate at a 400V voltage level, with only a few exceptions diverging from this standard. The primary requirements of the EVS operating at 400V focus on achieving longer range and faster charging, both of which depend on the capabilities of the battery. Various ongoing research aims to address these challenges, with the most effective solution being the elevation of battery voltage. While most EV batteries conventionally operate at 400V, manufacturers are actively reconfiguring their vehicles towards 800V architectures. The increase in battery voltage promises augmented energy capacity, enhanced charging levels, improved efficiency, superior performance, and reduced weight for EV components, such as motors and inverters. Charging speed primarily depends on the output power of the charger, determined by voltage and current. Increasing the charging current would result in greater heat generation and energy dissipation. Consequently, raising the voltage is a preferred approach to amplify power and achieve accelerated charging. With a doubled voltage and an equivalent current, an EV charger could potentially supply nearly twice the energy to the EVs.

Therefore, the converter of the present disclosure has been configured to function effectively in both, i.e., 400V and 800 V, architectures. The converter is analysed, and the analysis result is presented in the subsequent disclosure.

FIG. 10A illustrates the analysis of waveform 1002 representing $i_{D1}$ and waveform 1004 representing $i_{D2}$ for a 400V configuration. The waveforms are the current waveforms at a time scale of 30 ms/div. FIG. 10B is an exploded view of the waveforms depicted in FIG. 10A, illustrating the intervals where the currents exhibit no reverse recovery problems. The waveforms (1002, 1004) demonstrate the effective switching behavior of the diodes, ensuring minimal losses and efficient operation of the converter.

Figure 11A:
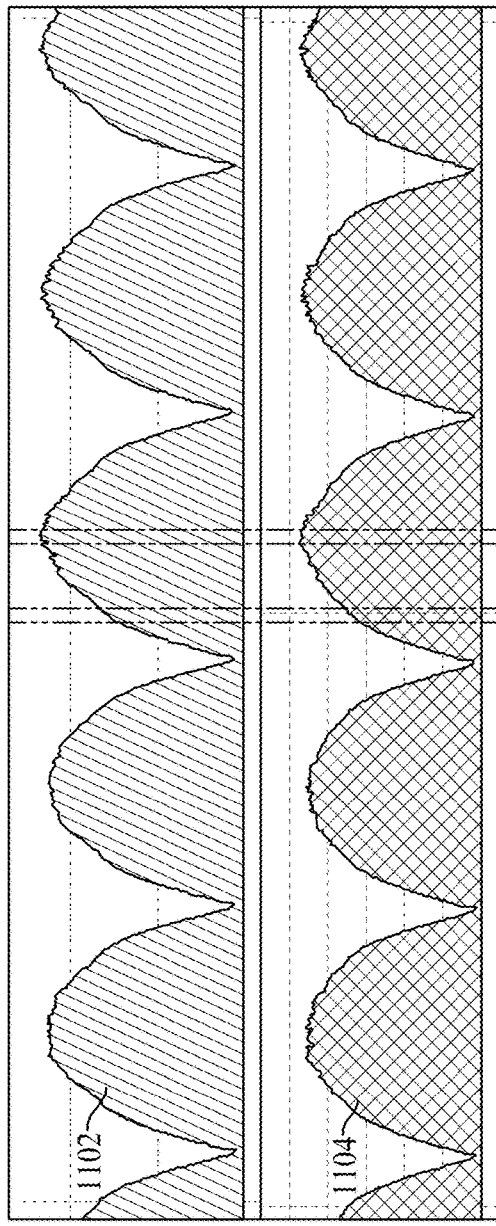
FIG. 11A illustrates an analysis of waveforms $i_{D1}$ and $i_{D2}$ for an 800V configuration, according to certain embodiments.
Figure 11B:
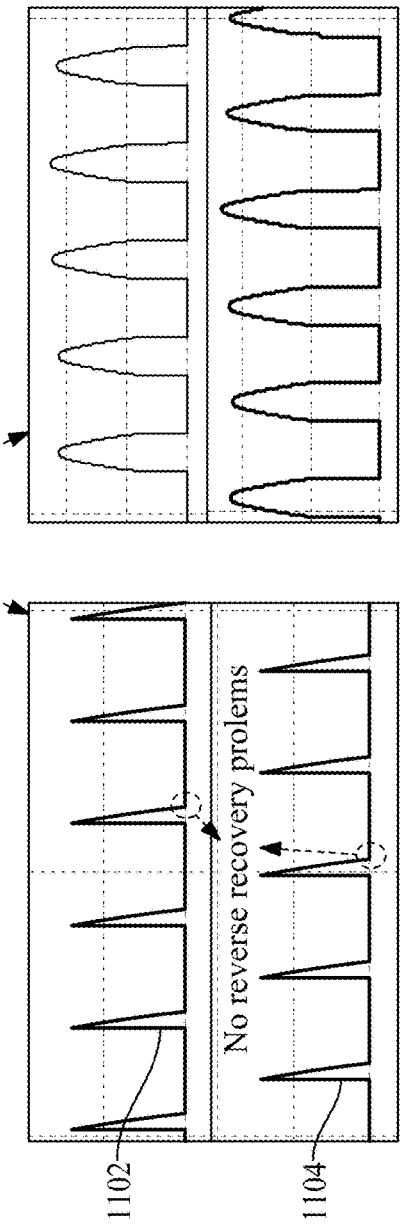
FIG. 11B is an exploded view of waveforms of the currents $i_{D1}$ and $i_{D2}$, according to certain embodiments.

FIG. 11A presents the analysis of waveform 1102 representing $i_{D1}$ and waveform 1104 representing $i_{D2}$ for an 800V configuration. The graph displays the current waveforms $i_{D1}$ 1102 and $i_{D2}$ 1104 at a time scale of 30 ms/div. FIG. 11B provides an exploded view of the currents $i_{D1}$ and $i_{D2}$, emphasizing the absence of reverse recovery problems at a time scale of 0.1 ms/div. The waveforms (1102, 1104) indicate ability of the converter to handle higher voltage configurations effectively while maintaining efficient diode operation.

Figure 12A:
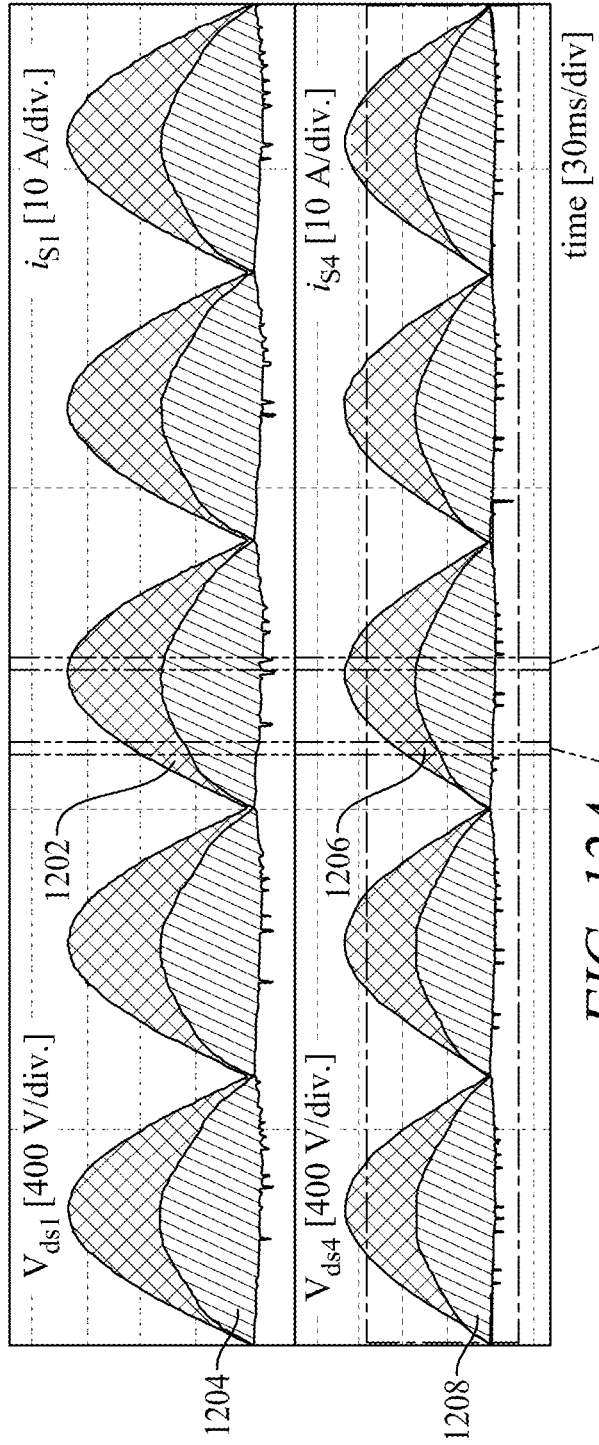
FIG. 12A illustrates the waveforms of voltage $V_{ds1}$, $V_{ds4}$ and current $i_{s1}$, $i_{s4}$ for a 400V configuration, according to certain embodiments.
Figure 12B:
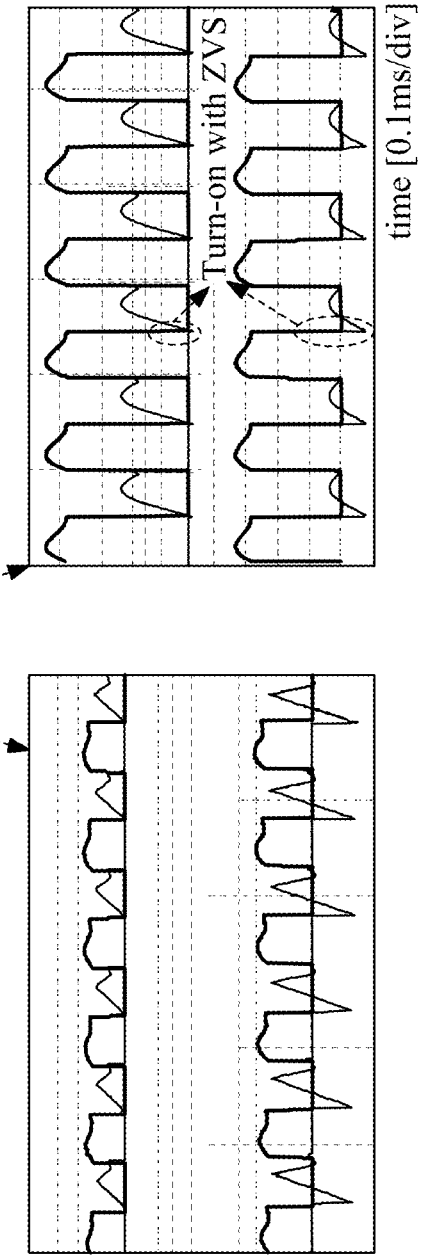
FIG. 12B is an exploded view of the waveforms as depicted in FIG. 12A, according to certain embodiments.

FIG. 12A depicts the waveforms of voltage $V_{ds1}$, $V_{ds4}$ and current $i_{S1}$, $i_{S4}$ for a 400V configuration. Waveforms 1202 of $V_{ds1}$, waveforms 1206 of $V_{ds4}$, waveforms 1204 of $i_{S1}$, and waveforms 1208 of $i_{S4}$ are shown at a time scale of 30 ms/div. FIG. 12B provide an exploded view of the waveforms as depicted in FIG. 12A, demonstrating the ZVS turn-on behavior for the switches. The analysis of the waveforms (1202, 1204, 1206, and 1208) validates efficient switching characteristics of the converter, reducing switching losses and enhancing performance.

Figure 13A:
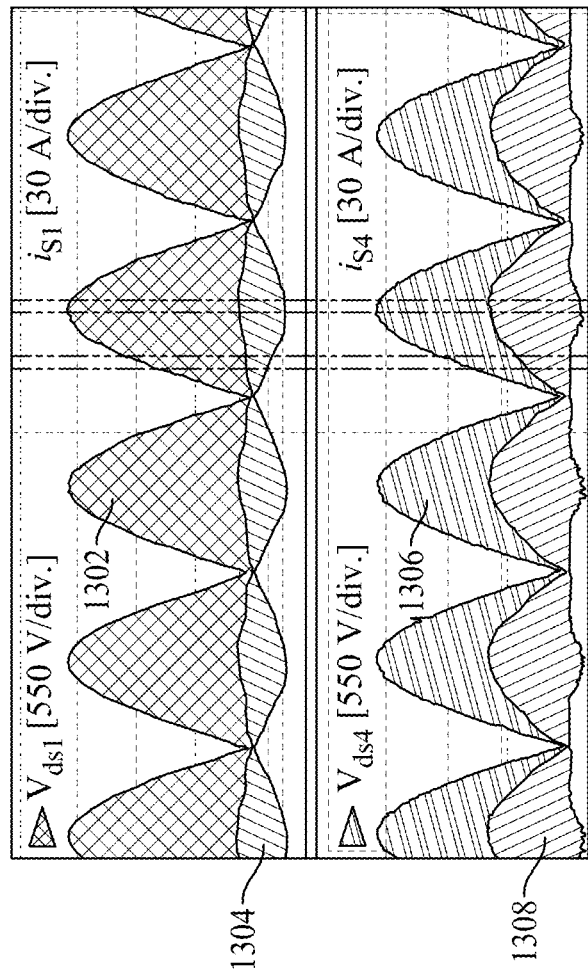
FIG. 13A illustrates the waveforms of voltage $V_{ds1}$, $V_{ds4}$ and current $i_{s1}$, $i_{s4}$ for a 800V configuration, according to certain embodiments.
Figure 13B:
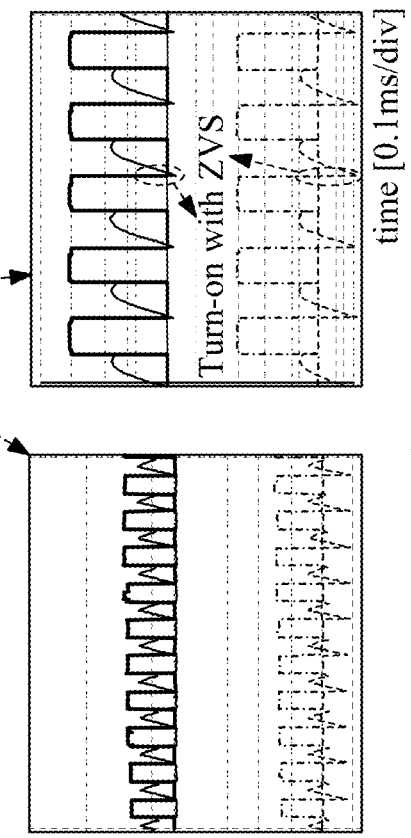
FIG. 13B is an exploded view of the waveforms as depicted in FIG. 13A, according to certain embodiments.

FIG. 13A illustrates the waveforms of voltage $V_{ds1}$, $V_{ds4}$ and current $i_{S1}$, $i_{S4}$ for an 800V configuration. Waveform 1302 of $V_{ds1}$, waveform 1306 of $V_{ds4}$, waveform 1304 of $i_{S1}$, and waveform 1308 of $i_{S4}$ are shown at a time scale of 30 ms/div. FIG. 13B provide an exploded view of the waveforms as depicted in FIG. 13A, representing the ZVS turn-on events for the switches, indicating efficient operation at higher voltages. The waveforms (1302, 1304, 1306, and 1308) validate capability of the converter to handle elevated voltage levels while maintaining optimal switching performance.

Figure 14A:
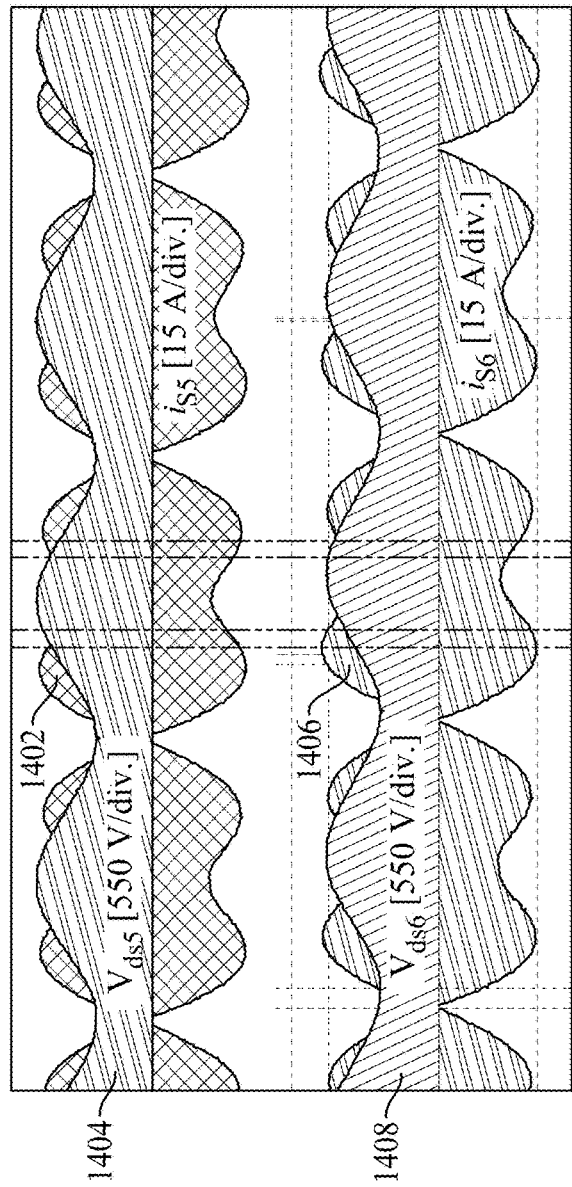
FIG. 14A illustrates the waveforms of voltage $V_{ds5}$, $V_{ds6}$ and current $i_{S5}$, $i_{S6}$ for a 400V configuration, according to certain embodiments.
Figure 14B:
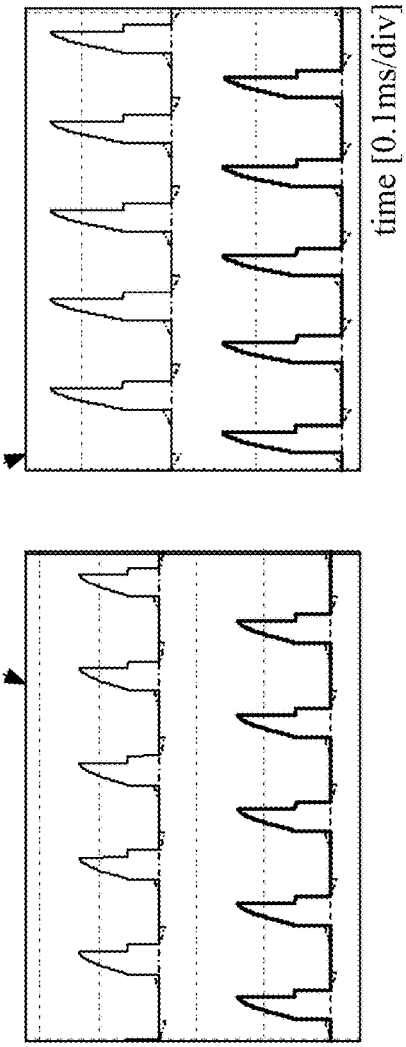
FIG. 14B is an exploded view of the waveforms as depicted in FIG. 14A, according to certain embodiments.

FIG. 14A illustrates the waveforms of voltage $V_{ds5}$, $V_{ds6}$ and current $i_{S5}$, $i_{S6}$ for an 400V configuration. Waveform 1402 of $V_{ds5}$, waveform 1406 of $V_{ds6}$, waveform 1404 of $i_{S5}$, and waveform 1408 of $i_{S6}$ are shown at a time scale of 30 ms/div. FIG. 14B provide an exploded view of the waveforms (1402, 1404, 1406, and 1408) as depicted in FIG. 14A, demonstrating the ZVS turn-off behavior for the bidirectional switches.

Figure 15A:
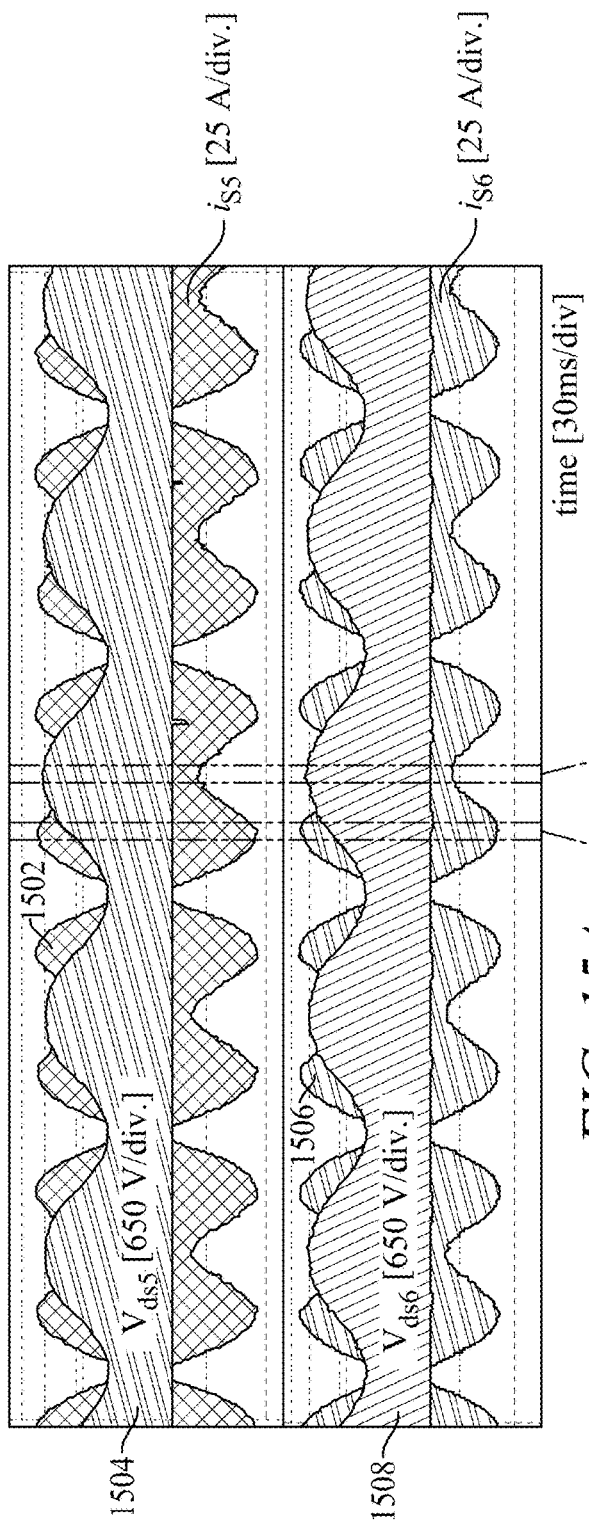
FIG. 15A illustrates the waveforms of voltage $V_{ds5}$, $V_{ds6}$ and current $i_{S5}$, $i_{S6}$ for a 650V configuration, according to certain embodiments.
Figure 15B:
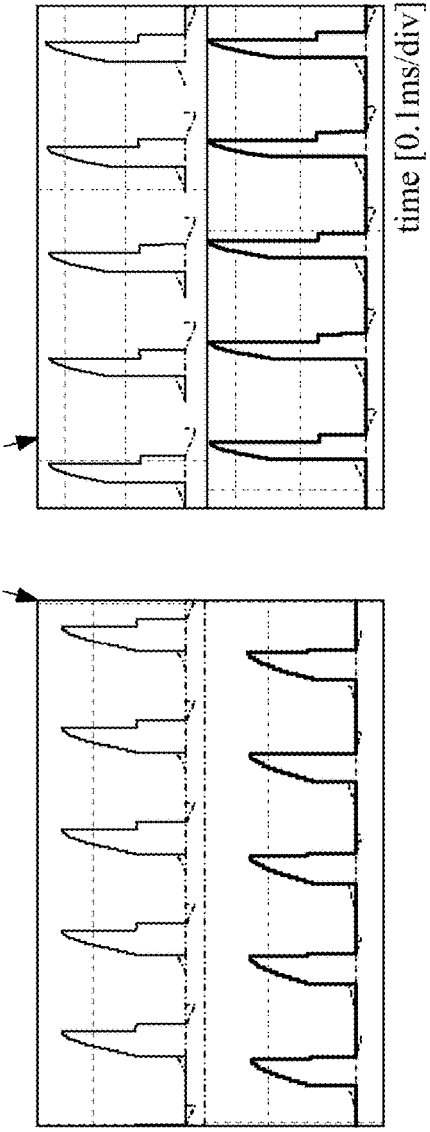
FIG. 15B is an exploded view of the waveforms as depicted in FIG. 15A, according to certain embodiments.

FIG. 15A illustrates the waveforms of voltage $V_{ds5}$, $V_{ds6}$ and current $i_{S5}$, $i_{S6}$ for an 650V configuration. Waveform 1502 of $V_{ds5}$, waveform 1506 of $V_{ds6}$, waveform 1504 of $i_{S5}$, and waveform 1508 of $i_{S6}$ are shown at a time scale of 30 ms/div. FIG. 15B provide an exploded view of the waveforms as depicted in FIG. 15A, demonstrating the ZVS turn-off behavior for the bidirectional switches.

Figure 16:
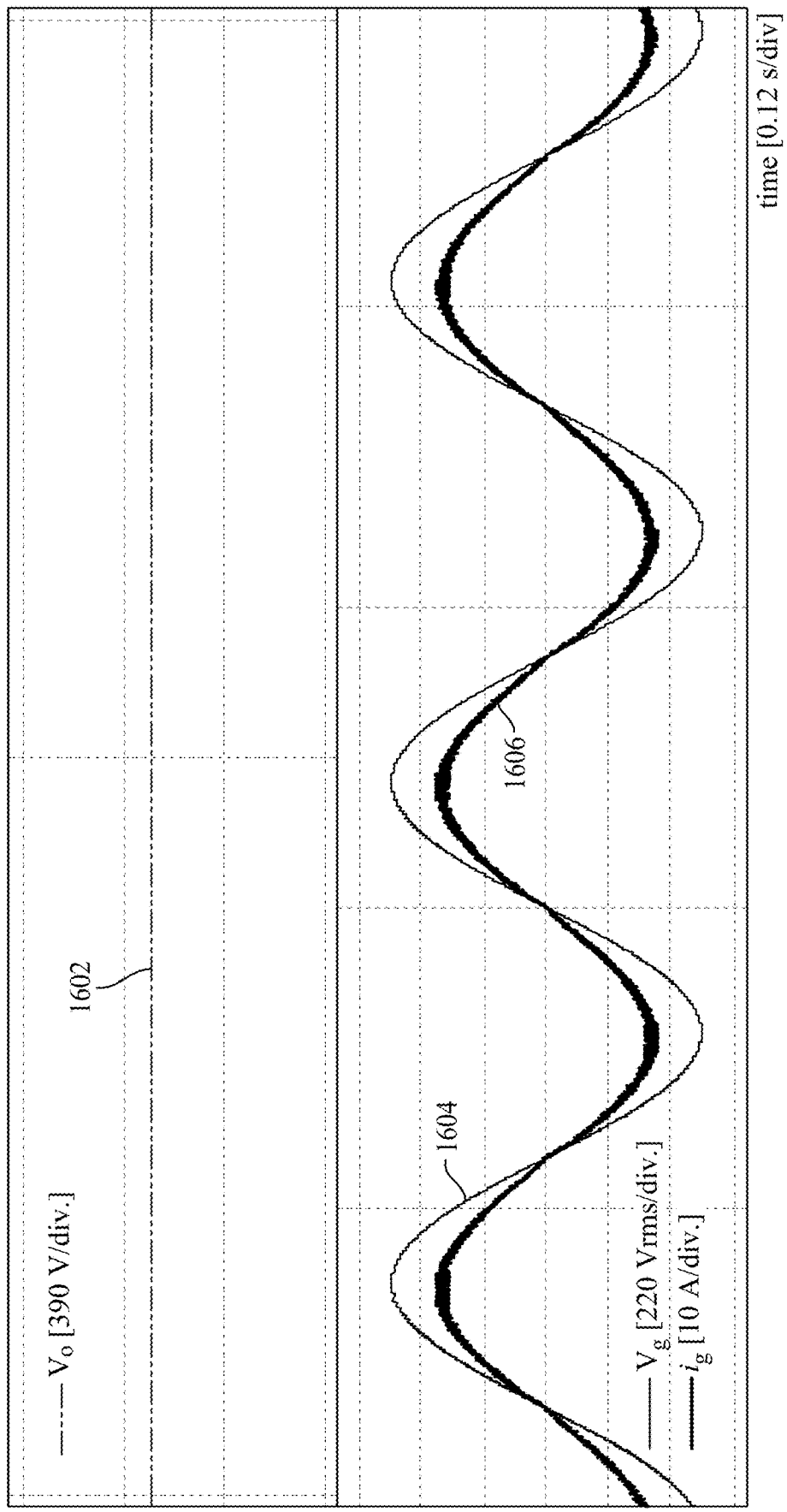
FIG. 16 illustrates waveforms of output voltage $V_o$, grid voltage $V_g$, and grid current $i_g$ for a 400V configuration, according to certain embodiments.

FIG. 16 illustrates the waveforms of output voltage $V_o$, grid voltage $V_g$, and grid current $i_g$ for a 400V configuration. Waveform 1602 indicates the output voltage $V_o$ at a scale of 390V/div. Waveform 1604 shows the grid voltage $V_g$ at 220 Vrms/div. Waveform 1606 shows grid current $i_g$ at 10 A/div over a time scale of 0.12 s/div. The in-phase alignment of $i_g$ with $V_g$ is indicated.

Figure 17:
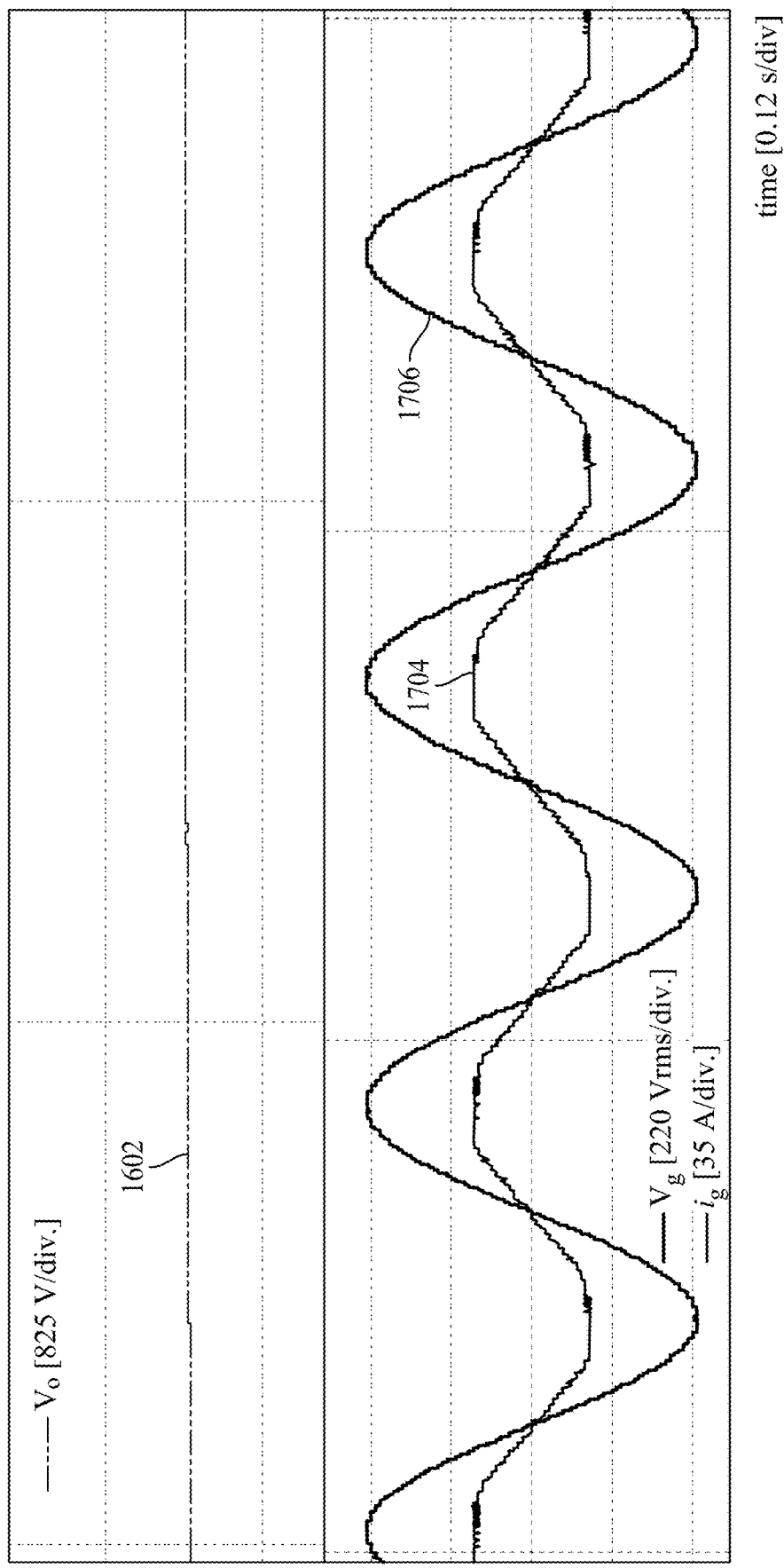
FIG. 17 illustrates waveforms of output voltage $V_o$, grid voltage $V_g$, and grid current $i_g$ for 800V configuration, according to certain embodiments.

FIG. 17 illustrates the waveforms of output voltage $V_o$, grid voltage $V_g$, and grid current $i_g$ for a 800V configuration. Waveform 1602 indicates the output voltage $V_o$ at a scale of 390V/div. Waveform 1702 indicates the output voltage $V_o$ at a scale of 825V/div. Waveform 1704 shows the grid voltage $V_g$ at 220 Vrms/div. Waveform 1706 shows grid current $i_g$ at 35 A/div over a time scale of 0.12 s/div.

Figure 18:
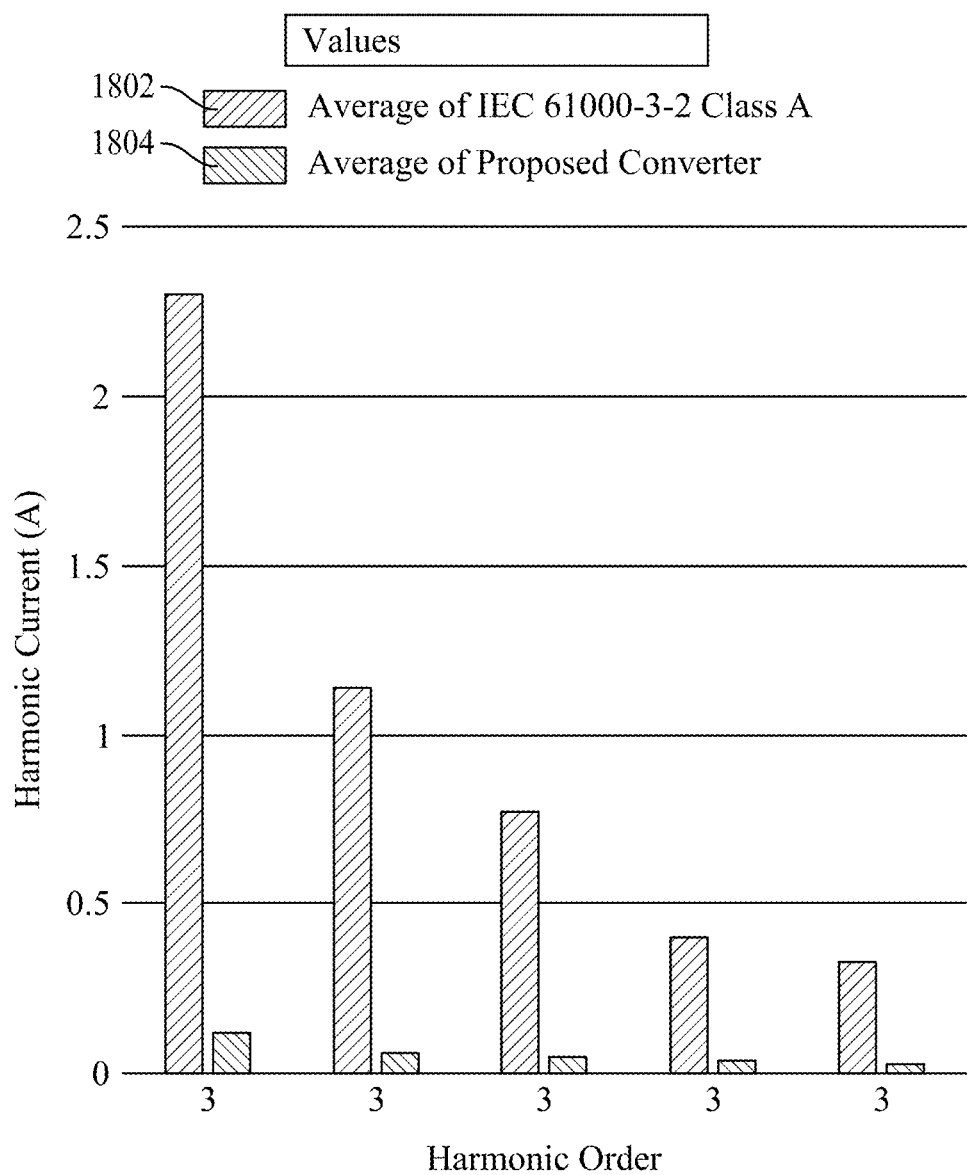
FIG. 18 illustrates a comparative analysis of input current harmonics for the AC/DC transformer-based converter versus a converter of IEC 61000-3-2 Class A standard, according to certain embodiments.

FIG. 18 presents a comparative analysis of input current harmonics for a converter of the present disclosure versus a converter of IEC 61000-3-2 Class A standard. The bar graph displays harmonic current levels across different harmonic orders, with the average values for the converter IEC 61000-3-2 Class A, represented by bars 1802, and the converter of the present disclosure, represented by bars 1804. The significantly lower harmonic levels of the converter of the present disclosure indicates effective performance in reducing THD, ensuring compliance with stringent standards and enhancing power quality.

Figure 19:
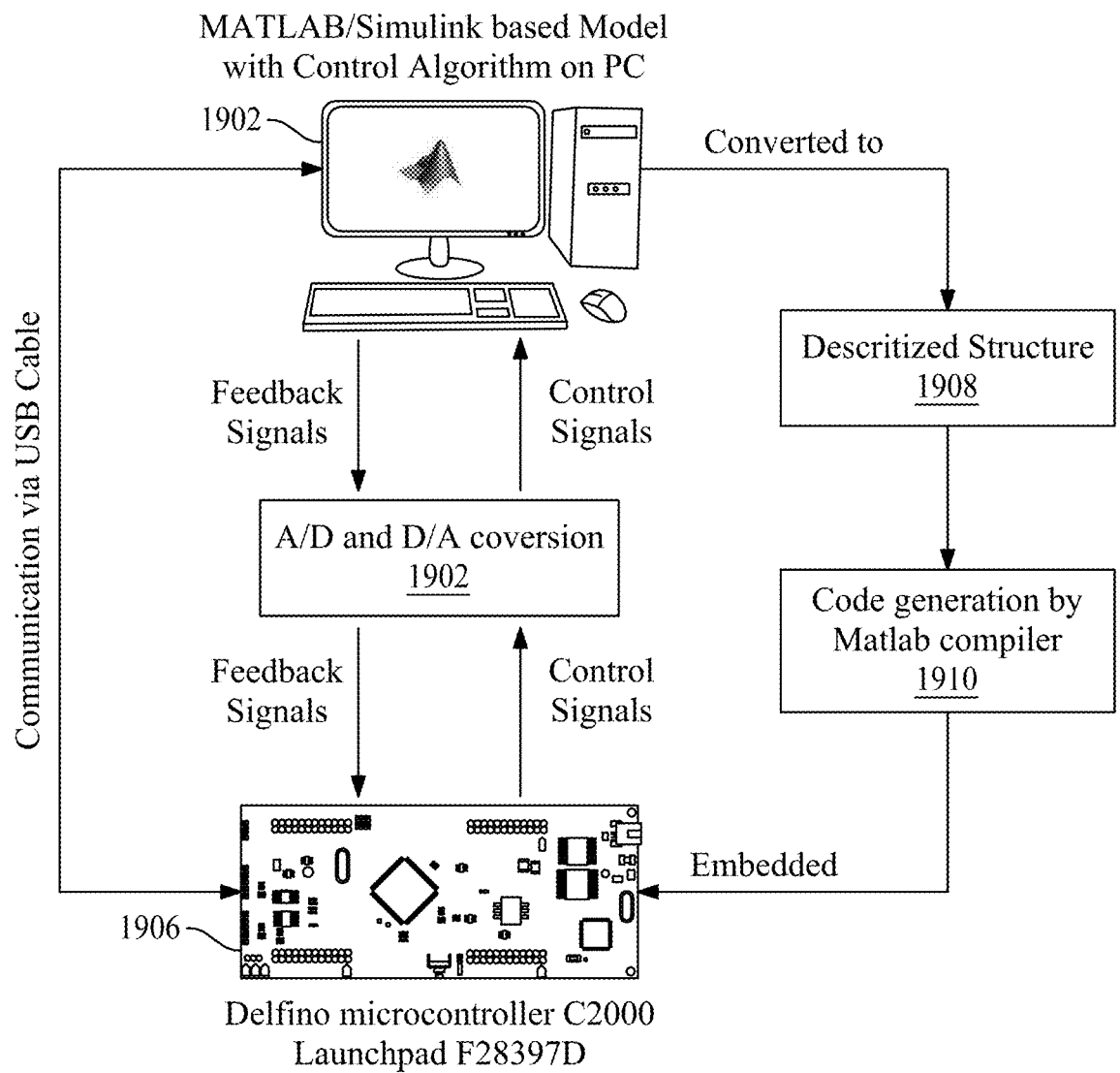
FIG. 19 illustrates an experimental set-up implemented for the converter system for EV battery charging, according to certain embodiments.

FIG. 19 illustrates an experimental set-up implemented for a converter system for EV battery charging. The set-up includes the MATLAB/simulink-based model with a control algorithm implemented on a personal computer (PC) 1902 and its communication with a microcontroller, such as Delfino microcontroller C2000 Launchpad F28379D 1906 for Hardware-in-the-Loop (HIL) experiments. The MATLAB/simulink model includes a discretized structure 1908 for discretizing input by converting continuous operators and blocks into discrete counterparts with specific sample times. The code is generated by the MATLAB compiler 1910 and embedded into the microcontroller 1906. The microcontroller 1906 communicates with the PC 1902 via a universal synchronous bus (USB) cable, transmitting feedback signals for A/D and D/A conversion, at block 1904. The control signals generated by the microcontroller 1906 manage the converters within subsystems of the grid, enabling real-time testing and validation of the control algorithm described in the present disclosure.

Figure 20:
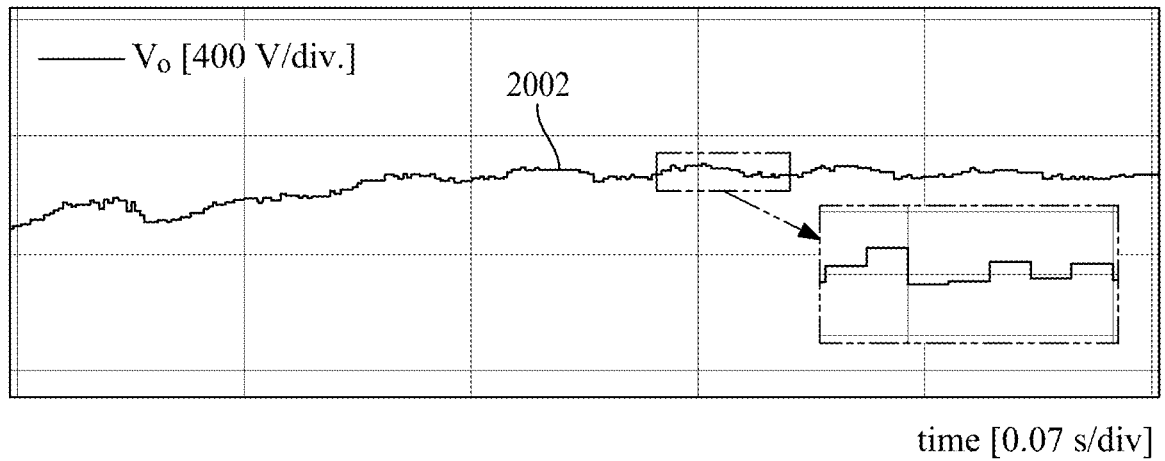
FIG. 20 illustrates Hardware-in-the-Loop (HIL) based analysis of $V_o$ waveform for a 400V configuration, according to certain embodiments.

FIG. 20 illustrates HIL based analysis of $V_o$ waveform for 400V configuration. Waveform 2002 indicates output voltage for a 400V configuration recorded during the HIL experiments. The waveform 2002 is displayed at a scale of 400 V/div and a time scale of 0.07 s/div, demonstrating the regulation of the output voltage at 400V. The minor oscillations observed due to communication delays and ambient noise. Despite these minor discrepancies, the waveform 2002 demonstrates effective voltage regulation, validating the performance of the control algorithm.

Figure 21:
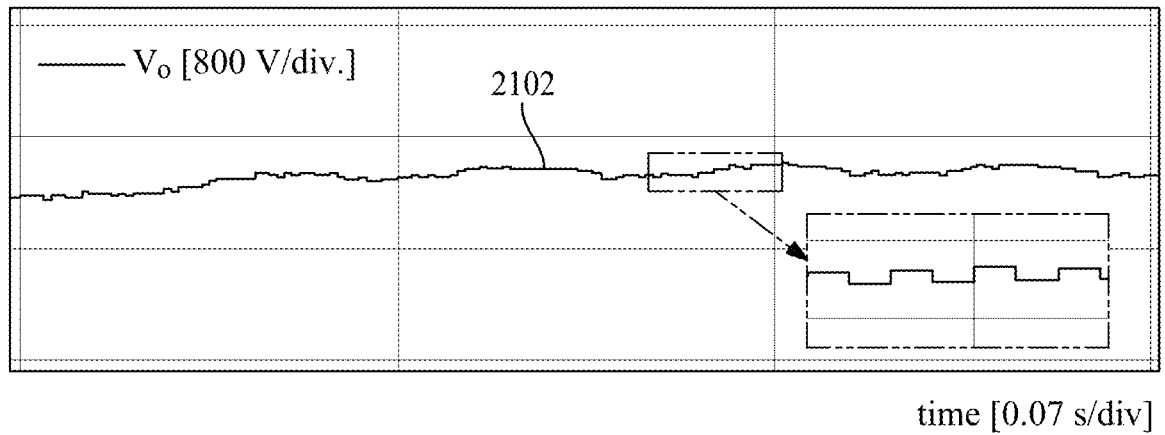
FIG. 21 illustrates HIL based analysis of $V_o$ waveform for a 800V configuration, according to certain embodiments.

FIG. 21 illustrates HIL based analysis of $V_o$ waveform for 800V configuration. Waveform 2102 presents the output voltage $V_o$ for an 800V configuration, recorded during the HIL experiments. The waveform 2102 is displayed at a scale of 800 V/div and a time scale of 0.07 s/div. Similar to the 400V configuration, the waveform 2102 illustrates the regulation of the output voltage at 800V, with a detailed inset highlighting minor oscillation. These results confirm capability of the controller to regulate voltage effectively even at higher configurations, with discrepancies attributed to communication delays and ambient noise.

Figure 22:
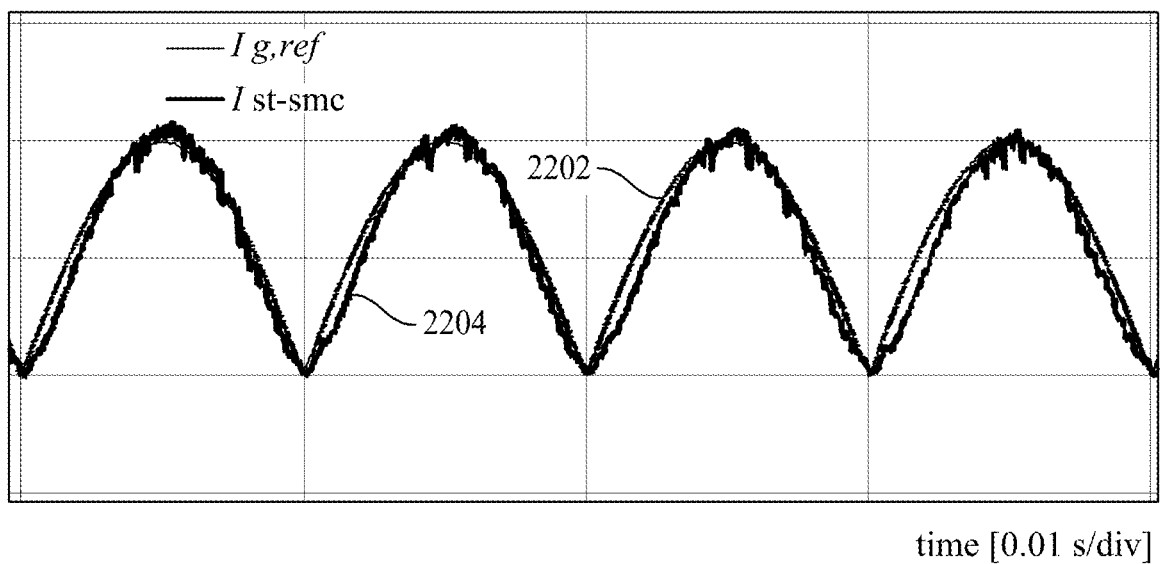
FIG. 22 illustrates HIL based analysis of $I_{g,ref}$ and $I_{st\text{-}smc}$ waveforms, according to certain embodiments.

FIG. 22 illustrates HIL based analysis of $I_{g,ref}$ and $i_{st-smc}$ waveforms. The grid reference current $I_{g,ref}$ is represented by curve 2202 and the current generated by the supertwisting sliding mode controller $i_{st-smc}$ is represented by curve 2204 during the HIL experiments. Both currents are shown at a time scale of 0.1 s/div, illustrating their phase alignment. The minor oscillations observed in the waveforms indicate the effective tracking of the reference current by the controller, validating performance of the control algorithm in real-time scenarios. The in-phase alignment of $i_g$ further demonstrates ability of the controller to achieve near-unity power factor and efficient current regulation.

The present disclosure has described a ST-SMC based non-linear control for a high-performance AC/DC quasi single-stage current-fed resonant converter, which is designed to address the increasing demand for efficient charging system and method for the EVs. The converter demonstrates high-frequency operation, reduced switching losses, enhanced efficiency, and unity power factor. PFC operation and output voltage regulation are achieved by controlling the bidirectional switch on the secondary side. The converter demonstrates ZVS at turn-on instants for the primary side switches and ZVS turn-off at the secondary side switches. The fixed duty ratio of 0.5 at the main switches, i.e., the primary side, effectively minimizes input current ripples, irrespective of changes in grid voltage and load conditions. The PFC operation, voltage regulation, and ZVS operation of the converter are accomplished for both 400V and 800V EV batteries. Performance of the controller and safety were assessed through HIL experiments using the C2000 Delfino microcontroller F28369D launchpad.

In one aspect of the present disclosure, a circuit 900 for charging an electric vehicle battery is described. The circuit 900 includes an AC/DC transformer-based converter 904 including a plurality of primary side switches (S1, S2, S3, and S4) and a secondary side bidirectional switch (S5 and S6) and a super-twisting sliding mode controller 902. The super-twisting sliding mode controller 902 is operatively connected to the primary side switches and the secondary side bidirectional switch. The super-twisting sliding mode controller 902 is configured to generate pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF.

In some aspects, a primary side of the AC/DC transformer-based converter includes an active clamp circuit. The active clamp circuit includes a clamp capacitor and a bridge rectifier connected to the clamp capacitor. The bridge rectifier is formed by the primary side switches ($S_1$, $S_2$, $S_3$, and $S_4$). The active clamp circuit further includes an alternating voltage source and an inductor-based current doubler including a first inductor $L_1$ in parallel with a second inductor $L_2$. A first end of the first inductor $L_1$ and a first end of the second inductor $L_2$ are connected to a positive terminal of the alternating voltage source.

The primary side of the AC/DC transformer-based converter further includes a primary coil Np connected to the bridge rectifier. A positive terminal of the primary coil Np is connected to a second end of first inductor $L_1$ and a negative terminal of the primary coil Np is connected to a second end of the second inductor $L_2$.

In some aspects, each primary side switch includes a metal oxide silicon field effect (MOSFET) transistor, an antiparallel diode, and a switch capacitor in parallel with the MOSFET and the antiparallel diode, and a drain terminal, a source terminal, and a gate terminal.

In some aspects, the plurality of primary side switches of the bridge rectifier ($S_1$, $S_2$, $S_3$, and $S_4$) includes a first primary side switch Si connected at its drain terminal to the second end of the first inductor $L_1$ and connected at its source terminal to a negative terminal of the alternating voltage source, a second primary side switch $S_2$ connected at its drain terminal to the second end of the second inductor $L_2$ and connected at its source terminal to a negative terminal of the alternating voltage source, a third primary side switch $S_3$ connected at its drain terminal to a positive terminal of the clamp capacitor $C_c$ and connected at its source terminal to the second end of the first inductor $L_1$; and a fourth primary side switch $S_4$ connected at its drain terminal to the positive terminal of the clamp capacitor $C_c$ and connected at its source terminal to the second end of the second inductor $L_2$.

The positive terminal of the primary coil Np is connected to the bridge rectifier at the source terminal of the third primary side switch $S_3$ and the negative terminal of the primary coil Np is connected to the drain terminal of the second primary side switch $S_2$.

In some aspects, the AC/DC transformer-based converter includes a secondary side coil, a transformer operatively connected to the primary side coil and the secondary side coil, and an active voltage doubler circuit.

In some aspects, the active voltage doubler circuit includes two diodes (D1 and D2), a resonant inductor $L_r$, and two resonant capacitors ($C_{r1}$, $C_{r2}$), and a first secondary side switch S5 and a second secondary side switch S6 comprising the secondary side bidirectional switch. Each secondary side switch includes a drain terminal, a source terminal, and a gate terminal, wherein the source terminal of the second secondary side switch S6 is connected to the source terminal of the first secondary side switch. Each secondary side switch includes a metal oxide silicon field effect (MOSFET) transistor, an antiparallel diode, and a switch capacitor in parallel with the MOSFET and the antiparallel diode.

In some aspects, the secondary side of the AC/DC transformer-based converter 904 further includes a secondary coil Ns and a first end of the resonant inductor $L_r$ connected to a positive terminal of the secondary coil Ns. The drain terminal of the first secondary side switch S5 is connected to a second end of the resonant inductor $L_r$ and the drain terminal of the second secondary side switch S6 is connected to a negative terminal of the secondary coil Ns.

In some aspects, the secondary side of the AC/DC transformer-based converter 904 further includes a first diode D1 of the two diodes having an anode connected to the second end of the resonant inductor $L_r$ and to the drain terminal of the first secondary side switch S5 of the bidirectional switch and a second diode D2 of the two diodes having a cathode connected to the second end of the resonant inductor $L_r$ and to the drain terminal of the first secondary side switch S5 of the bidirectional switch.

In some aspects, the secondary side of the AC/DC transformer-based converter 904 further includes a first resonant capacitor $C_{r1}$ of the two resonant capacitors having a positive terminal connected to a cathode of the first diode D1 and a negative terminal connected to the negative terminal of the secondary side coil and a second resonant capacitor $C_{r2}$ of the two resonant capacitors having a positive terminal connected to the negative terminal of the secondary side coil and to a negative terminal of the first resonant capacitor. The second resonant capacitor $C_{r2}$ has a negative terminal connected to an anode of the second diode D2.

In some aspects, the secondary side of the AC/DC transformer-based converter 904 further includes an output capacitor $C_o$ having a first terminal connected to the positive terminal of the first resonant capacitor $C_{r1}$ and a second terminal connected to the negative terminal of the second resonant capacitor $C_{r2}$. A voltage across the output capacitor $C_o$ and a current generated by the bidirectional switch are configured to charge the battery of the electric vehicle.

In some aspects, the super-twisting sliding mode controller 902 is configured to transmit the pulse width modulation signals to the gate terminals of the plurality of primary side switches of the bridge rectifier, to the gate terminal of the first secondary side switch S5 and to the gate terminal of the second secondary side switch S6 of the secondary side bidirectional switch, the pulse width modulation signals are configured to operate the AC/DC transformer-based converter in a first mode, a second mode, a third mode and a fourth mode.

The pulse width modulation signals of the first mode are configured to turn ON the second secondary side switch and then turn ON the first primary side switch, the fourth primary side switch and the first secondary side switch with zero voltage switching error, transfer a voltage stored on the clamp capacitor Cc through the primary coil Np to the secondary coil Ns, charge the switch capacitors of the first primary side switch, the fourth primary side switch, the first secondary side switch and the second primary side switch, and charge the battery of the electric vehicle with the voltage.

The pulse width modulation signals of the second mode are configured to turn OFF the second secondary side switch with low voltage switching error and charge the first resonant capacitor $C_{r1}$, the second resonant capacitor $C_{r2}$ and the output capacitor $C_o$, and charge the battery of the electric vehicle with the voltage on the output capacitor $C_o$.

The pulse width modulation signals of the third mode are configured to charge the switch capacitor of the second secondary side switch and discharge the output voltage to the battery of the electric vehicle.

The pulse width modulation signals of the fourth mode are configured turn OFF the first primary side switch and the fourth primary side switch with zero voltage switching error, turn ON the second primary side switch and the third primary side switch with zero voltage switching error, and continue to discharge the output voltage to the battery of the electric vehicle.

In some aspects, the circuit includes a feedback loop connected between the alternating voltage source and the output voltage of the AC/DC transformer-based converter 904 and the super-twisting sliding mode controller 902.

The circuit 900 further includes an error calculation unit 908 located in the feedback loop. The error calculation unit 908 is configured to receive a grid current of the alternating voltage source and a grid reference current generated by the super-twisting sliding mode controller 902, the output voltage and a reference voltage and calculate a current error signal and a voltage error signal and transmit the current error signal and a voltage error signal through the feedback loop to the super-twisting sliding mode controller 902. The super-twisting sliding mode controller 902 is configured to generate the pulse width modulation signals based on the current error signal and the voltage error signal.

In some aspects, the super-twisting sliding mode controller 902 includes electrical circuitry, a memory storing program instructions and at least one processor configured to execute the program instructions. The program instructions include a sliding mode surface algorithm and a super twisting algorithm. The at least one processor is configured to execute the sliding mode surface algorithm and a super twisting algorithm to generate the pulse width modulation signals.

In accordance with another aspect of the present disclosure, a method for charging a battery of an electric vehicle with an AC/DC transformer-based converter 904 is described. The method includes generating, with a super-twisting sliding mode controller 902 operatively connected to a plurality of primary side switches of a bridge rectifier and a secondary side bidirectional switch, pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF.

In some aspects, the method further includes charging, with current generated by a resonant inductor on the secondary side of the transformer, an output capacitor and charging the battery of the electric vehicle with a voltage of the output capacitor.

In some aspects, the method further includes on the primary side of the transformer, doubling, with an inductor-based current doubler having an active clamp circuit composed of a clamp capacitor, a first inductor connected between a positive terminal of an alternating voltage source and a primary coil Np, and a second inductor connected between the positive terminal of the alternating voltage source and the primary coil Np. The first inductor and the second inductor are connected to the bridge rectifier, a current supplied to a primary coil Np of the transformer.

In some aspects, the method includes on the secondary side of the transformer, doubling, with an active voltage doubler including two diodes, the secondary side bidirectional switch, a resonant inductor, a first resonant capacitor and a second resonant capacitor, the voltage of the output capacitor.

In some aspects, the method includes transmitting, with the super-twisting sliding mode controller, the pulse width modulation signals to gate terminals of the plurality of primary side switches of the bridge rectifier and to gate terminals of the secondary side bidirectional switch, and operating, with the pulse width modulation signals, the AC/DC transformer-based converter 904 in a first mode, a second mode, a third mode and a fourth mode.

Operating in the first mode includes turning ON a second secondary side switch of the secondary side bidirectional switch and then turning ON a first primary side switch of the bridge rectifier, a fourth primary side switch of the bridge rectifier and a first secondary side switch of the secondary side bidirectional switch with zero voltage switching error, transferring a voltage of the clamp capacitor through the primary coil Np to the secondary coil Ns, charging switch capacitors of the first primary side switch, the fourth primary side switch, the first secondary side switch and the second primary side switch, and charging the battery of the electric vehicle with the voltage.

Operating in the second mode includes turning OFF the second secondary side switch with low voltage switching error and charging the first resonant capacitor, the second resonant capacitor and the output capacitor, and charging the battery of the electric vehicle with the voltage on the output capacitor.

Operating in the third mode includes charging the switch capacitor of the second secondary side switch and discharging the output voltage to the battery of the electric vehicle.

Operating in the third mode fourth mode comprises turning OFF the first primary side switch and the fourth primary side switch with zero voltage switching error, turning ON the second primary side switch and the third primary side switch with zero voltage switching error, and continuing to discharge the output voltage to the battery of the electric vehicle.

In some aspects, the method includes generating, by the super-twisting sliding mode controller 902, a grid reference current, and receiving, by an error calculation unit 908 located in a feedback loop between the alternating voltage source and the output voltage of the AC/DC transformer-based converter 904 and the super-twisting sliding mode controller 902, a grid current of the alternating voltage source, the output voltage, and a reference voltage. The method includes calculating, by the error calculating unit 908, a current error signal and a voltage error signal, transmitting the current error signal and the voltage error signal through the feedback loop to the super-twisting sliding mode controller 902, and generating, by the super-twisting sliding mode controller 902, the pulse width modulation signals based on the current error signal and the voltage error signal.

In some aspects, the method includes generating, by the super-twisting sliding mode controller 902 which includes electrical circuitry, a memory storing program instructions including a sliding mode surface algorithm and a super twisting algorithm, and at least one processor configured to execute the program instructions, the pulse width modulation signals by executing the sliding mode surface algorithm and the super twisting algorithm, and transmitting the pulse width modulation signals to the AC/DC transformer-based converter 904.

In another aspect, a method for sliding mode control of switching error of an AC/DC transformer-based converter 904 connected to a battery of an electric vehicle is described. The methods includes generating, with a super-twisting sliding mode controller 902 operatively connected to a plurality of primary side switches of a bridge rectifier and a secondary side bidirectional switch, pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF.

The method further includes generating, by the super-twisting sliding mode controller 902 which includes electrical circuitry, a memory storing program instructions including a sliding mode surface algorithm and a super twisting algorithm, and at least one processor configured to execute the program instructions, the pulse width modulation signals by executing the sliding mode surface algorithm and the super twisting algorithm.

The method further includes transmitting, by the super-twisting sliding mode controller 902, the pulse width modulation signals to gate terminals of the plurality of primary side switches of the bridge rectifier and to gate terminals of the secondary side bidirectional switch. The method further incudes doubling, with an inductor-based current doubler having an active clamp circuit composed of a clamp capacitor $C_c$, a first inductor $L_1$ connected between a positive terminal of the alternating voltage source and a primary coil Np. The first inductor $L_1$ and the second inductor $L_2$ are connected to a bridge rectifier, a current supplied to a primary coil Np of the transformer.

The method further includes doubling, with an active voltage doubler including two diodes, a secondary side bidirectional switch, a resonant inductor, a first resonant capacitor and a second resonant capacitor, the voltage of the output capacitor, charging, with current generated by a resonant inductor on the secondary side of the transformer, an output capacitor; and charging the battery of the electric vehicle with a voltage of the output capacitor.

Figure 23:
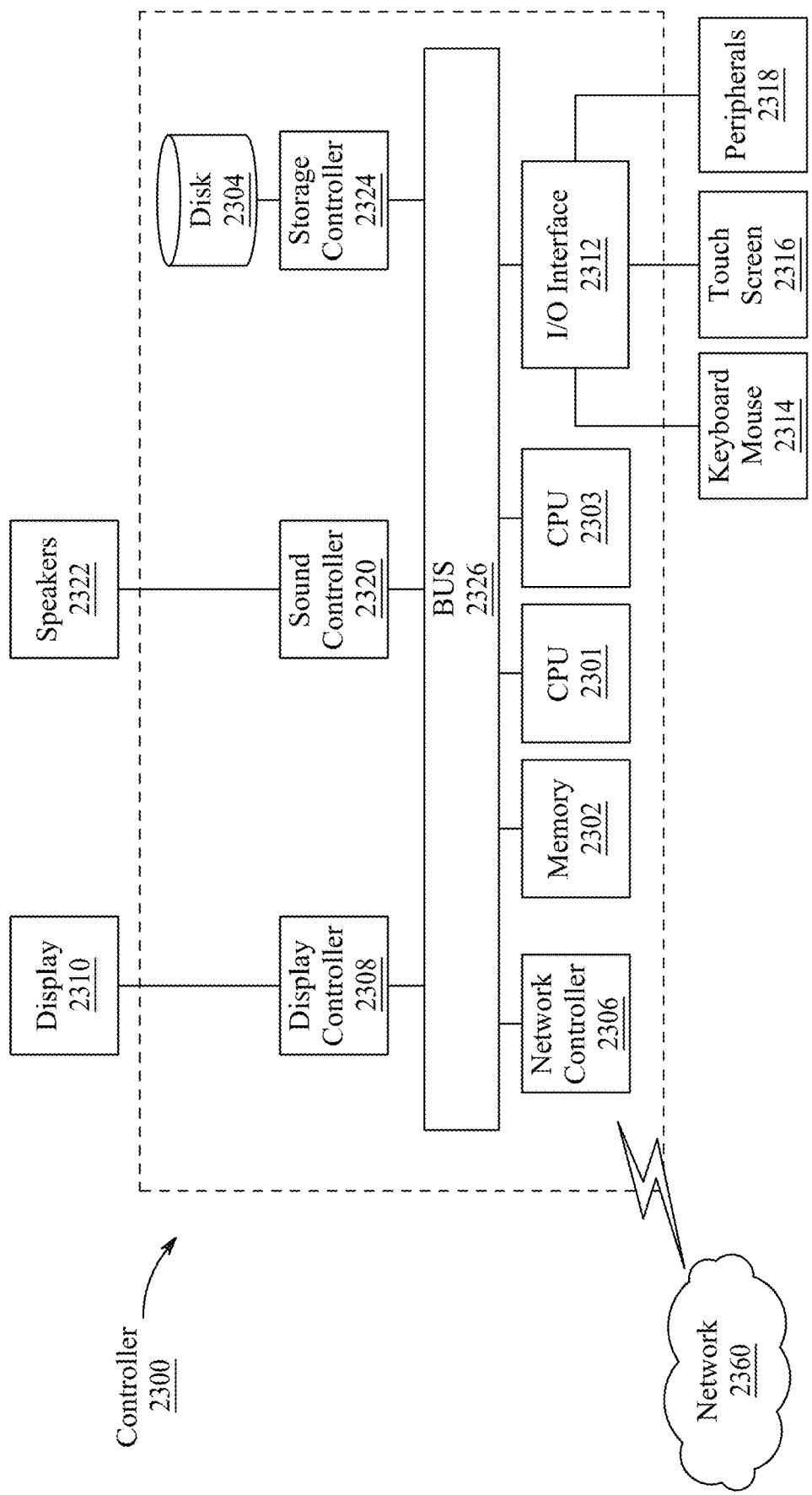
FIG. 23 is an illustration of a non-limiting example of details of a computing hardware used in the computing system, according to certain embodiments.

Next, further details of the hardware description of the computing environment according to exemplary embodiments is described with reference to FIG. 23. In FIG. 23, a controller 2300 representative of the controller 902 of FIG. 9 includes a CPU 2301 which performs the processes described above/below. The process data and instructions may be stored in memory 2302. These processes and instructions may also be stored on a storage medium disk 2304 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2301, 2303 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 2301 or CPU 2303 may be a Xenon or Core processor from Intel of America or an Opteron processor from AMD of America, or may be other processor types that would be recognized by one of ordinary skill in the art. Alternatively, the CPU 2301, 2303 may be implemented on an FPGA, ASIC, PLD or using discrete logic circuits, as one of ordinary skill in the art would recognize. Further, CPU 2301, 2303 may be implemented as multiple processors cooperatively working in parallel to perform the instructions of the inventive processes described above.

The computing device in FIG. 23 also includes a network controller 2306, such as an Intel Ethernet PRO network interface card from Intel Corporation of America, for interfacing with network 2360. As can be appreciated, the network 2360 can be a public network, such as the Internet, or a private network such as an LAN or WAN network, or any combination thereof and can also include PSTN or ISDN sub-networks. The network 2360 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 2308, such as a NVIDIA GeForce GTX or Quadro graphics adaptor from NVIDIA Corporation of America for interfacing with display 2310, such as a Hewlett Packard HPL2445w LCD monitor. A general purpose I/O interface 2312 interfaces with a keyboard and/or mouse 2314 as well as a touch screen panel 2316 on or separate from display 2310. General purpose I/O interface also connects to a variety of peripherals 2318 including printers and scanners, such as an OfficeJet or DeskJet from Hewlett Packard.

A sound controller 2320 is also provided in the computing device such as Sound Blaster X-Fi Titanium from Creative, to interface with speakers/microphone 2322 thereby providing sounds and/or music.

The general purpose storage controller 2324 connects the storage medium disk 2304 with communication bus 2326, which may be an ISA, EISA, VESA, PCI, or similar, for interconnecting all of the components of the computing device. A description of the general features and functionality of the display 2310, keyboard and/or mouse 2314, as well as the display controller 2308, storage controller 2324, network controller 2306, sound controller 2320, and general purpose I/O interface 2312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 24.

Figure 24:
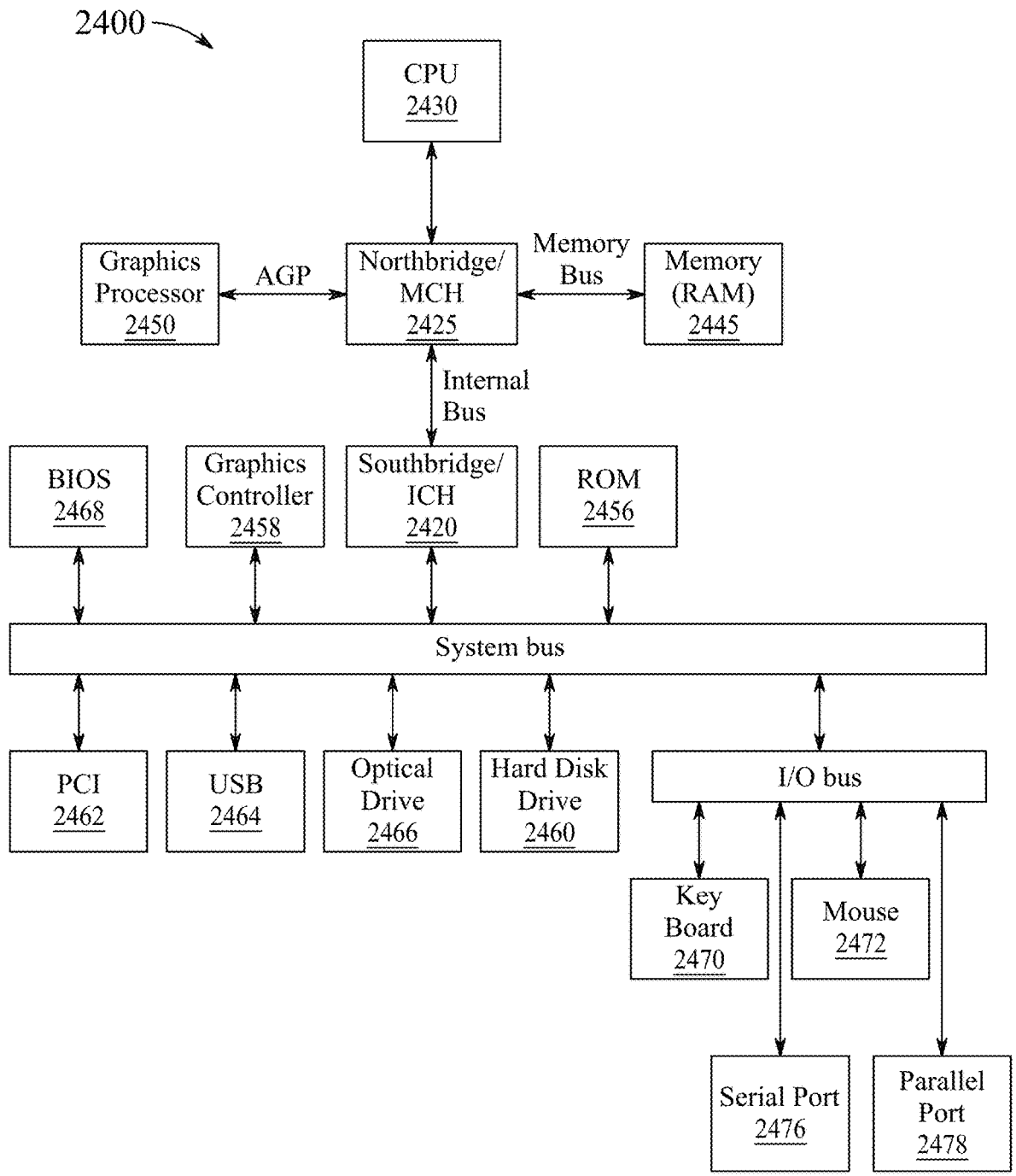
FIG. 24 is an exemplary schematic diagram of a data processing system used within the computing system, according to certain embodiments.

FIG. 24 shows a schematic diagram of a data processing system for performing the functions of the present disclosure. The data processing system is an example of a computer in which code or instructions implementing the processes of the present disclosure may be located.

In FIG. 24, data processing system 2400 employs a hub architecture including a north bridge and memory controller hub (NB/MCH) 2425 and a south bridge and input/output (I/O) controller hub (SB/ICH) 2420. The central processing unit (CPU) 2430 is connected to NB/MCH 2425. The NB/MCH 2425 also connects to the memory 2445 via a memory bus, and connects to the graphics processor 2450 via an accelerated graphics port (AGP). The NB/MCH 2425 also connects to the SB/ICH 2420 via an internal bus (e.g., a unified media interface or a direct media interface). The CPU Processing unit 2430 may contain one or more processors and even may be implemented using one or more heterogeneous processor systems.

Figure 25:
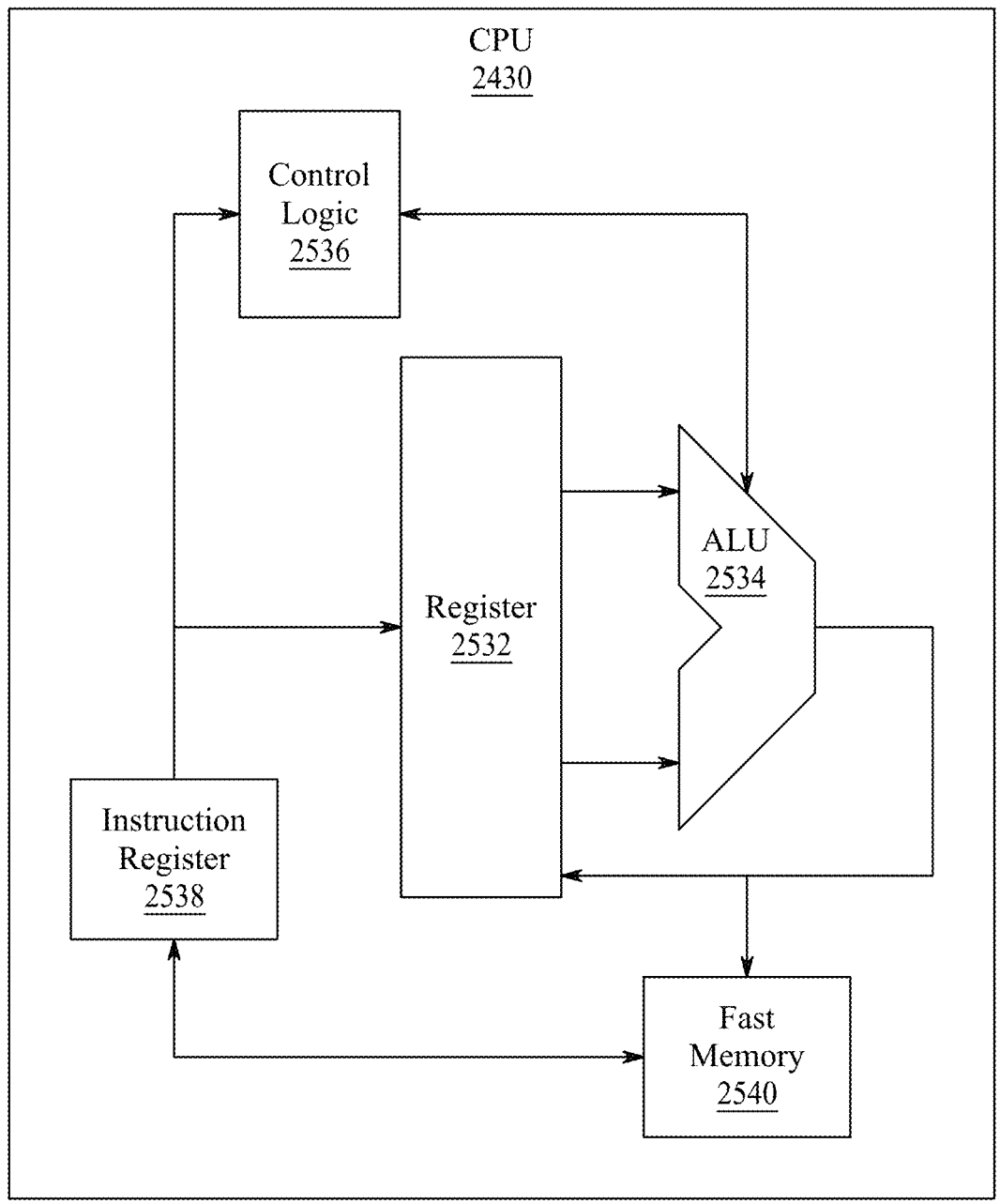
FIG. 25 is an exemplary schematic diagram of a processor used with the computing system, according to certain embodiments.

For example, FIG. 25 shows one implementation of CPU 2430. In one implementation, the instruction register 2538 retrieves instructions from the fast memory 2540. At least part of these instructions are fetched from the instruction register 2538 by the control logic 2536 and interpreted according to the instruction set architecture of the CPU 2430. Part of the instructions can also be directed to the register 2532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2534 that loads values from the register 2532 and performs logical and mathematical operations on the loaded values according to the instructions. The results from these operations can be feedback into the register and/or stored in the fast memory 2540. According to certain implementations, the instruction set architecture of the CPU 2430 can use a reduced instruction set architecture, a complex instruction set architecture, a vector processor architecture, a very large instruction word architecture. Furthermore, the CPU 2430 can be based on the Von Neuman model or the Harvard model. The CPU 2430 can be a digital signal processor, an FPGA, an ASIC, a PLA, a PLD, or a CPLD. Further, the CPU 2430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 24, the data processing system 2400 can include that the SB/ICH 2420 is coupled through a system bus to an I/O Bus, a read only memory (ROM) 2456, universal serial bus (USB) port 2464, a flash binary input/output system (BIOS) 2468, and a graphics controller 2458. PCI/PCIe devices can also be coupled to SB/ICH 2488 through a PCI bus 2462.

The PCI devices may include, for example, Ethernet adapters, add-in cards, and PC cards for notebook computers. The Hard disk drive 2460 and CD-ROM 2466 can use, for example, an integrated drive electronics (IDE) or serial advanced technology attachment (SATA) interface. In one implementation the I/O bus can include a super I/O (SIO) device.

Further, the hard disk drive (HDD) 2460 and optical drive 2466 can also be coupled to the SB/ICH 2420 through a system bus. In one implementation, a keyboard 2470, a mouse 2472, a parallel port 2478, and a serial port 2476 can be connected to the system bus through the I/O bus. Other peripherals and devices that can be connected to the SB/ICH 2420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 26:
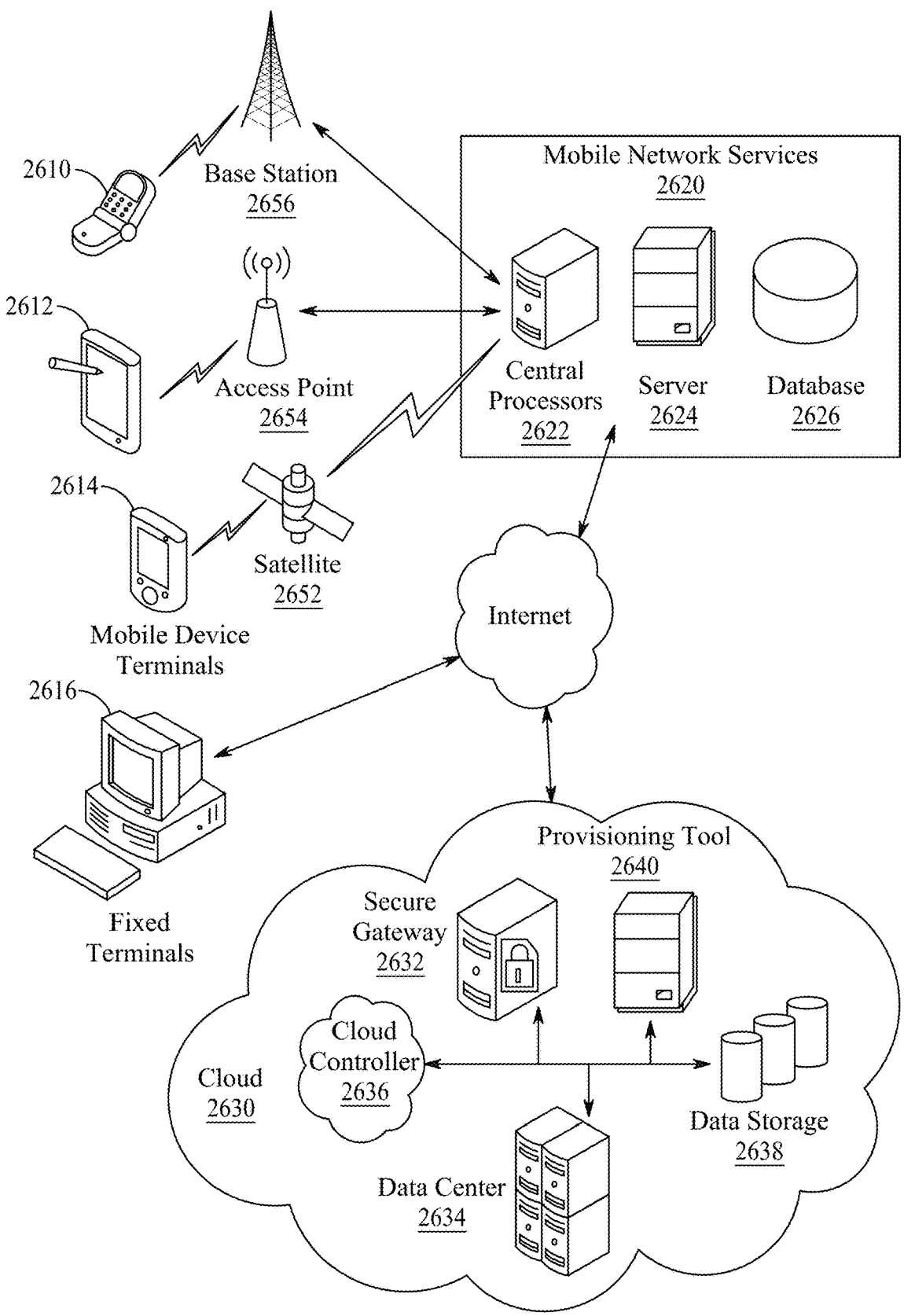
FIG. 26 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 2630 including a cloud controller 2636, a secure gateway 2632, a data center 2634, data storage 2638 and a provisioning tool 2640, and mobile network services 2620 including central processors 2622, a server 2624 and a database 2626, which may share processing, as shown by FIG. 26, in addition to various human interface and communication devices (e.g., display monitors 2616, smart phones 2610, tablets 2612, personal digital assistants (PDAs) 2614). The network may be a private network, such as a LAN, satellite 2652 or WAN 2654, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A circuit for charging an electric vehicle battery, comprising:
    an AC/DC transformer-based converter including a plurality of primary side switches and a secondary side bidirectional switch; and
    a super-twisting sliding mode controller operatively connected to the plurality of primary side switches and the secondary side bidirectional switch, wherein the super-twisting sliding mode controller is configured to generate pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF.

2. The circuit of claim 1, wherein a primary side of the AC/DC transformer-based converter comprises:
    an active clamp circuit including:
        a clamp capacitor;
        a bridge rectifier connected to the clamp capacitor, wherein the bridge rectifier includes the plurality of primary side switches;
        an alternating voltage source;
        an inductor-based current doubler including a first inductor in parallel with a second inductor, wherein a first end of the first inductor and a first end of the second inductor are connected to a positive terminal of the alternating voltage source; and
        a primary side coil connected to the bridge rectifier, wherein a positive terminal of the primary coil is connected to a second end of first inductor and a negative terminal of the primary side coil is connected to a second end of the second inductor.

3. The circuit of claim 2, wherein each primary side switch includes:
    a metal oxide silicon field effect (MOSFET) transistor, an antiparallel diode and a switch capacitor in parallel with the MOSFET and the antiparallel diode, and
    a drain terminal, a source terminal and a gate terminal.

4. The circuit of claim 3, wherein the plurality of primary side switches of the bridge rectifier comprise:
    a first primary side switch connected at its drain terminal to the second end of the first inductor and connected at its source terminal to a negative terminal of the alternating voltage source;
    a second primary side switch connected at its drain terminal to the second end of the second inductor and connected at its source terminal to a negative terminal of the alternating voltage source;
    a third primary side switch connected at its drain terminal to a positive terminal of the clamp capacitor and connected at its source terminal to the second end of the first inductor; and
    a fourth primary side switch connected at its drain terminal to the positive terminal of the clamp capacitor and connected at its source terminal to the second end of the second inductor,
    wherein the positive terminal of the primary coil is connected to the bridge rectifier at the source terminal of the third primary side switch and the negative terminal of the primary coil is connected to the drain terminal of the second primary side switch.

5. The circuit of claim 4, wherein the AC/DC transformer-based converter comprises:
    a secondary side coil;
    a transformer operatively connected to the primary side coil and the secondary side coil; and
    an active voltage doubler circuit.

6. The circuit of claim 5, wherein the active voltage doubler circuit comprises:
    two diodes, a resonant inductor, and two resonant capacitors; and
    a first secondary side switch and a second secondary side switch comprising the secondary side bidirectional switch,
    wherein each secondary side switch includes a drain terminal, a source terminal and a gate terminal, wherein the source terminal of the second secondary side switch is connected to the source terminal of the first secondary side switch,
    wherein each secondary side switch includes a metal oxide silicon field effect (MOSFET) transistor, an antiparallel diode and a switch capacitor in parallel with the MOSFET and the antiparallel diode.

7. The circuit of claim 6, wherein the secondary side of the AC/DC transformer-based converter further comprises:
    a secondary coil; and
    a first end of the resonant inductor connected to a positive terminal of the secondary coil, wherein:
        the drain terminal of the first secondary side switch is connected to a second end of the resonant inductor,
        the drain terminal of the second secondary side switch is connected to a negative terminal of the secondary coil.

8. The circuit of claim 7, wherein the secondary side of the AC/DC transformer-based converter further comprises:
    a first diode of the two diodes having an anode connected to the second end of the resonant inductor and to the drain terminal of the first secondary side switch of the bidirectional switch; and
    a second diode of the two diodes having a cathode connected to the second end of the resonant inductor and to the drain terminal of the first secondary side switch of the bidirectional switch.

9. The circuit of claim 8, wherein the secondary side of the AC/DC transformer-based converter further comprises:
    a first resonant capacitor of the two resonant capacitors having a positive terminal connected to a cathode of the first diode and a negative terminal connected to the negative terminal of the secondary side coil; and
    a second resonant capacitor of the two resonant capacitors having a positive terminal connected to the negative terminal of the secondary side coil and to a negative terminal of the first resonant capacitor, wherein the second resonant capacitor has a negative terminal connected to an anode of the second diode.

10. The circuit of claim 9, wherein the secondary side of the AC/DC transformer-based converter further comprises:
    an output capacitor having a first terminal connected to the positive terminal of the first resonant capacitor and a second terminal connected to the negative terminal of the second resonant capacitor, wherein a voltage across the output capacitor and a current generated by the bidirectional switch are configured to charge the battery of the electric vehicle.

11. The circuit of claim 10, wherein:

the super-twisting sliding mode controller is configured to transmit the pulse width modulation signals to the gate terminals of the plurality of primary side switches of the bridge rectifier, to the gate terminal of the first secondary side switch and to the gate terminal of the second secondary side switch of the secondary side bidirectional switch; and the pulse width modulation signals are configured to operate the AC/DC transformer-based converter in a first mode, a second mode, a third mode and a fourth mode, wherein:

the pulse width modulation signals of the first mode are configured to turn ON the second secondary side switch and then turn ON the first primary side switch, the fourth primary side switch and the first secondary side switch with zero voltage switching error, transfer a voltage stored on the clamp capacitor through the primary coil to the secondary coil, charge the switch capacitors of the first primary side switch, the fourth primary side switch, the first secondary side switch and the second primary side switch, and charge the battery of the electric vehicle with the voltage;

the pulse width modulation signals of the second mode are configured to turn OFF the second secondary side switch with low voltage switching error and charge the first resonant capacitor, the second resonant capacitor and the output capacitor, and charge the battery of the electric vehicle with the voltage on the output capacitor;

the pulse width modulation signals of the third mode are configured to charge the switch capacitor of the second secondary side switch and discharge the output voltage to the battery of the electric vehicle; and the pulse width modulation signals of the fourth mode are configured turn OFF the first primary side switch and the fourth primary side switch with zero voltage switching error, turn ON the second primary side switch and the third primary side switch with zero voltage switching error, and continue to discharge the output voltage to the battery of the electric vehicle.

12. The circuit of claim 11, further comprising:

a feedback loop connected between the alternating voltage source and the output voltage of the AC/DC transformer-based converter and the super-twisting sliding mode controller; and an error calculation unit located in the feedback loop, wherein the error calculation unit is configured to receive a grid current of the alternating voltage source and a grid reference current generated by the super-twisting sliding mode controller, the output voltage and a reference voltage and calculate a current error signal and a voltage error signal and transmit the current error signal and a voltage error signal through the feedback loop to the super-twisting sliding mode controller, wherein the super-twisting sliding mode controller is configured to generate the pulse width modulation signals based on the current error signal and the voltage error signal.

13. The circuit of claim 12, further comprising:

the super-twisting sliding mode controller includes electrical circuitry, a memory storing program instructions and at least one processor configured to execute the program instructions, wherein the program instructions include a sliding mode surface algorithm and a super twisting algorithm, wherein the at least one processor is configured to execute the sliding mode surface algorithm and a super twisting algorithm to generate the pulse width modulation signals.

14. A method for charging a battery of an electric vehicle with an AC/DC transformer-based converter, comprising:

generating, with a super-twisting sliding mode controller operatively connected to a plurality of primary side switches of a bridge rectifier and a secondary side bidirectional switch, pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF;

charging, with current generated by a resonant inductor on the secondary side of the transformer, an output capacitor; and charging the battery of the electric vehicle with a voltage of the output capacitor.

15. The method of claim 14, further comprising:

on the primary side of the transformer, doubling, with an inductor-based current doubler having an active clamp circuit composed of a clamp capacitor, a first inductor connected between a positive terminal of an alternating voltage source and a primary coil, and a second inductor connected between the positive terminal of the alternating voltage source and the primary coil, wherein the first inductor and the second inductor are connected to the bridge rectifier, a current supplied to a primary coil of the transformer.

16. The method of claim 15, further comprising:

on the secondary side of the transformer, doubling, with an active voltage doubler including two diodes, the secondary side bidirectional switch, a resonant inductor, a first resonant capacitor and a second resonant capacitor, the voltage of the output capacitor.

17. The method of claim 16, further comprising:

transmitting, with the super-twisting sliding mode controller, the pulse width modulation signals to gate terminals of the plurality of primary side switches of the bridge rectifier and to gate terminals of the secondary side bidirectional switch; and operating, with the pulse width modulation signals, the AC/DC transformer-based converter in a first mode, a second mode, a third mode and a fourth mode, wherein:

operating in the first mode comprises turning ON a second secondary side switch of the secondary side bidirectional switch and then turning ON a first primary side switch of the bridge rectifier, a fourth primary side switch of the bridge rectifier and a first secondary side switch of the secondary side bidirectional switch with zero voltage switching error, transferring a voltage of the clamp capacitor through the primary coil to the secondary coil, charging switch capacitors of the first primary side switch, the fourth primary side switch, the first secondary side switch and the second primary side switch, and charging the battery of the electric vehicle with the voltage;

operating in the second mode comprises turning OFF the second secondary side switch with low voltage switching error and charging the first resonant capacitor, the second resonant capacitor and the output capacitor, and charging the battery of the electric vehicle with the voltage on the output capacitor;

operating in the third mode comprises charging the switch capacitor of the second secondary side switch and discharging the output voltage to the battery of the electric vehicle; and operating in the third mode fourth mode comprises turning OFF the first primary side switch and the fourth primary side switch with zero voltage switching error, turning ON the second primary side switch and a third primary side switch with zero voltage switching error, and continuing to discharge the output voltage to the battery of the electric vehicle.

18. The method of claim 17, further comprising:

generating, by the super-twisting sliding mode controller, a grid reference current;

receiving, by an error calculation unit located in a feedback loop between the alternating voltage source and the output voltage of the AC/DC transformer-based converter and the super-twisting sliding mode controller, a grid current of the alternating voltage source, the output voltage and a reference voltage;

calculating, by the error calculating unit, a current error signal and a voltage error signal;

transmitting the current error signal and the voltage error signal through the feedback loop to the super-twisting sliding mode controller; and generating, by the super-twisting sliding mode controller, the pulse width modulation signals based on the current error signal and the voltage error signal.

19. The method of claim 18, further comprising:

generating, by the super-twisting sliding mode controller which includes electrical circuitry, a memory storing program instructions including a sliding mode surface algorithm and a super twisting algorithm, and at least one processor configured to execute the program instructions, the pulse width modulation signals by executing the sliding mode surface algorithm and the super twisting algorithm; and transmitting the pulse width modulation signals to the AC/DC transformer-based converter.

20. A method for sliding mode control of switching error of an AC/DC transformer-based converter connected to a battery of an electric vehicle, comprising:

generating, with a super-twisting sliding mode controller operatively connected to a plurality of primary side switches of a bridge rectifier and a secondary side bidirectional switch, pulse width modulation signals which switch a polarity of the plurality of primary side switches with zero-voltage switching error at turn ON and at turn OFF and switch the secondary side bidirectional switch with zero-voltage switching error at turn ON and with low-voltage switching error at turn OFF;

generating, by the super-twisting sliding mode controller which includes electrical circuitry, a memory storing program instructions including a sliding mode surface algorithm and a super twisting algorithm, and at least one processor configured to execute the program instructions, the pulse width modulation signals by executing the sliding mode surface algorithm and the super twisting algorithm; and transmitting, by the super-twisting sliding mode controller, the pulse width modulation signals to gate terminals of the plurality of primary side switches of the bridge rectifier and to gate terminals of the secondary side bidirectional switch;

doubling, with an inductor-based current doubler having an active clamp circuit composed of a clamp capacitor, a first inductor connected between a positive terminal of an alternating voltage source and a primary coil Np, wherein the first inductor and a second inductor are connected to a bridge rectifier, a current supplied to a primary coil Np of the transformer;

doubling, with an active voltage doubler including two diodes, a secondary side bidirectional switch, a resonant inductor, a first resonant capacitor and a second resonant capacitor, the voltage of an output capacitor;

charging, with current generated by a resonant inductor on the secondary side of the transformer, an output capacitor; and charging the battery of the electric vehicle with a voltage of the output capacitor.

* * * * *